(12) United States Patent
Murison

(10) Patent No.: US 11,280,426 B2
(45) Date of Patent: Mar. 22, 2022

(54) METHODS AND DEVICES RELATING TO HYDRAULIC VALVES AND SWITCHES

(71) Applicant: OBOTICS INC., North Gower (CA)

(72) Inventor: Bruce Murison, North Gower (CA)

(73) Assignee: Obotics Inc., North Gower (CA)

( * ) Notice: Subject to any disclaimer, the term of this patent is extended or adjusted under 35 U.S.C. 154(b) by 0 days.

(21) Appl. No.: 16/474,137

(22) PCT Filed: Dec. 29, 2017

(86) PCT No.: PCT/CA2017/000275
§ 371 (c)(1),
(2) Date: Jun. 27, 2019

(87) PCT Pub. No.: WO2018/119508
PCT Pub. Date: Jul. 5, 2018

(65) Prior Publication Data
US 2019/0346058 A1    Nov. 14, 2019

Related U.S. Application Data

(60) Provisional application No. 62/441,700, filed on Jan. 3, 2017, provisional application No. 62/441,704, filed on Jan. 3, 2017, provisional application No. 62/440,541, filed on Dec. 30, 2016.

(51) Int. Cl.
*F16K 31/06*    (2006.01)

(52) U.S. Cl.
CPC ................. *F16K 31/0679* (2013.01)

(58) Field of Classification Search
CPC .... F16K 11/065; F16K 11/07; F16K 11/0704; F16K 11/0708; F16K 11/0712; F16K 27/041; F16K 27/048; F16K 31/0613; F16K 31/0624; F16K 31/0627; F16K 31/0679; F16K 31/082; F16K 31/084
See application file for complete search history.

(56) References Cited

U.S. PATENT DOCUMENTS

| 4,253,493 A | * | 3/1981 | English | ............ F01L 9/20 137/625.18 |
| 4,337,794 A | * | 7/1982 | Yamanaka | ............ F16K 31/0679 137/596.17 |
| 5,734,310 A | * | 3/1998 | Ankney | ............ H01F 7/121 335/228 |

FOREIGN PATENT DOCUMENTS

| DE | 1157871 B | * 11/1963 | ......... F16K 31/0606 |
| DE | 102012018566 A1 | * 3/2014 | ......... H01F 7/1615 |

(Continued)

*Primary Examiner* — Hailey K. Do
(74) *Attorney, Agent, or Firm* — Rosenberg, Klein & Lee

(57) ABSTRACT

Fluidics offers a means of distributing power to activate elements remote from the power source as the pressure/fluid flow may be used directly to generate an action and/or motion without requiring an additional transducer, e.g. a motor to convert electric power to mechanical power. Prior art pumps, valves, and switches are bulky devices with high power consumption limiting their use in many portable battery-operated consumer and non-consumer devices. Accordingly, it would be desirable to provide designers of such products with hydraulic valves and switches to support and provide configurability, programmability, and operation of these devices in conjunction with compact high efficiency pumps to provide devices meeting the market requirements for low footprint, complexity, low power, and low cost.

8 Claims, 32 Drawing Sheets

(56) References Cited

FOREIGN PATENT DOCUMENTS

| WO | WO-0023740 A1 | * | 4/2000 | ............ | F16K 31/082 |
| WO | WO-2006070655 A1 | * | 7/2006 | ........... | F15B 13/0438 |

* cited by examiner

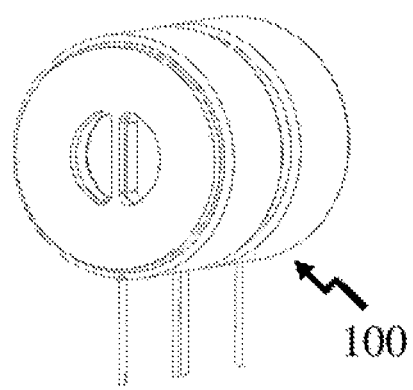
Figure 1
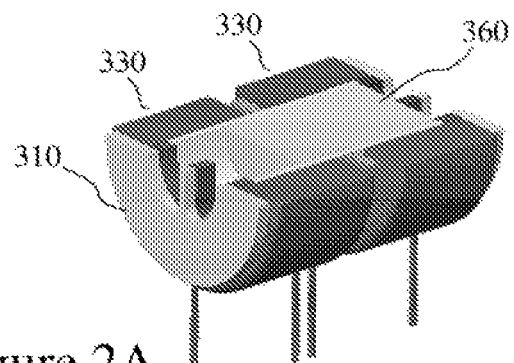
Figure 2A
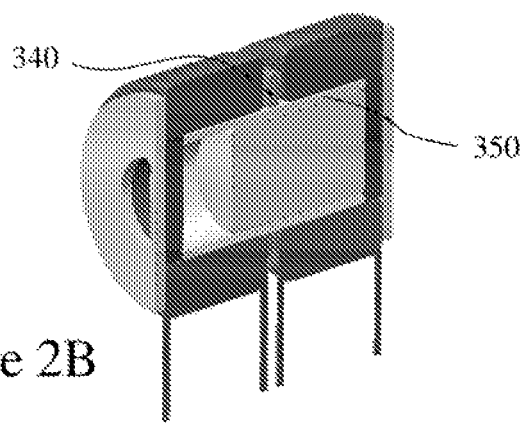
Figure 2B
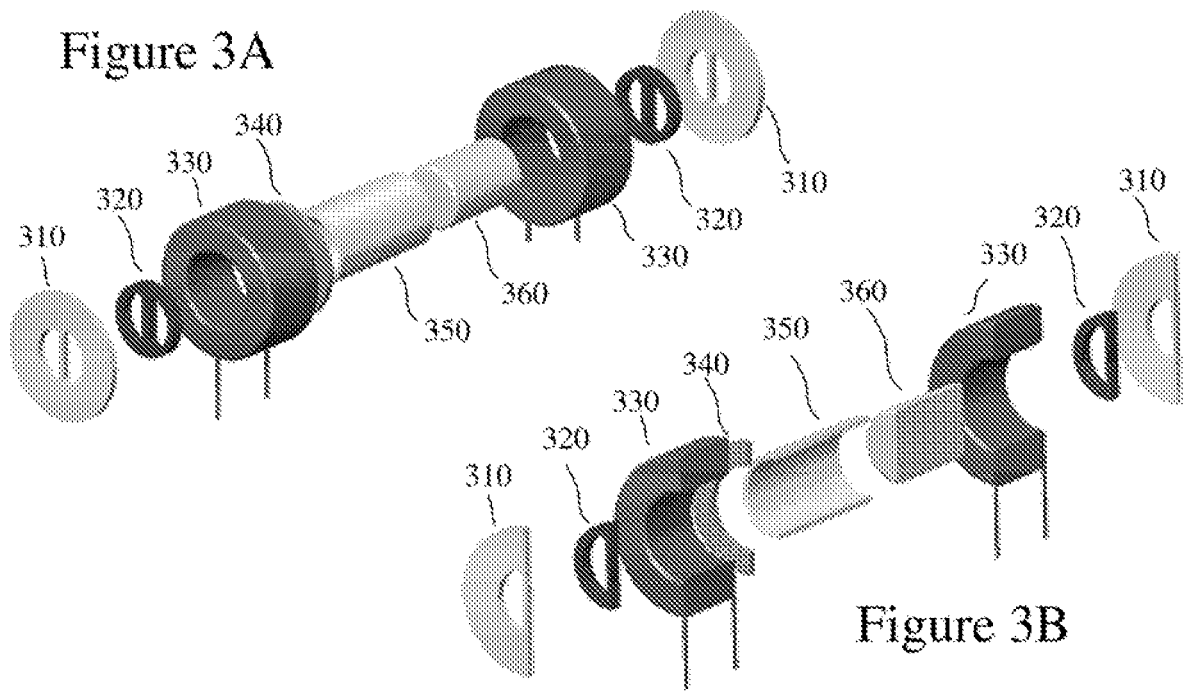
Figure 3A
Figure 3B

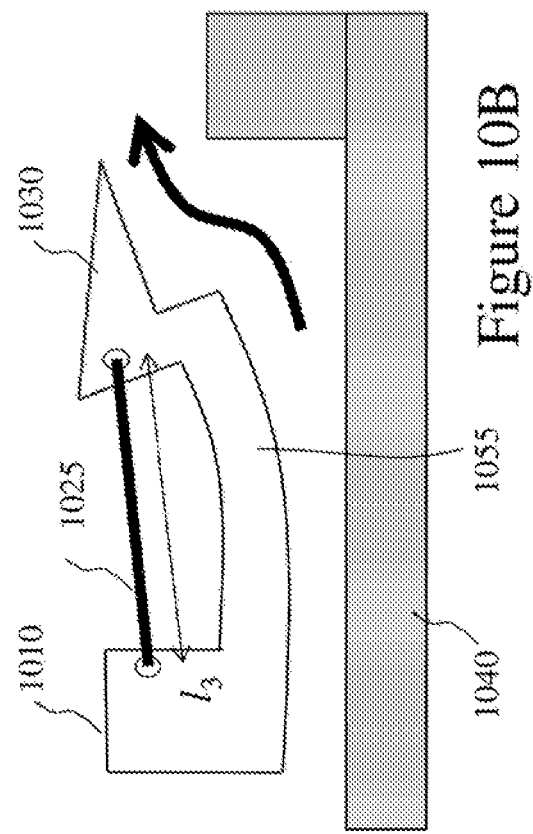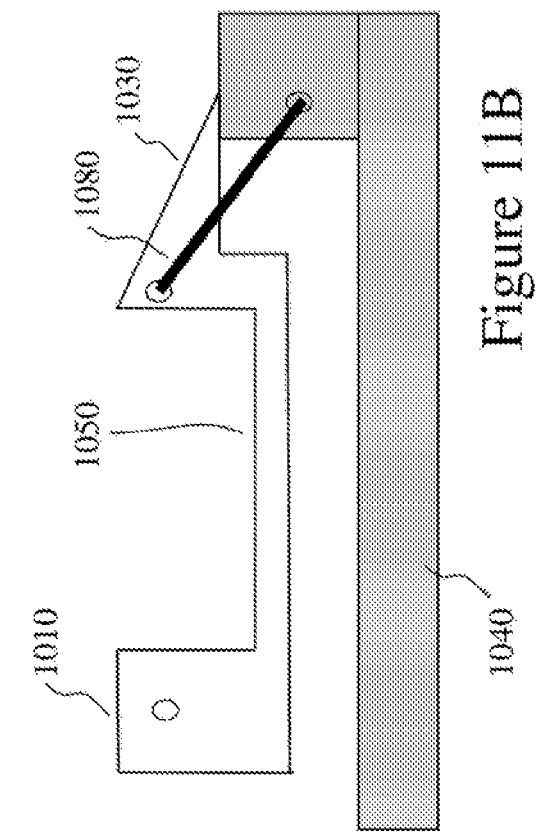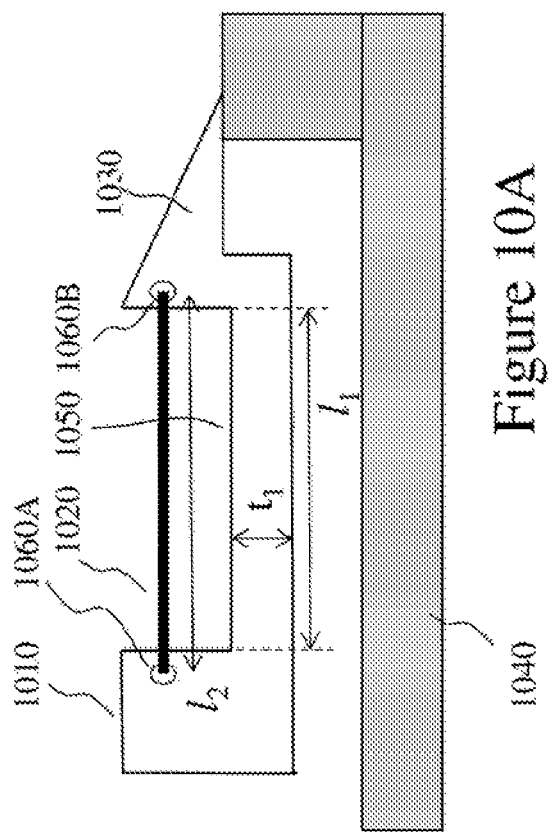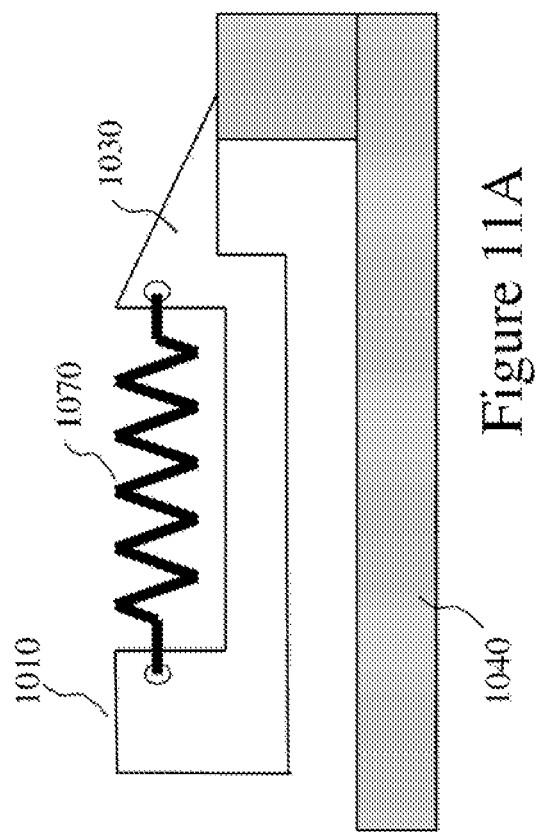

METHODS AND DEVICES RELATING TO HYDRAULIC VALVES AND SWITCHES

CROSS-REFERENCE TO RELATED APPLICATIONS

This application claims the benefit of priority as a 371 National Phase application of PCT/CA2017/000,275 entitled "Methods and Devices relating to Hydraulic Valves and Switches" filed Dec. 29, 2017 which itself claims the benefit of priority from U.S. Provisional Patent Application 62/440,704 filed Jan. 3, 2017 entitled "Methods and Devices relating to Fluidic Motors and Pumps" as well as the benefit of priority from U.S. Provisional Patent Application 62/441,700 filed Jan. 3, 2017 entitled "Methods and Devices relating to Hydraulic Valves and Switches" as well as the benefit of priority from U.S. Provisional Patent Application 62/440,541 filed Dec. 30, 2016 entitled "Methods and Devices relating to Hydraulic Valves and Switches."

FIELD OF THE INVENTION

The present invention relates to hydraulic valves and switches and more particularly to hydraulic valves and switches for consumer and non-consumer applications offering high efficiency, small footprint, low complexity and low cost.

BACKGROUND OF THE INVENTION

Within a wide range of consumer and non-consumer products there are requirements for a range of different actuators which are controlled from one or more motors either directly or via switches etc. Within many instances their applications are limited by the availability of compact, low cost motors to provide distributed power for motion generation and/or pressure generation. In comparison to other techniques fluidics offers an efficient means of distributing power to activate elements remote from the power source as the pressure/fluid flow may be used directly to generate pressure and/or motion without requiring an additional transducer, e.g. a motor to convert electric power to mechanical power. Accordingly, fluidics may allow either air and/or liquid based fluidic devices to be provided which are suitable for applications in these consumer and non-consumer products that are compatible with the dimensions, design, and performance required whilst also operating multiple actuators of one or more types, and allowing multiple motors (pumps) to be employed within a small region. Further, fluidic actuators may be flexed and/or distorted during operation as well as operating after having been flexed and/or distorted.

Considering fluidic systems that may be employed as part of consumer and non-consumer products then within the prior art there are naturally several designs of pumps (motors), valves, switches and actuators due to the long history of hydraulics overall. However, to date as compact hydraulic devices have not been developed or commercially deployed there has not been the corresponding development of compact valves, switches, etc. Today fluidic developments are primarily within the realm of micro-fluidics for self-powered biological and/or chemical testing applications where dimensions are measured in micrometers (microinches) or pump based hydraulic (fluidic) systems for plumbing, refrigeration, heating, hydroculture, vehicle suspensions, etc. where dimensions are measured in centimeters (inches). Such systems exploit pumps such as rotary vane pumps, diaphragm pumps, gear pumps etc.

Such prior art pumps are bulky, low efficiency, and high power requiring connection to the electrical power grid (mains electricity) or other power sources such as lead acid batteries or petrol/diesel/gas engines. The absence of high efficiency, compact fluidic pumps has until recently blocked the consideration of using hydraulic devices within portable and/or alkaline battery powered consumer and non-consumer products. Further, most prior art pumps do not support the operation modes required for such devices, such as, for example, low frequency, variable duration, and pulsed for those providing primary pumps for dimensional adjustments or for example, high frequency operation for those providing secondary pumps for vibration and other types of motion/excitation. For example, a conventional rotary pump offers poor pressure at low revolutions per minute (rpm), has a complicated motor and separate pump, multiple moving parts, relatively large and expensive even with small impeller, and low effective flow rate from a small impeller.

Accordingly, the establishment of low power, compact, high efficiency linear fluidic pumps such as those by the inventor within WO/2014/047717 entitled "Methods and Devices for Fluidic Driven Adult Devices" and WO/2014/047718 entitled "Fluidic Methods and Devices" support the deployment of portable battery powered consumer and non-consumer products employing fluidics such as those, for example, described by the inventor within WO/2015/135,070 entitled "Methods and Devices to Hydraulic Consumer Devices", which are incorporated herein by reference.

Accordingly, it would be desirable to provide hydraulic valves and switches to support configurability, programmability, and operation of these portable battery operated consumer and non-consumer devices which themselves offer high efficiency, a small footprint, low complexity and low cost.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to hydraulic valves and switches and more particularly to hydraulic valves and switches for consumer and non-consumer applications offering high efficiency, small footprint, low complexity and low cost.

In accordance with an embodiment of the invention there is provided a fluidic device comprising:
a piston formed from at least a first magnetic material having a first length and a first predetermined lateral dimension;
a piston sleeve formed from a second predetermined material having an inner bore having a predetermined tolerance with respect to the first predetermined lateral dimension of the piston, an outer profile of a second predetermined lateral dimension, and a second length;
a central magnetic washer formed from a first predetermined magnetic material having an inner bore having a predetermined tolerance with respect to the second predetermined lateral dimension and a third length;
an electrical coil with an inner bore having a predetermined tolerance with respect to the second predetermined lateral dimension and a fourth length, wherein the electrical coil is disposed at a predetermined position relative to the piston sleeve in dependence upon at least the lengths of the piston sleeve and piston;
a pair of non-magnetic washers formed from a predetermined non-magnetic material each having a first thickness determined in dependence upon the predetermined length, an outer diameter having a predetermined tolerance respect to the inner bore of the pair of electrical coils, and having a pair of first openings within the non-magnetic washer disposed either side of a radial axis of the non-magnetic washer, wherein each non-magnetic washer is disposed against an end of the piston sleeve and limits motion of the piston beyond the end of the piston sleeve;
a pair of magnetic washers formed from a second predetermined magnetic material each having a second thickness and having a pair of second openings within the magnetic washer disposed either side of a radial axis of the non-magnetic washer, wherein each magnetic washer is disposed such that the pair of second openings overlap with the pair of first openings within the respective non-magnetic washer at an end of the piston sleeve and abuts the respective electrical coil at that end of the piston sleeve; wherein
in a first configuration the piston is retained against the non-magnetic washer at one end of the piston sleeve by magnetic attraction to the magnetic washer at that end of the piston sleeve thereby blocking fluid flow through the pairs of overlapping first openings and second openings via the piston sleeve at that end of the piston sleeve but allowing fluid flow through the pairs of overlapping first openings and second openings via the piston sleeve at the other distal end of the piston sleeve;
in a second configuration the piston is retained against the non-magnetic washer at the other distal end of the piston sleeve by magnetic attraction to the magnetic washer at that distal end of the piston sleeve thereby blocking fluid flow through the pairs of overlapping first openings and second openings via the piston sleeve at that distal end of the piston sleeve but allowing fluid flow through the pairs of overlapping first openings and second openings via the piston sleeve at the other end of the piston sleeve; and
the piston is moved to establish either of the first configuration and the second configuration by selective electrical excitation of at least one electrical coil of the pair of electrical coils.

In accordance with an embodiment of the invention there is provided a fluidic device comprising:
a piston formed from at least a first magnetic material having a first length and a first predetermined lateral dimension;
a piston sleeve formed from a second predetermined material having an inner bore having a predetermined tolerance with respect to the first predetermined lateral dimension of the piston, an outer profile of a second predetermined lateral dimension, and a second length;
an electrical coil with an inner bore having a predetermined tolerance with respect to the second predetermined lateral dimension and a fourth length, wherein the electrical coil is disposed at a predetermined position relative to the piston sleeve in dependence upon at least the lengths of the piston sleeve and piston;
a non-magnetic washer formed from a predetermined non-magnetic material having a first thickness and having a pair of first openings within the non-magnetic washer disposed either side of a radial axis of the non-magnetic washer, wherein the non-magnetic washer abuts an end of the piston sleeve and limits motion of the piston beyond the end of the piston sleeve;
a non-magnetic plate formed from a predetermined non-magnetic material closing off the other end of the piston sleeve to the one with the non-magnetic washer;
a magnetic washer formed from a second predetermined magnetic material having a second thickness and having a pair of second openings within the magnetic washer disposed either side of a radial axis of the non-magnetic washer, wherein the magnetic washer is disposed such that the pair of second openings overlap with the pair of first openings within the respective non-magnetic washer at an end of the piston sleeve; wherein
in a first configuration the piston is retained against the non-magnetic washer at one end of the piston sleeve by magnetic attraction to the magnetic washer at that end of the piston sleeve thereby blocking fluid flow through the pairs of overlapping first openings and second openings via the piston sleeve at that end of the piston sleeve;
in a second configuration the piston is disposed against the non-magnetic plate at the other distal end of the piston sleeve by magnetic attraction to the magnetic washer at that distal end of the piston sleeve thereby allowing fluid flow through the pairs of overlapping first openings and second openings via the piston sleeve at the other end of the piston sleeve; and
the piston is moved to establish either of the first configuration and the second configuration by selective electrical excitation of the electrical coil.

In accordance with an embodiment of the invention there is provided a fluidic device comprising:
an opening within a first fluidic element;
a cover attached to an arm for covering the opening and attached at its distal end from the opening to a support;
a shape memory alloy (SMA) element attached to a first predetermined portion of the cover, a second predetermined portion of the arm, and a third predetermined portion of the support; wherein
in a first configuration when SMA element is above a predetermined threshold temperature the cover is removed from the opening allowing fluidic flow through the opening by the SMA element returning to its original shape and moving the flexible arm; and
in a second configuration when SMA element is below a predetermined threshold temperature the cover abuts the opening blocking fluidic flow through the opening as the arm returns to its original state and deforms the SMA element.

In accordance with an embodiment of the invention there is provided a fluidic device comprising:
a piston formed from at least a first magnetic material having a first length and a first predetermined lateral dimension;
a piston sleeve formed from a second predetermined material having an inner bore having a predetermined tolerance with respect to the first predetermined lateral dimension of the piston, an outer profile of a second predetermined lateral dimension, and a second length;
an electrical coil having an inner bore having a predetermined tolerance with respect to the second predetermined lateral dimension and a fourth length; and
a pair of washer sub-assemblies, each disposed at one end of the piston sleeve with a predetermined relationship to each other and the orientation of the piston within the piston sleeve and comprising:
a first non-magnetic washer formed from a first predetermined non-magnetic material having a first predetermined thickness, an inner bore having a predetermined tolerance with respect to the second predetermined lateral dimension, and disposed adjacent to at least one of the end of piston sleeve and the electrical coil;

a magnetic washer formed from a second predetermined magnetic material each having a second predetermined thickness, an inner bore larger than the second predetermined lateral dimension, and disposed adjacent the first non-magnetic washer further from the electrical coil than the first magnetic washer; and a second non-magnetic washer formed from a second predetermined non-magnetic material having a third predetermined thickness, an inner bore having a predetermined tolerance with respect to the second predetermined lateral dimension, and disposed adjacent the magnetic washer further from the electrical coil than the magnetic washer.

In accordance with an embodiment of the invention there is provided a fluidic device comprising:

a body comprising first and second openings within an open chamber at one end of the body and a wall disposed on the other end of the body between the first and second openings;

a first diaphragm attached to a first predetermined portion of the first opening of the body on the outside of the open chamber;

a second diaphragm attached to a first predetermined portion of the second opening of the body on the inside of the open chamber; wherein each of the first and second openings in addition to the first predetermined portions for attaching the respective diaphragm includes a structure for supporting the respective diaphragms and limiting motion of the respective diaphragm in a predetermined direction.

In accordance with an embodiment of the invention there is provided a fluidic device comprising:

a piston formed from at least a first magnetic material having a first length and a first predetermined lateral dimension;

a piston sleeve formed from a second predetermined material having an inner bore having a predetermined tolerance with respect to the first predetermined lateral dimension of the piston, an outer profile of a second predetermined lateral dimension, and a second length;

a central magnetic washer formed from a first predetermined magnetic material having an inner bore having a predetermined tolerance with respect to the second predetermined lateral dimension and a third length;

an electrical coil with an inner bore having a predetermined tolerance with respect to the second predetermined lateral dimension and a fourth length, wherein the electrical coil is disposed at a predetermined position relative to the piston sleeve in dependence upon at least the lengths of the piston sleeve and piston;

a pair of non-magnetic washers formed from a predetermined non-magnetic material each having a first thickness determined in dependence upon the predetermined length, an outer diameter having a predetermined tolerance with respect to the inner bore of the pair of electrical coils, and having a pair of first openings within the non-magnetic washer disposed either side of a radial axis of the non-magnetic washer, wherein each non-magnetic washer is disposed against an end of the piston sleeve and limits motion of the piston beyond the end of the piston sleeve.

In accordance with an embodiment of the invention there is provide a fluidic device comprising:

a fluidic opening linking a first fluidic circuit to a second fluidic circuit;

an arm comprising:
a cover disposed at a first end configured to cover the fluidic opening;
a mounting disposed at a second distal end; and
a shape metal alloy disposed along the arm having a first geometry below a threshold temperature and a second geometry above the threshold temperature; wherein below the threshold temperature the first geometry of the shape metal alloy either maintains the cover against the fluidic opening with a force or maintains the cover in a position such that the fluidic opening is open; and above the threshold temperature the second geometry of the shape metal alloy maintains the cover in the other of against the fluidic opening with a force or maintains the cover in a position such that the fluidic opening is open.

In accordance with an embodiment of the invention there is provide a fluidic device comprising:

an arm comprising:
a first end configured to engage a surface to close a fluidic path;
a mounting disposed at a second distal end of the arm; and
a shape metal alloy element attached to a first location on the arm, having a first geometry below a threshold temperature, and a second geometry above the threshold temperature; wherein below the threshold temperature the first geometry of the shape metal alloy either maintains the cover against the surface or maintains the cover in a position away from the surface; and above the threshold temperature the second geometry of the shape metal alloy maintains the cover in the other of against the surface or maintains the cover in a position away from the surface.

In accordance with an embodiment of the invention there is provide a fluidic device comprising:

an electromagnetically driven linear magnetic pump;

a fluidic chamber coupled to the electromagnetically driven linear magnetic;

a first Tesla non-return valve coupled to the fluidic chamber providing low resistance for fluid flow towards the fluidic chamber and high resistance for fluid flowing away from the fluidic chamber;

a second Tesla non-return valve coupled to the fluidic chamber providing low resistance for fluid flow away from the fluidic chamber and high resistance for fluid flowing towards the fluidic chamber;

a reservoir coupled to the first Tesla non-return valve to provide fluid to the electromagnetically driven linear magnetic pump and the second Tesla non-return valve to receive fluid from the electromagnetically driven linear magnetic pump;

a plurality of first non-return valves coupled to the first Tesla non-return valve for selectively passing or blocking fluid flow from the electromagnetically driven linear magnetic pump;

a plurality of second non-return valves coupled to the second Tesla non-return valve for selectively passing or blocking fluid flow to the electromagnetically driven linear magnetic pump; and a plurality of actuators, each disposed between a first non-return valve and a second non-return valve and performing an action in dependence upon a volume of the fluid within the actuator.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 depicts a perspective view of a linear magnetic moveable core (LMMC) according to an embodiment of the invention;

FIGS. 2A and 2B respectively depict two cross-sectional assembly perspective views of a LMMC according to an embodiment of the invention depicted in FIGS. 3A to 3C;

FIGS. 3A and 3B respectively depict exploded assembly perspective and cross-sectional exploded assembly perspective views of a LMMC according to an embodiment of the invention;

FIGS. 10A and 10B respectively depict closed and open cross-sectional views for a FFV according to an embodiment of the invention;

FIGS. 11A and 11B respectively depict variants of a FFV according to an embodiment of the invention;

DETAILED DESCRIPTION

Figure 4A:
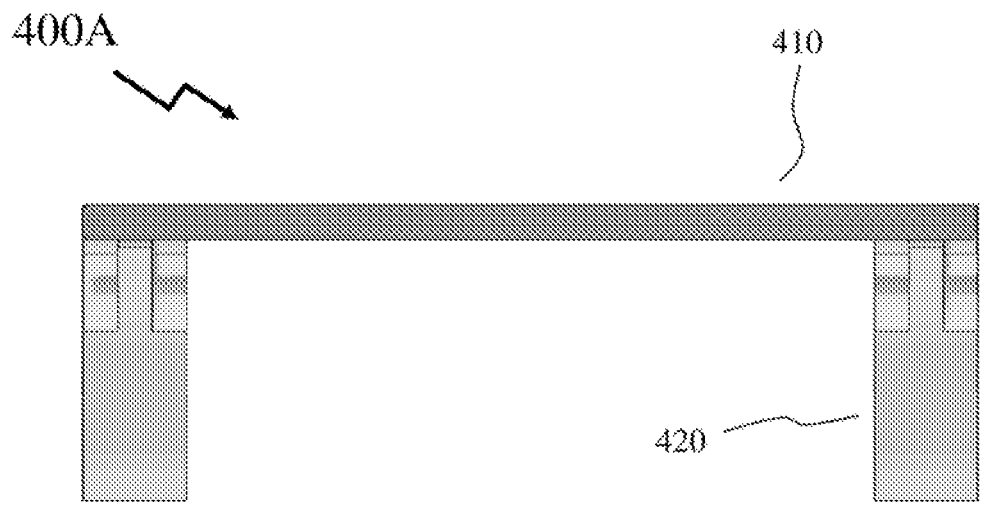
FIGS. 4A and 4B respectively depict an assembly jig for assembling an LMMC according to an embodiment of the invention.

The present invention is directed to hydraulic motors and pumps and more particularly to hydraulic valves and switches and more particularly to hydraulic valves and switches for consumer and non-consumer applications offering high efficiency, small footprint, low complexity and low cost.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, animals, pets, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "hydraulic device" or "hydraulic system" as used herein, and throughout this disclosure, refers to a hydraulic device, sub-system or system exploiting hydraulics for motion and/or actuation at least in part. A hydraulic device may be discrete or combined with other elements/devices/systems/sub-systems to provide one or more functions within a consumer or non-consumer device/system/sub-system. Such devices may, for example, be partially or wholly inserted within an orifice of the human body; attached and/or mounted to engage a specific region or portion of the user's body; worn by the user including those under, within, with or on top of clothing; mounted upon a surface and/or object allowing interaction with a user; be interactive with a user or users; and provide discrete and/or combined functions independent of the presence or absence of a user; and be part of mobile and/or non-mobile robotic systems. Such hydraulic devices may be functional, aesthetic, therapeutic, non-medical, and medical (e.g. drug delivery systems, medical testing and diagnosis devices).

A "nubby" or "nubbies" as used herein, and throughout this disclosure, refers to a projection or projections upon the surface of a device intended to provide additional physical interaction. A nubby can be permanently part of the device or it can be replaceable or interchangeable to provide additional variation to the device.

A "balloon" as used herein, and throughout this disclosure, refers to an element intended to adjust its physical geometry upon the injection of a fluid within it. Such balloons can be formed from a variety of elastic and non-elastic materials and be of varying non-inflated and inflated profiles, including for example spherical, elongated, wide, thin, etc. A balloon may also be used to transmit pressure or pressure fluctuations to the device surface and user where there is an inappreciable, or very low, change in the volume of the balloon.

A "massager" as used herein, and throughout this disclosure, refers to any item that can be used for the manipulation of superficial and deeper layers of muscle and connective tissue using various techniques, to enhance function, aid in the healing process, decrease muscle reflex activity, inhibit motor-neuron excitability, promote relaxation and well-being, and as a recreational activity. Accordingly, such massagers may be used upon tissues including, but not limited to, muscles, tendons, ligaments, fascia, skin, joints, or other connective tissue, lymphatic vessels, organs of the gastrointestinal system, hands, fingers, elbows, knees, legs, arms, and feet.

"Clothing" as used herein, and throughout this disclosure, refers to an item or items designed and/or intended to cover one or more predetermined regions of a user's body either by the user physically fitting their body within the item(s) of clothing and/or being draped, wrapped, or otherwise attached to the user. Such clothing may include, but not be limited to, casual clothing, work clothing, clothing for play, sports clothing, and protective clothing. Examples of items of clothing include, but are not limited to, shirts, t-shirts, pants, shorts, trousers, vests, jackets, dresses, skirts, sweaters, hoodies, underwear, lingerie, coats, head bands, scarves, belts, hats, scarves, socks, shoes, and boots. Items of clothing may be made from one or materials including, but not limited to, cotton, wool, leather, rubber, latex, nylon, and polyester.

Within the following description descriptions for the sake of providing references associated with embodiments of the invention references are made to a particular product category or product, e.g. massagers or toys, however such associations are purely for sake of improving the reader's understanding of the embodiments of the invention and are not intended to limit or define the applications of the different aspects of the invention and embodiments of the invention.

Electromagnetic Valves/Switches:

Referring to FIG. 1 there is depicted a perspective view of a linear magnetic moveable core (LMMC) 100 for implementing compact and low complexity fluidic switches according to an embodiment of the invention. This is then depicted in FIGS. 2A and 2B two mutually perpendicular cross-sectional assembly perspective views of the LMMC 100 according to an embodiment of the invention. Within these a piston 360 within a piston tube 350 is clearly visible together with a pair of annular coils 330 and an inner magnetic washer 340. It is also evident that the piston 360 when at either end of the LMMC 100 contacts a non-magnetic washer 320 and not an outer magnetic washer 310. Accordingly, the thickness of the non-magnetic washer(s) 320 allows the magnetic retention force between the piston 360 and the first magnetic washer 310 to be adjusted when no power is applied to either of the annular coils 330. It is also evident that fluid from an inlet which is coupled through aligned first openings within the magnetic washer 310 and non-magnetic washer 320 can be coupled to an outlet formed by the aligned second openings of the magnetic washer 310 and non-magnetic washer 320 via the region of the piston tube 350 between the magnetic washer 310 and non-magnetic washer 320 and the end of the piston 360 when the piston 360 is moved away from the non-magnetic washer 320. When the piston 360 moves to one end of the piston tube 350 then its closes the connection between an inlet and outlet at one end of the LMMC 100 and opens the connection at the other end. When the piston 360 moves to the other end then the closed connection is opened, and the open connection closed.

Referring to FIGS. 3A and 3B there are depicted exploded assembly perspective and cross-sectional exploded assembly perspective views of the LMMC 100 depicted in FIG. 1 according to an embodiment of the invention. Accordingly, at either end there are first magnetic washers 310 wherein each has a pair of openings separated by central element which is intended to align with a mating external assembly having first and second fluidic channels aligning to the pair of openings and separated by a central "wall" that aligns to the central element. Each outer magnetic washer 310 abuts an annular coil 330. Disposed within the outermost end of each annular coil 330 is a non-magnetic washer 320 which has a pair of openings and central element aligned to those within the outer magnetic washers 310. Between the non-magnetic washers 320 is piston tube 350 within which the piston 360 moves wherein the outer diameter of the piston tube 350 is dimensioned to fit within the annular coils 330. Disposed around the piston tube 350 between the annular coils 330 is inner magnetic washer 340. Optionally, inner magnetic washer 340 may be omitted from other embodiments of the invention.

In operation the piston is driven to one end or the other of the LMMC 100 under action of one or other or both annular coils 330 which when electrically energized create a magnetic field acting upon the piston 360. However, once driven to one end of the other the annular coil(s) 330 may be de-energized as the magnetic attraction between the first washer magnet 310 and the piston 360 maintains the piston in position against the non-magnetic washer 320. The magnetic force may be adjusted lower/higher by increasing/decreasing the thickness of the non-magnetic washer 320.

Figure 4B:
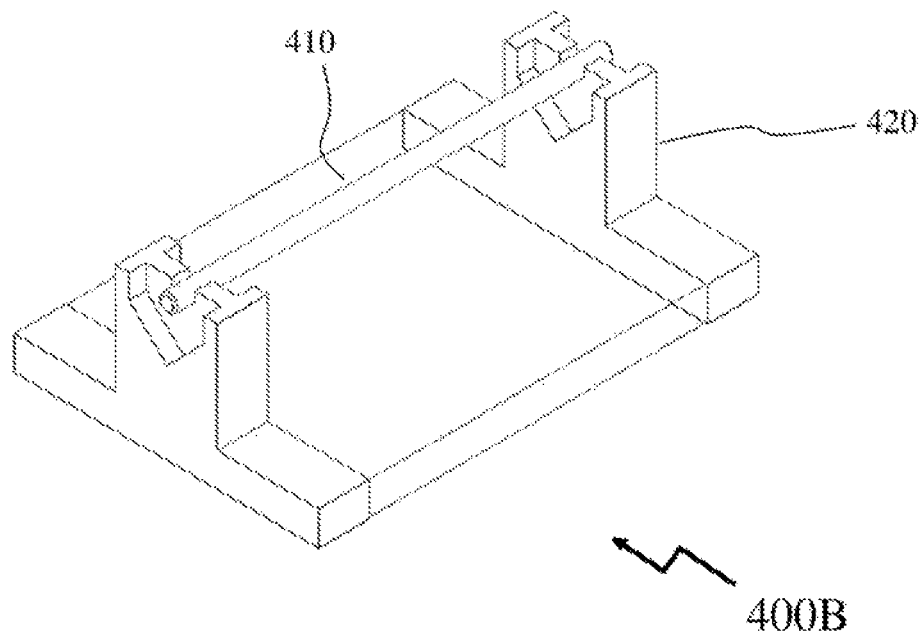
Figure 5A:
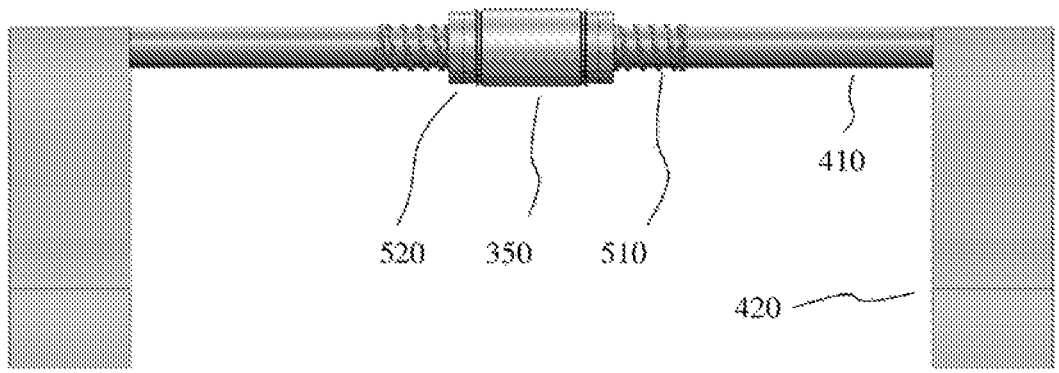
FIGS. 5A to 5C respectively depict an initial step in the assembly of a LMMC according to an embodiment of the invention with spring based centering of an inner sleeve upon an assembly jig.
Figure 5B:
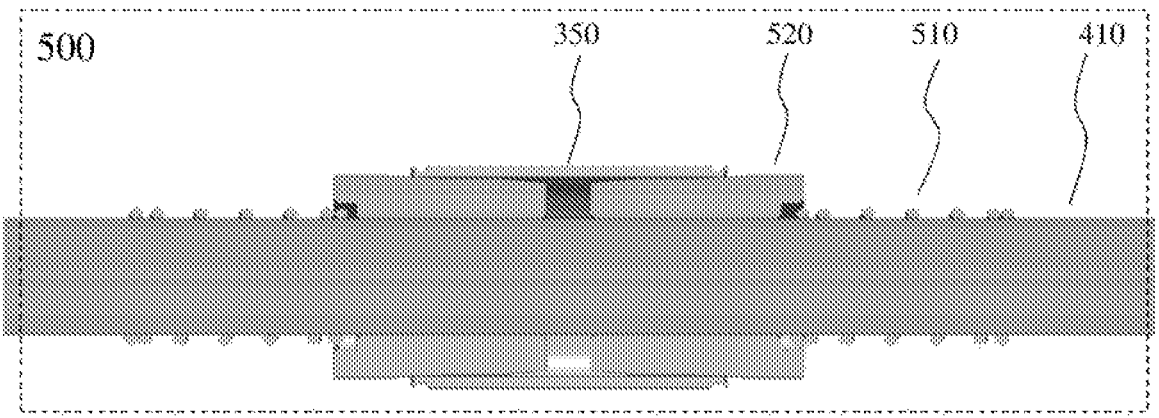
Figure 5C:
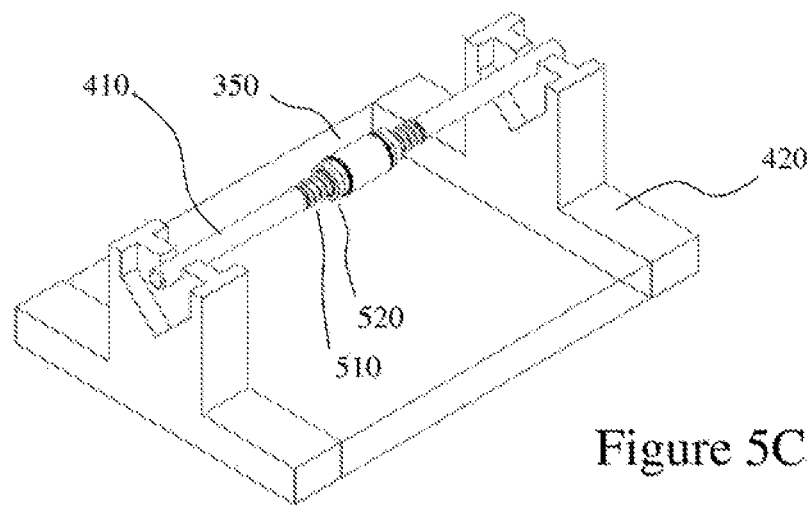

Referring to FIGS. 4A and 4B respectively there are depict cross-sectional 400A and perspective views 400B of an assembly jig for assembling a LMMC 100 according to an embodiment of the invention such as depicted in FIGS. 3A to 3E respectively. Accordingly, the assembly jig comprises first and second mounts 420 together with a support rod 410. Subsequently, as depicted in FIGS. 5A to 5C respectively, which depict an initial step in the assembly of a LMMC 100 according to an embodiment of the invention, the piston tube 350 is mounted upon the support rod 410 together with a pair of centering-aligning assemblies that each comprise a tube support 520 and spring 510. Accordingly, with the centering-aligning assemblies disposed upon the support rod together with the piston tube 350 then the piston tube 350 can be radially centered with respect to the support rod 410. Optionally, with the pair of mounts 420 disposed upon a base and a pair of spacer blocks mounted to the support rod (not shown for clarity) the piston tube 350 may be longitudinally as well as radially centered with respect to the support rod 410. The piston tube 350 together with the pair of centering-aligning assemblies being denoted as assembly 500 in FIG. 5B.

Figure 6B:
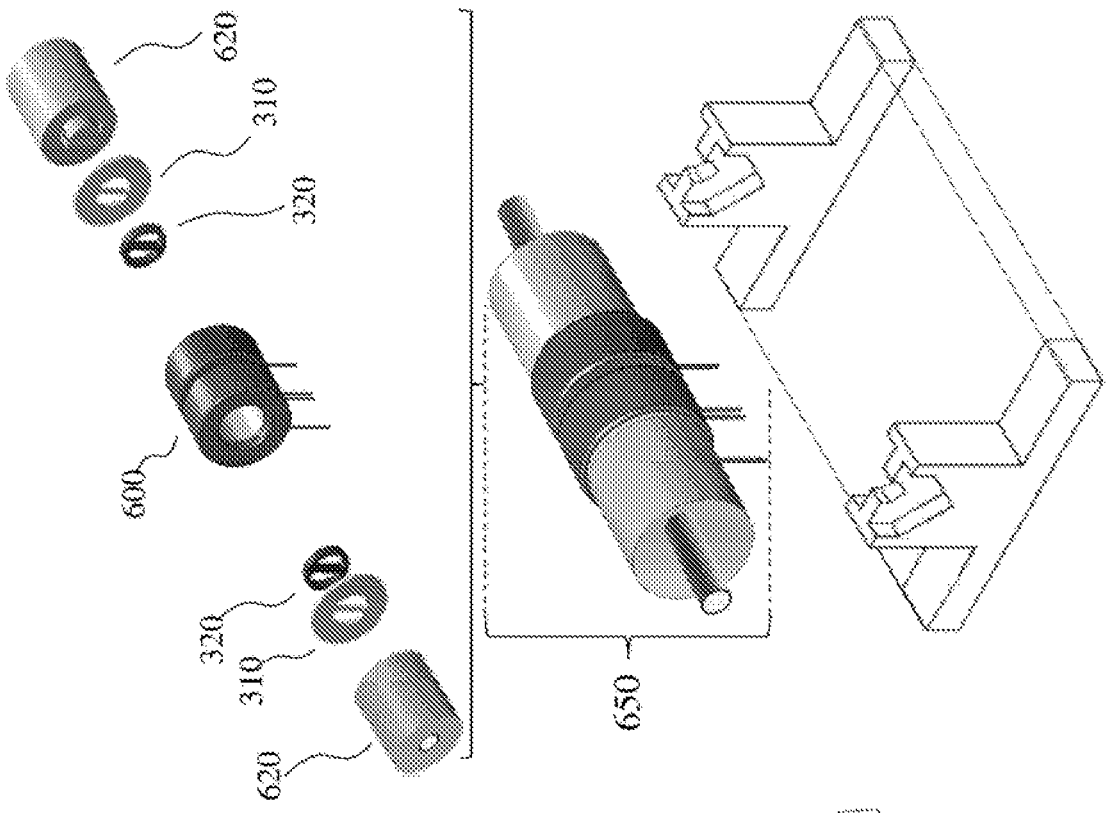
FIG. 6B depicts the assembly jig of FIGS. 4A and 4B together with the assembled LMMC according to the embodiment of the invention depicted in FIGS. 3A to 3E respectively with assembly tooling.
Figure 6A:
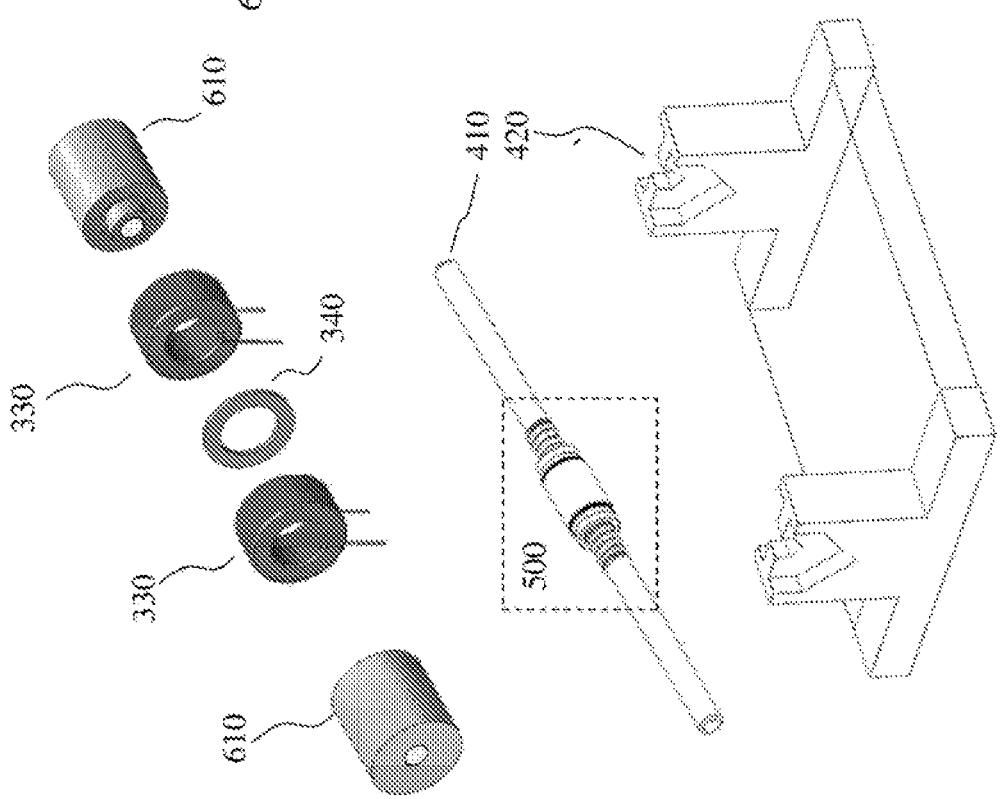
FIG. 6A depicts the assembly jig of FIGS. 4A and 4B together with the piece-parts of the LMMC according to the embodiment of the invention depicted in FIGS. 3A to 3E respectively.

Subsequently as depicted in FIG. 6A the support rod 410 with assembly 500 has the pair of annular coils 330 and second magnetic washer 340 mounted and aligned onto the piston tube 350 using the assembly jig in conjunction with a pair of first alignment guides 610 which are machined such that they fit onto the support rod 410 and have a tapered end to align an annular coil 330 to the piston tube 350. Now as depicted in FIG. 6B the assembled central assembly 600 resulting from the step depicted in FIG. 6A is assembled and aligned with first magnetic washers 310 and non-magnetic washers 320 via the assembly jig and a pair of second alignment guides 620 which have projections to align each non-magnetic washer 320 and first magnetic washer 310 together and with the central assembly 600. At this point the assembly can be fixed such that all elements are locked into position. Such "fixing" may include, but not be limited to, potting, soldering, capillary based epoxy etc.

Figure 6C:
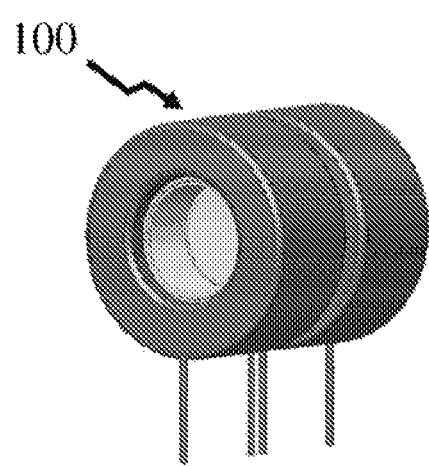
FIG. 6C depicts an interim sub-assembly within the provisioning of a LMMC as depicted in FIGS. 3A to 3E respectively wherein the interim sub-assembly may provide a core of an ECPUMP according to an embodiment of the invention.

It would be evident that the interim sub-assembly, namely the assembled central assembly 600, whilst forming a step within the provisioning of a LMMC 100 as depicted in FIGS. 3A to 3E respectively may provide a core of an electronically controlled pump according to an embodiment of the invention by replacing inlet/outlet feeds with inlet and outlet non-return valves (NRVs). The assembled central assembly 600 being depicted in enlarged form in FIG. 6C. Within this configuration the piston 360 moves in dependence upon the magnetic fields established within the annular opening of the annular coils 330. The pair of annular coils 330 may be connected in series or in parallel either directly, indirectly through electrical connections made to the wires of the annular coils, or indirectly through a circuit board/control circuit. Optionally, each actuation coil 330 may be connected individually to a control circuit. An example of a pair of actuation coils 330 directly connected to an electrical connector as part of the LMMC 100 is depicted in FIG. 33 with electrical connector 3310 connecting a pair of actuation coils 330 together to a common electrical header assembly for mating to a connector.

Figure 6D:
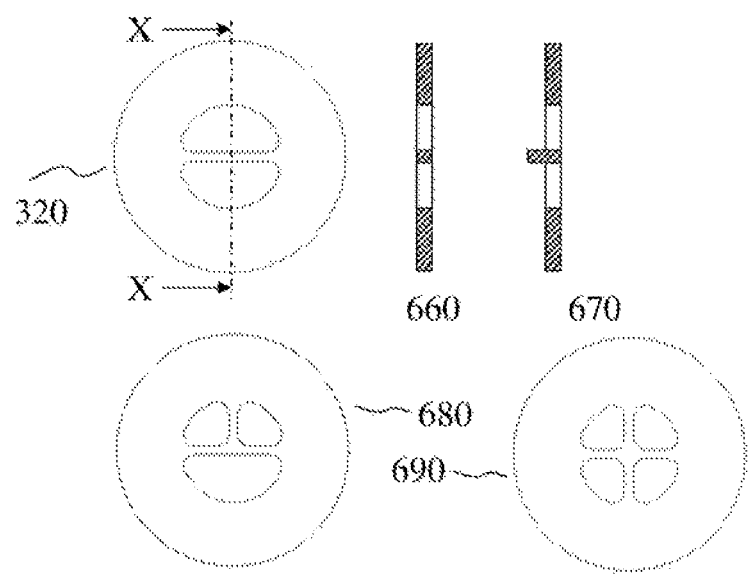
FIG. 6D depicts alternate designs for the magnetic and non-magnetic washers employed within the LMMC depicted in FIGS. 3 to 6C respectively.

Referring to FIG. 6D there are depicted alternate designs for the magnetic and non-magnetic washers employed within the LMMC 100 depicted in FIGS. 3 to 6C respectively. Within FIGS. 3A to 6C the magnetic washer 310 and non-magnetic washer 320 are depicted as having a pair of holes allowing the fluid to flow from an inlet to an outlet when the piston within the LMMC 100 Is in the appropriate position. This is depicted in FIG. 6D for non-magnetic washer 320 in plan and first cross-section view 660 wherein it is evident that the thickness of the non-magnetic washer 320 is uniform. However, in second cross-section view 670 the central portion between the holes is raised relative to the periphery of the non-magnetic washer 320. This allows for the spacing between the magnetic washer 310 and piston 360 to be varied thereby adjusting the magnetic force and thereby latching force of the LMMC 100 without adjusting the mounting of the non-magnetic washer 320 to the LMMC 100.

However, referring to second washer 680 the design has been adjusted for a single inlet-dual outlet or dual inlet-single outlet valve wherein the single hole on one side is now a pair of holes. In this manner two fluidic circuits can be connected to that port of the LMMC 100. This is extended in third washer 690 wherein the design is now dual inlet and dual outlet. The pattern of holes may be matching on both the non-magnetic washer 320 and magnetic washer 310 or alternatively may be implemented on only one or other. Alternatively, the original washer 310 can be employed with a modified housing that provides the dual inlets and/or dual outlets.

Figure 6E:
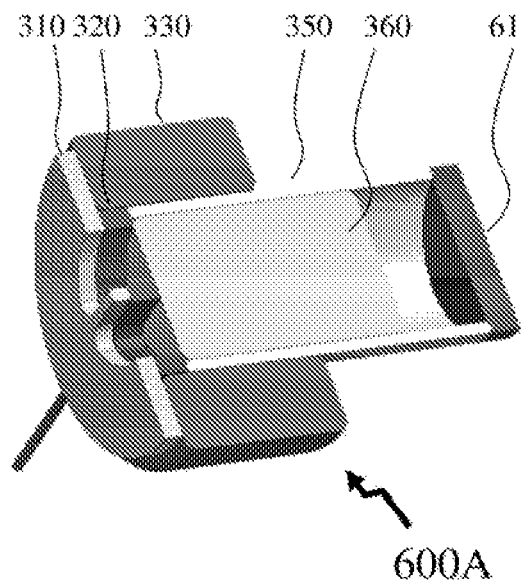
FIGS. 6E and 6F depict two cross-sectional assembly perspective views of the LMMC according to embodiments of the invention.
Figure 6F:
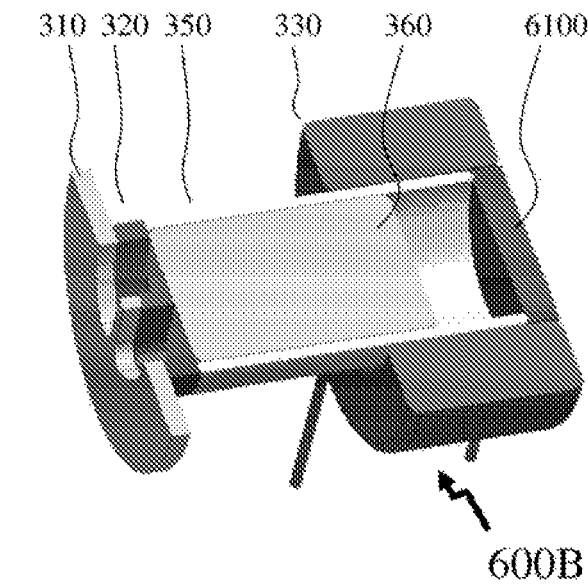

Now referring to FIGS. 6E and 6F there are depicted first and second cross-sectional assembly perspective views 600A and 600B of a single sided fluidic switch core according to embodiments of the invention which may be assembled with similar methodologies as that depicted in respect of FIGS. 4 to 6B respectively. As depicted each employs a first magnetic washer 310 and non-magnetic washer 320 at one end of the piston tube 350 with the other end blanked by blanking plate 6100. In each instance a single annular coil 330 is depicted although it would be evident that a configuration with a pair of annular coils 330 may be implemented within the scope of the invention as described. Whilst the single annular coil 330 depicted is positioned at one end or the other of the piston sleeve 350 and shorter than the piston 360 it would be evident that the annular coil 330 may be disposed in other positions relative to the piston sleeve 350 and the piston 360 when in either the closed or open positions of the single sided fluidic switch core.

Within other embodiments of the invention single actuator coil described and depicted with respect to FIGS. 6E and 6F, for example as well as other embodiments of the invention, may be in what is known as a "speaker coil" configuration wherein the coil is now stationary (compared with moveable in a loudspeaker for example) and the piston (magnet) is radially magnetized with or within an iron core rather than axially magnetised. The piston (magnet) may or may not extend out past the end of the coil. The magnetic path may be completed, for example, through the use of end washers, for example.

Whilst embodiments of the invention with respect to small fluidic actuators, fluidic valves etc. have been described supra and below in respect of exploiting electromagnetic pistons and linear motor action to move the piston it would be evident that multiple design options exist including, moving iron, moving magnet, speaker, and solenoid. Whilst within embodiments of the invention iron may be employed as the magnetic or magnetizable material it would be evident that other ferromagnetics may be employed including, but not limited to, rare earth magnets such as those based around neodymium. These are graded according to their maximum energy product, which relates to the magnetic flux output per unit volume. Higher values indicate stronger magnets and often range from N35 up to N52. The inventors have exploited N32 magnets and note that other values may also be employed which are lower, as well as higher. Magnets such as N15 to N28 may be employed.

Figure 7A:
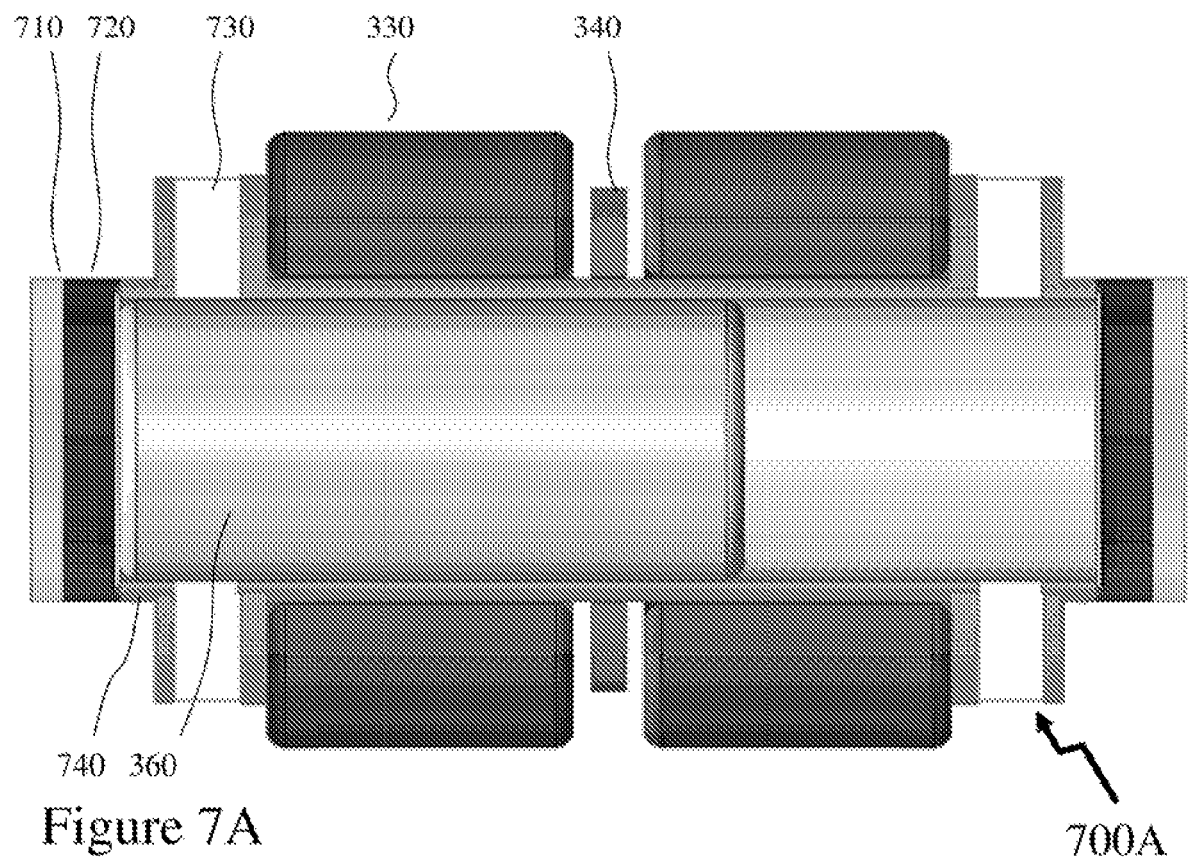
FIGS. 7A and 7B depict alternate designs of LMMC based valves according to embodiments of the invention.
Figure 7B:
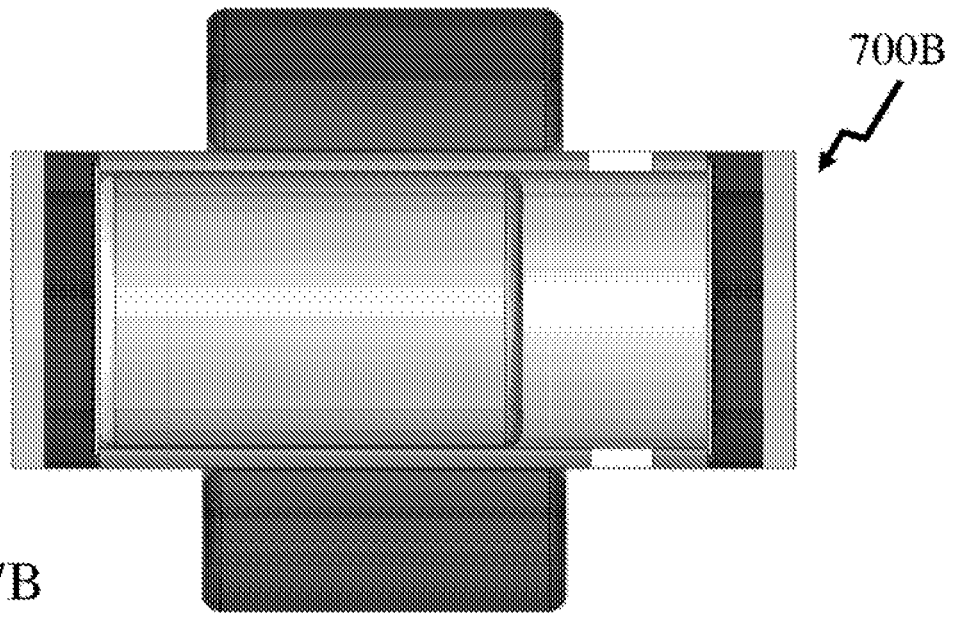

Referring to FIGS. 7A and 7B there are depicted first and second Valves 700A and 700B respectively exploiting the concepts described and depicted supra in respect of FIGS. 3A to 6F respectively. Accordingly, first Valve 700A exploits a pair of coils 330 together with central magnet 340 to move a piston 360 within a modified piston sleeve 740. Equally, the magnetic washer 710 and non-magnetic washer 720 are now simply flat solid elements without any through holes. The inlet-outlet ports 730 for the Valve 700A are now disposed within the modified piston sleeve 740. Accordingly, a single inlet-single outlet may be provided as may single inlet-dual outlet, dual inlet-single output, and multiple inlet-multiple outlet configurations by disposing the ports around the periphery of the modified piston sleeve or provided a single extended slot that then couples to multiple fittings. Other configurations may be considered for the external mechanical configurations without departing from the scope of the invention. It is evident that first Valve 700A provides dual valves wherein these are configured inversely so that when one is closed the other is open, and vice-versa. Referring to second Valve 700B a single valve configuration is depicted employing single coil.

Whilst the linear magnetically actuated cores depicted within FIGS. 3A to 7B employ dual excitation coils other embodiments of the invention may exploit a single coil. However, as the stroke within the LMMC 100 is typically larger than for an oscillating linear oscillating magnetic pump, in order to provide sufficient space for efficient fluidic "U-turn" or "180°", two coils and a central magnetic washer provide reduced drive power requirements.

Figure 8A:
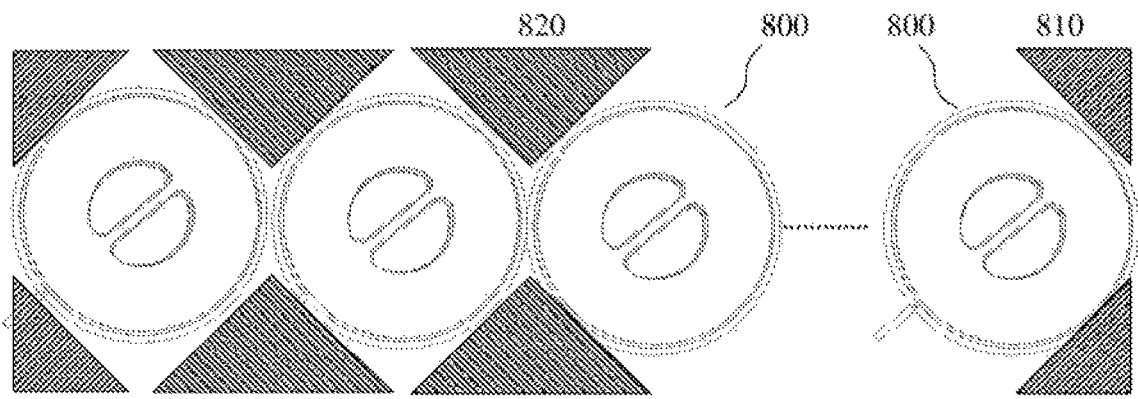
FIGS. 8A and 8B depict deployment of LMMCs according to an embodiment of the invention in linear array and two-dimensional (2D) array formats.
Figure 8B:
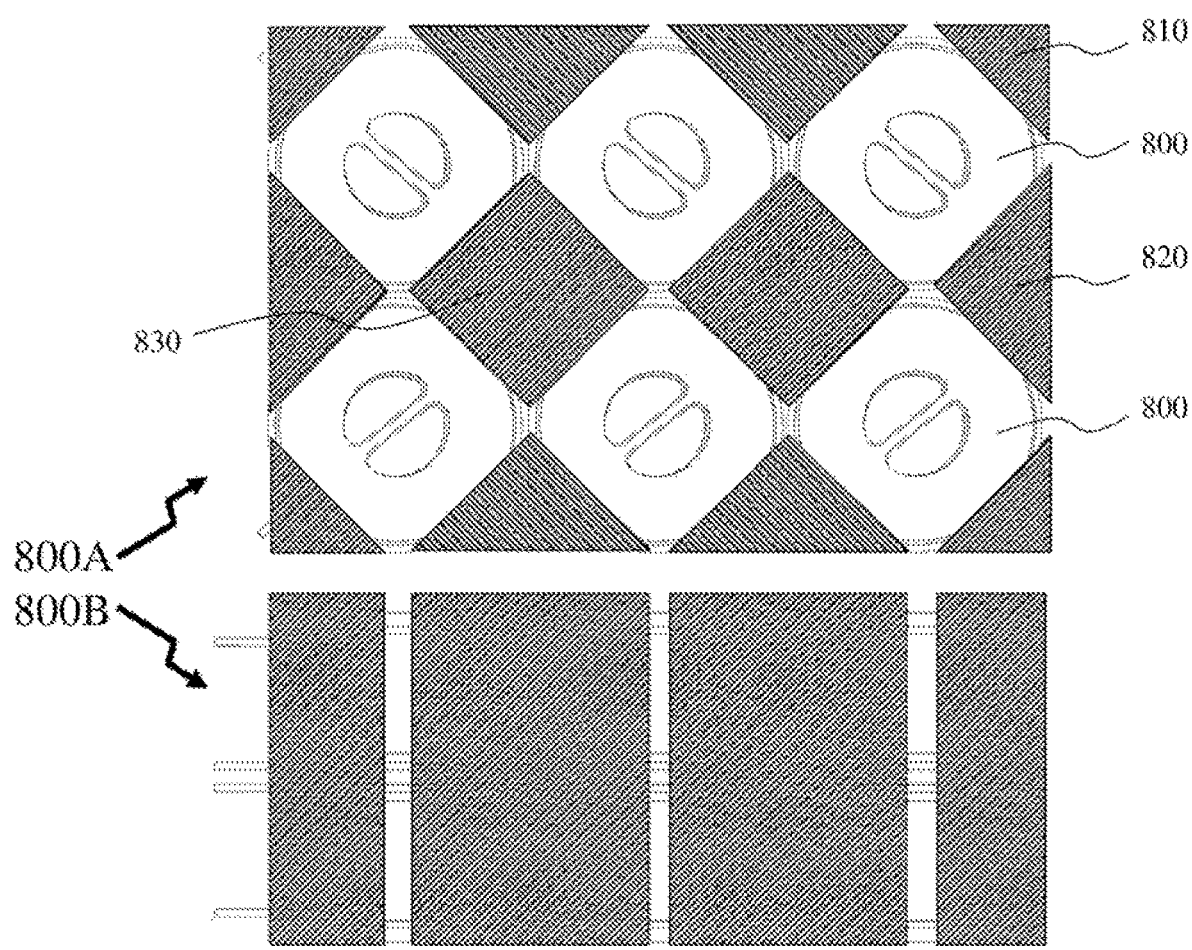

Accordingly, FIGS. 3A to 7B depict linear magnetic moveable core (LMMC) elements and fluidic switches/valves according to embodiments of the invention exploiting such LMMC elements. Whilst the configurations described and depicted are circular it would be evident that the annular coils may be formed with a square, hexagonal or other polygonal outer geometry either through an outer body forming part of the annular coils or when they are fixed via potting or after being affixed the assembly is potted. Accordingly, these LMMCs depicted in FIGS. 7A and 7B together with FIGS. 3A to 3E respectively may be configured in linear array and two-dimensional (2D) array formats as depicted in FIGS. 8A and 8B respectively. Referring to FIG. 8A the LMMCs 800 are disposed in a linear array with first and second supports 810 and 820 respectively at the array ends and midway between pairs of LMMCs 800 respectively. In contrast in FIG. 8B the LMMCs are disposed in a rectangular 2D array with first and second supports 810 and 820 around the edges and third supports 830 in the middle with groups of four LMMCs 800.

Figure 8C:
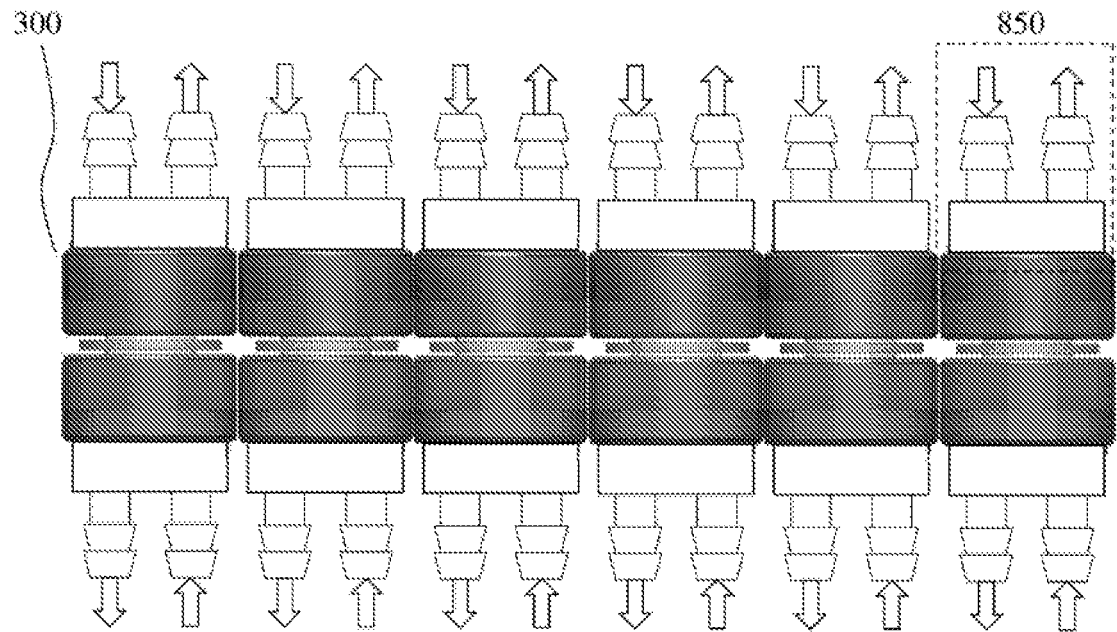
FIGS. 8C and 8D depict deployment of LMMCs according to an embodiment of the invention in linear array and embedded fluidic circuit linear array formats.

In contrast in FIG. 8C there is depicted a linear array of LMMCs 300 wherein each has a fluidic coupler 850 disposed upon it comprising an inlet and an outlet coupled to the holes within the magnetic washer 310 and non-magnetic washer 320 wherein within the fluidic coupler a wall isolates the inlet and outlet ports. Accordingly, with LMMCs 800 of 12 mm, 6 mm, 3 mm and 2 mm (0.5", 0.25", 0.125", 0.08"), for example, in respect of lateral dimension then densities of 2, 4, 8 and 12 devices per 25 mm (1") may be achieved with thicknesses of 12 mm, 6 mm, 3 mm and 2 mm (0.5", 0.25", 0.125", 0.08") respectively.

Figure 8D:
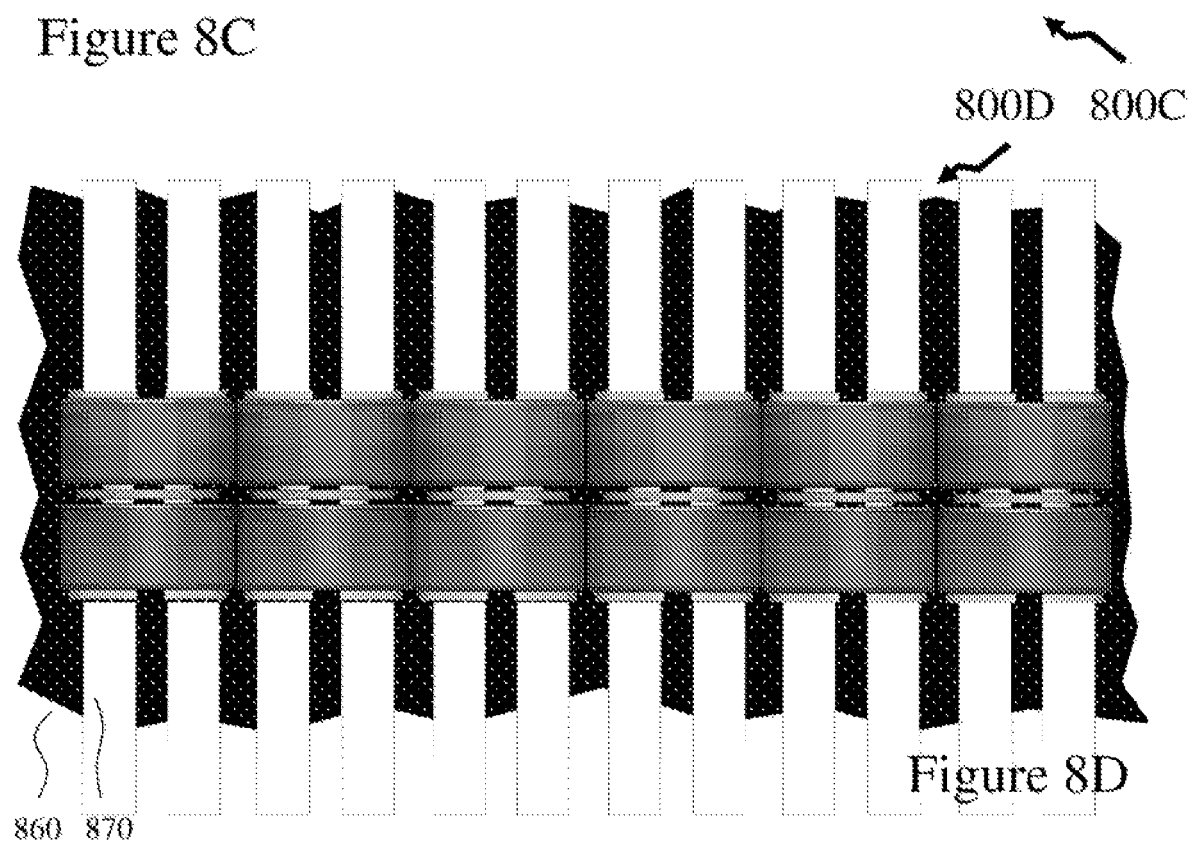

Within FIG. 8D a fluidic circuit 860 is depicted with fluidic channels 870 disposed within to form the inlet and outlet to each LMMC 300. The fluidic circuit 860 may be formed, for example, by molding top and bottom portions which are then joined together with the LMMC 300 disposed between them. In some embodiments of the invention the fluidic circuit 860 may be formed from a silicone or silicones whilst other materials may also be employed as evident to one of skill in the art providing the desired hardness, manufacturing compatibility, cost, hardness, elasticity etc. It would be evident that the arrays of LMMCs 300 may be configured into other configurations from linear and compact 2D array according to the design and configuration of the product and/or system within which the array of LMMCs 300 are employed. For example, within a foot massager the LMMCs 300 may be deployed in a 2D or three-dimensional configuration.

Embodiments of the invention described and depicted with respect to FIGS. 3A to 8D feature LMMCs that beneficially have a low complexity and low-cost design methodology. The magnetic washer and the non-magnetic washer (also may be viewed and considered as a gasket) may be stamped from sheet material and/or formed from molding. The latching force of the LMMC is simply varied through the gasket thickness such that as the distance between the magnetic washer and piston is increased/decreased the latch force is decreased/increased. Optionally, for increased latching forces the magnetic washer may additionally have a ridge across the central region that increases the magnetic flux concentration to the piston from the magnetic washer.

Optionally, the magnet may be an axial magnetized magnet formed from a powdered magnetic material embedded within one or more other materials which is then magnetized into what the inventor calls an axial magnetized magnet. The one or other materials provide the physical support for the magnetic material, e.g. ferromagnetic iron powder, and its shape etc. Such materials may include resins, thermoplastics, plastics, epoxies, low temperature glasses etc. Within another embodiment of the invention the piston may be formed from a laminated structure such that an alternating structure formed from layers of magnetic (or magnetizable) material are laminated with an electrically isolating material allowing Eddy currents within the piston to be suppressed. For example, thin magnetic discs may be stacked with thin plastic discs and potted/encapsulated within a casing or glued together/fused together. Optionally, the stacked structure may alternate along the length of the piston or it may be layer across the width of the piston. If non-uniform piston geometries are required then these can be implemented during manufacturing through varying geometry piece-parts or through machining an assembled stack of materials or a combination of both. A powder based magnetic material may be embedded into a layer, followed by a layer without the material, followed by another layer with the magnetic material. The thickness of electrically isolating layers may be less than, equal to, or thicker than the layers with magnetic materials.

Optionally, the design of a piston may include magnetic materials, e.g. iron, to form caps at either end of an axially magnetised piston body or a laminated piston body or other piston in order to improve the magnetic flux density or "focus" the magnetic flux within the piston relative to the magnetic field within the coil without the piston.

Embodiments of the invention described and depicted with respect to FIGS. 3A to 8D feature LMMCs employing a central magnetic washer within configurations having dual coils. This central magnetic washer provides increased latching force under no electrical excitation and reduces drive requirements to transition from one state to another. However, it may be omitted within other embodiments of the invention.

Flexible Shape Memory Valves:

It would evident that the LMMCs described and depicted in respect of FIGS. 3A to 8D exploiting electromagnetically driven pistons to open and close valves either directly or as part of fluidic switches represent a "fast" fluidic element capable of reconfiguring the fluidic circuit rapidly in a single action or repeatedly. However, whilst LMMCs exploiting electromagnetic actuation can be driven at lower speeds by their controller their geometry may not suit all applications even considering that the dimensions of the LMMC may be scaled such that the lateral dimensions are, for example, 12 mm, 6 mm, 3 mm, 2 mm (i.e. 0.5", 0.25", 0.125" and 0.080")

laterally and comparable axially. Accordingly, referring to FIGS. 9A to 9C respectively there are depicted a perspective view (FIG. 9A), closed cross-sectional view (FIG. 9B), and open cross-sectional view (FIG. 9C) for a Flexible Fluidic Valve (FFV) according to an embodiment of the invention which may provide fluidic valves and their correspondingly implemented fluidic switches in a smaller and thinner footprint than the LMMCs.

Figure 9A:
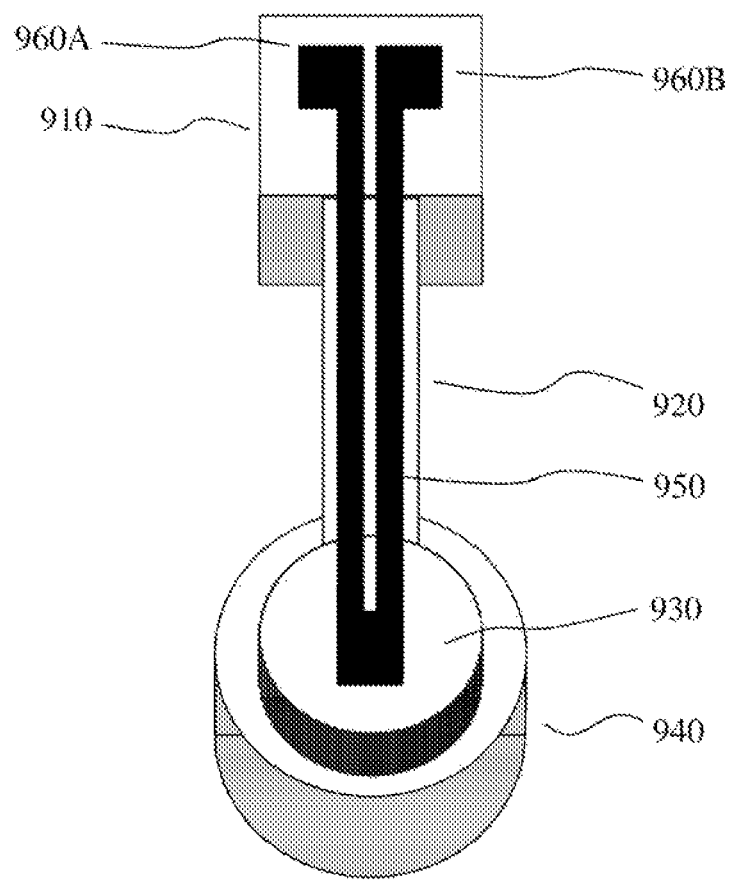
FIGS. 9A to 9C respectively depict a perspective view, closed cross-sectional view, and open cross-sectional view for a flexible fluidic valve (FFV) according to an embodiment of the invention.
Figure 9B:
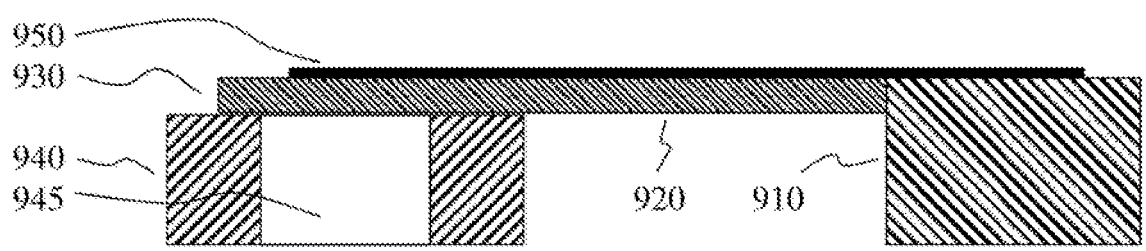
Figure 9C:
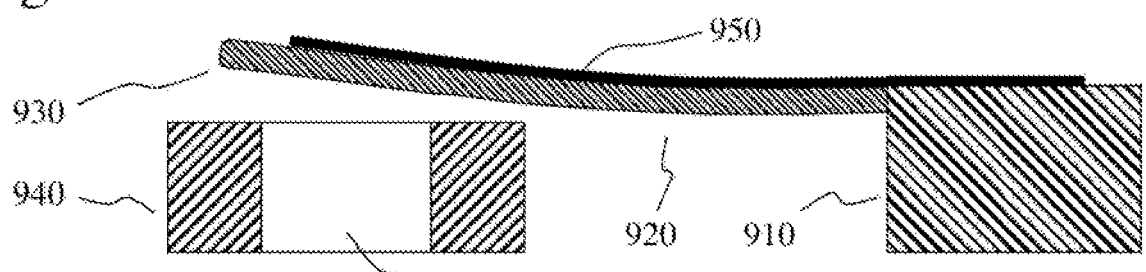

Accordingly, referring to FIGS. 9A to 9C respectively an opening 945 within a Fluidic Circuit Element (FCE) 945, e.g. an opening at the end of a tube, opening in the upper or lower wall of a fluidic channel, etc., is covered (in closed position in FIGS. 9A and 9B respectively) or exposed (in open position in FIG. 9C) by a flexible cover 930 which is attached to a flexible arm 920 attached at its other end to a support 910. Disposed upon the upper surface of the flexible cover 930, flexible arm 920, and support 910 is a conductive path 950 terminating in a first pair of terminals 960A and 960B respectively. If the conductive path 950 is formed from a Shape Memory Alloy (SMA, smart metal, memory metal, memory alloy, muscle wire, smart alloy) then in a first state below a critical temperature, $T_C$, the conductive path 950 is deformed by an elastic material forming the flexible cover 930 and flexible arm 920 such that the FFV is closed with the flexible cover 930 covering the opening 945.

However, in a second state above the critical temperature the SMA forming the conductive path 950 "remembers" its original shape and returns to this pre-deformed shape deforming the flexible cover 930 and flexible arm 920 such that the flexible cover 930 no longer covers the opening 945. The first state represents that when the conductive path 950 is at "ambient" temperature associated with the product, device, or system within which the fluidic circuit comprising the FFV forms part whilst a second state represents that when an electrical current is passed through the conductive path 950 heating the SMA past the critical temperature. The SMA may exhibit one-way or two-way shape memory and may, for example, be formed from copper-aluminium-nickel or nickel-titanium (NiTi) although others including, but not limited to, Fe—Mn—Si, Cu—Zn—Al, and Cu—Al-Nl may be employed. SMAs beneficially have a high level of recoverable plastic strain that can be induced through the flexure in the first state. Accordingly, the configuration in FIGS. 9A to 9C represents a SPST configuration with a normally "closed" valve i.e. no connection or "open" within an equivalent electrical circuit representation of the SPST.

Figure 9D:
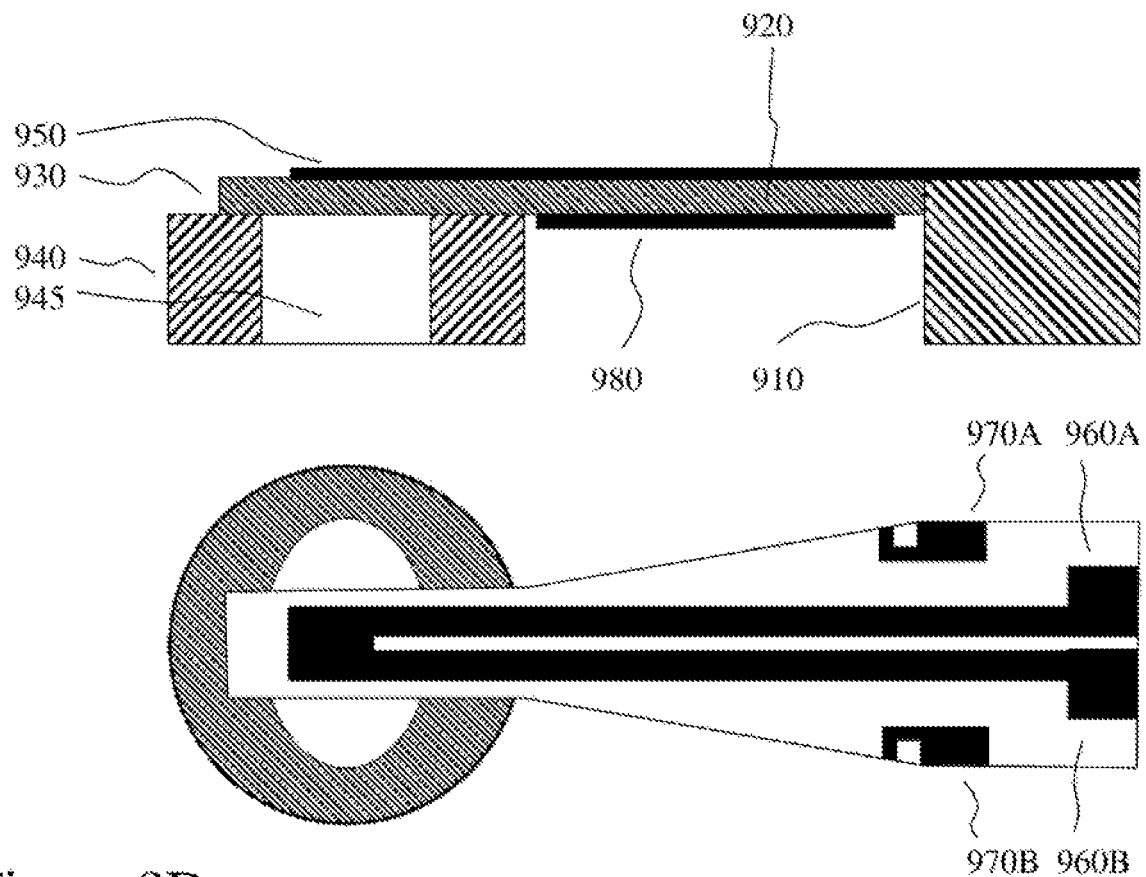
FIGS. 9D and 9E depict variants of FFVs according to an embodiment of the invention.
Figure 9E:
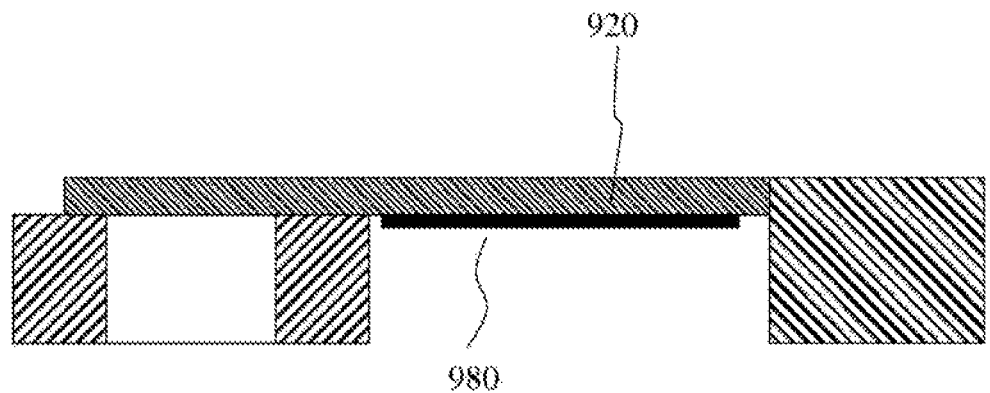

Optionally, referring to FIG. 9D a second conductive path 980 connected to a second pair of pair of terminals 970A and 970B respectively may be provided on the lower surface of the flexible arm 920 wherein with the first conductive path 950 energized the FFV is in a first configuration as the first conductive path 950 exceeds the critical temperature and the first conduction path 980 deforms to its "memory" shape and with the second conductive path 980 energized the FFV is in a second configuration as the second conductive path 980 exceeds the critical temperature and the second conduction path 980 deforms to its "memory" shape. FIG. 9E depicts a further FFV variant wherein only the second conduction path 980 is provided on the underside of the flexible arm 920 and selectively energized to control the FFV.

Whilst FIGS. 9A to 9E depict FFVs exploiting thin film SMA elements to provide electrical control of the FFV in one or both states an alternate design is depicted within FIGS. 10A and 10B respectively wherein closed and open cross-sectional views for a FFV according to an embodiment of the invention are depicted exploiting SMA 1020 in wire format. Within embodiments of the invention the wire format of SMA 1020 may comprise an SMA core surrounded by a thermally conductive paste and a compliant shell thereby allowing the cooling to be faster than within a bare SMA and comparable to the heating "speed." Accordingly, as depicted a lower surface 1040 has disposed above it a flexure arm 1050 having first and second ends 1010 and 1030 respectively to which the SMA 1020 is attached via first and second mounts 1060A and 1060B. The flexure arm 1050 being depicted as having a thickness, $t_1$, and a length, $l_1$. Accordingly, when heated the SMA may have been trained to contract when heated such that as depicted in FIG. 10B its length decreases to $l_3$ from the "deformed" $l_2$ thereby deforming the flexure into second state 1055 such that the second end is lifted away from the lower surface 1040 thereby opening the FFV.

Now referring to FIGS. 11A and 11B respectively there are depicted variants of a FFV according to an embodiment of the invention. Within FIG. 11A the shape of the SMA 1070 is varied away from a simple "linear" connection between the first and second ends 1010 and 1030 respectively such that for a given percentage change per unit length between the two states of the SMA 1070 increased overall length change is achieved. In contrast, in FIG. 11B the SMA 1080 is now attached between the second end 1030 of the flexure and lower surface 1040 such that in the heated contract state the SMA 1080 pulls the second end 1030 into contact with the lower surface 1040 and in the "cooled" state the second end 1030 can be lifted under pressure of the fluid being pumped. The flexure resilience may be adjusted through combination(s) of material selection, thickness ($t_1$), length, $l_1$, width ($w_1$) (not shown for clarity), as well as addition/removal of material within the flexure.

Figure 11C:
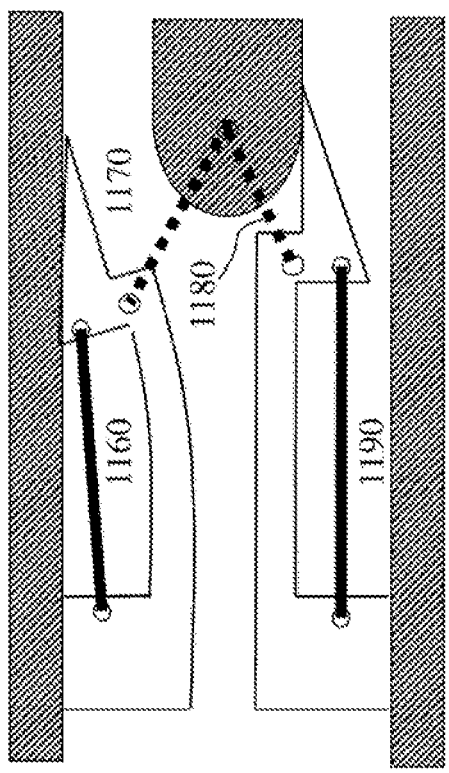
FIGS. 11C and 11D respectively depict closed and open cross-sectional views of a CFC-FFV according to an embodiment of the invention exploiting dual flexible actuator elements.
Figure 11E:
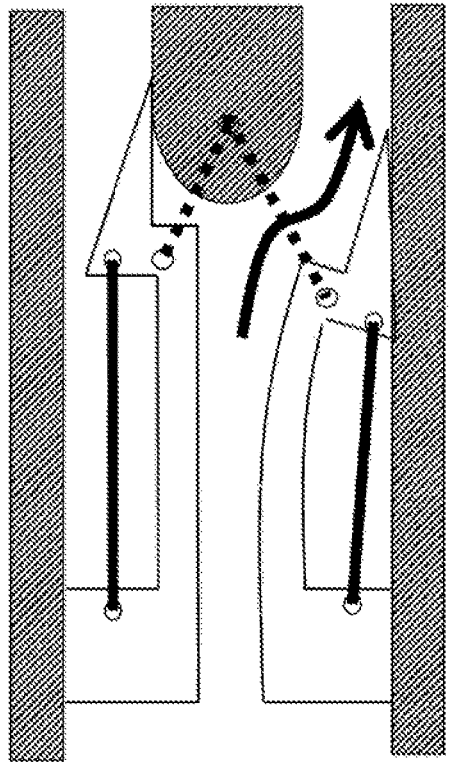
FIGS. 11E and 11F respectively depict a CFC-FFV 1×2 fluidic switch according to an embodiment of the invention exploiting dual flexible actuator elements.
Figure 11D:
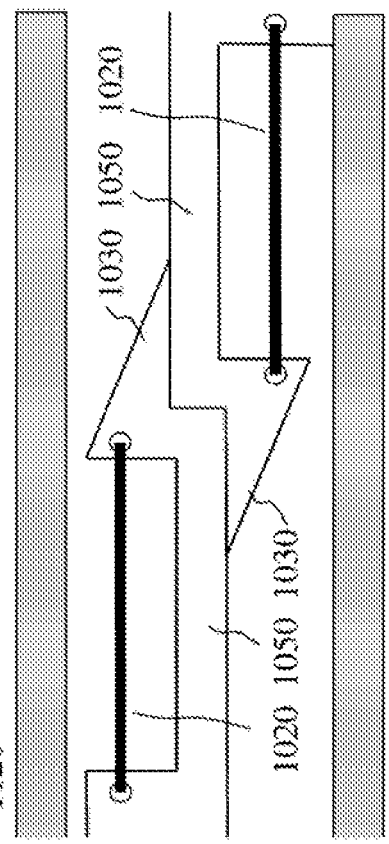

Alternatively, as depicted in FIGS. 11C and 11D respectively a FFV according to an embodiment of the invention exploiting dual flexible actuator elements is depicted in closed and open cross-sectional views respectively. Accordingly, a channel is depicted with upper and lower surfaces 1120 and 1130 respectively between which are disposed first and second flexible structures such as described in respect of FIG. 10A supra but with one inverted such that the second ends 1030 are engaged adjacent to each other in the closed configuration in FIG. 11C. Accordingly, heating of the SMA 1020 results in their contraction and the flexing of the flexures 1050 such that the "valve" opens. Recovery to the "closed" state may be achieved through the cooling of the SMA 1020 which is then distorted by the flexure returning to its initial non-deformed state. Optionally, as depicted in FIG. 11D secondary SMA 1110 may be disposed between the second end of each flexure and the opposite surface of the upper and lower surfaces 1120 and 1130 respectively to which each flexure flexes under the action of the SMA 1020. In this manner as the SMA elements 1020 cool the secondary SMA 1110 are heated.

Figure 11F:
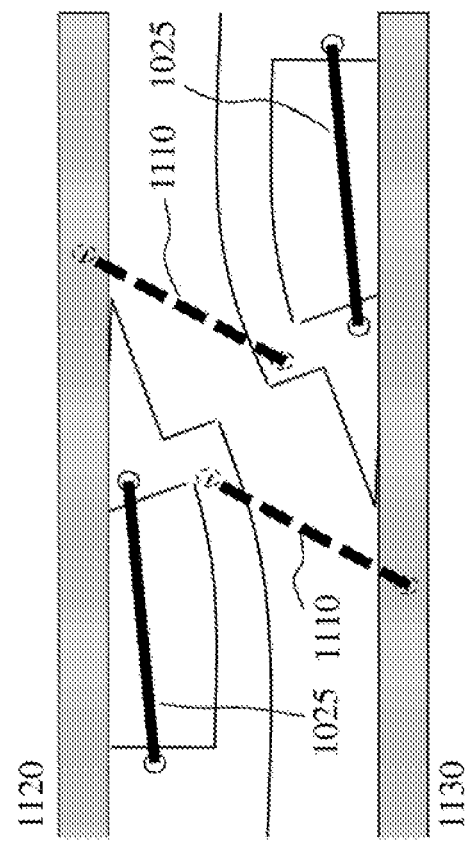

Alternatively, as depicted in FIGS. 11E and 11F respectively a pair of SMA flexure elements such as described supra in respect of FIGS. 10A to 11D may be employed to provide a 1×2 FFV fluidic switch according to an embodiment of the invention. The SMA flexure elements may be laterally disposed within a fluidic structure or alternatively vertically disposed. Optionally, secondary SMA elements may also be employed such that in each switch state the flexures are driven by an SMA. It would be evident that the 1×2 FFV fluidic switch provides four operating states according to the complexity of the driver as depicted in Table 1 below.

TABLE 1

States for 1 × 2 FFV Fluidic Switch of FIGS. 11E and 11F

| State | SMA Upper | | SMA Lower | | O/P 1 | O/P 2 |
|---|---|---|---|---|---|---|
| | #1 1160 | #2 1170 | #1 1180 | #2 1190 | | |
| 1 | OFF | ON | ON | OFF | 0 | 0 |
| 2 | ON | OFF | ON | OFF | 1 | 0 |
| 3 | OFF | ON | OFF | ON | 0 | 1 |
| 4 | ON | OFF | OFF | ON | 0.5 | 0.5 |

Optionally, a latching valve may be implemented wherein a pair of SMAs are employed such that in each state of the valve one of the SMAs maintains the state either where the SMA is electrically driven to maintain the latch state or beneficially wherein the latched state is in the cooler SMA state such that transitioning from one valve state to the other is achieved by electrically driving the SMAs together or in a specific sequence. Optionally, more SMAs may be employed in such a latching valve configuration such as SPST, SPDT, DPST etc.

Within an alternate FFV configurations a cover for the hole (valve) opening may be hinged itself and moved to provide the open/closed states or alternatively the cover for the hole (valve) opening may be pivoted/flexed into position(s). Within another embodiment of the invention the valve may comprise a valve body with a plurality of holes and a cover with a matching pattern of holes such that the cover is laterally moved to cover/uncover the holes where the range of motion is now determined by the dimensions of the holes than the overall dimensions of the valve. Again, though design of SMA actuators the valve may be latched into position.

Whilst flexible arms have been depicted in respect of FIGS. 9A to 11F for Compact Low Complexity-Flexible Fluidic Valve (FFV) designs according to embodiments of the invention it would be evident to one of skill in the art that optionally the arm may be rigid and hinged to provide the desired configurations in both states and motion between.

Compact Low Cost—Magnetic Linear Motor for an Electronically Controlled Pump

Figure 12:
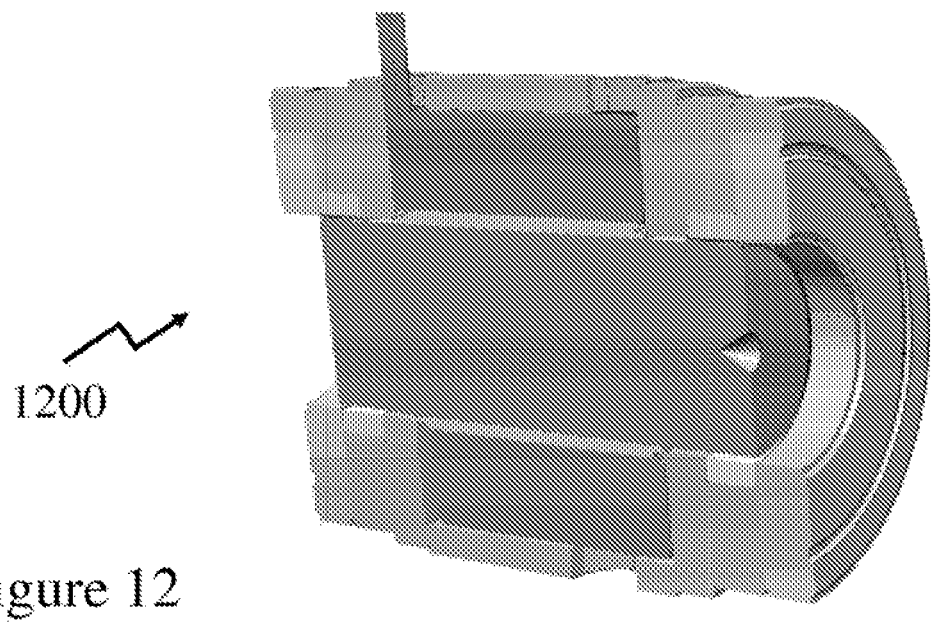
FIG. 12 depicts a LMMC according to an embodiment of the invention forming part of an electronically controlled pump according to embodiments of the invention.
Figure 13A:
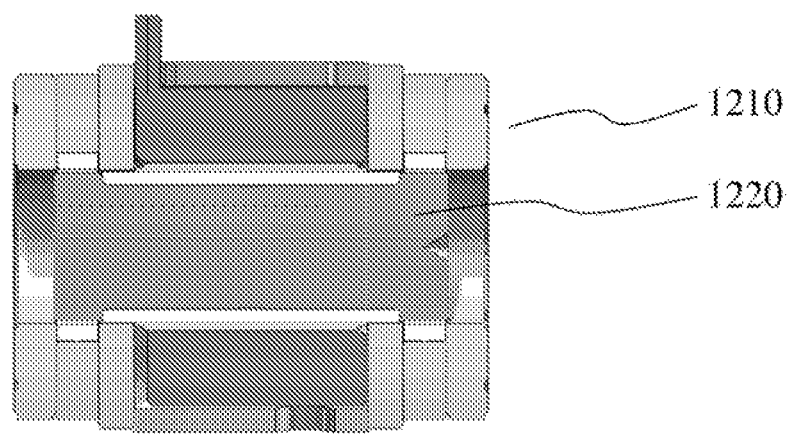
FIGS. 13A and 13B depict cross-sections of a LMMC according to an embodiment of the invention forming part of an Electronically Controlled PUMP (ECPUMP) according to embodiments of the invention.
Figure 13B:
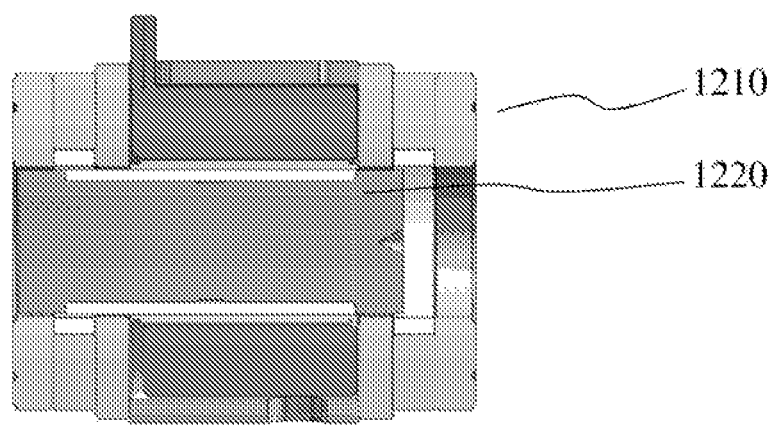

Now referring to FIGS. 12, 13A and 13B respectively there is depicted a linear magnetically moveable core (LMMC) according to an embodiment of the invention forming part of an electronically controllable pump according to an embodiment of the invention. In FIG. 12 the LMMC 1200 is depicted in perspective cross-section view whilst in FIGS. 13A and 13B respectively the LMMC is depicted in front cross-sectional view where the piston 1220 is within the LMMC body 1210 at its central position and limit of motion (in one direction) respectively.

Figure 13C:
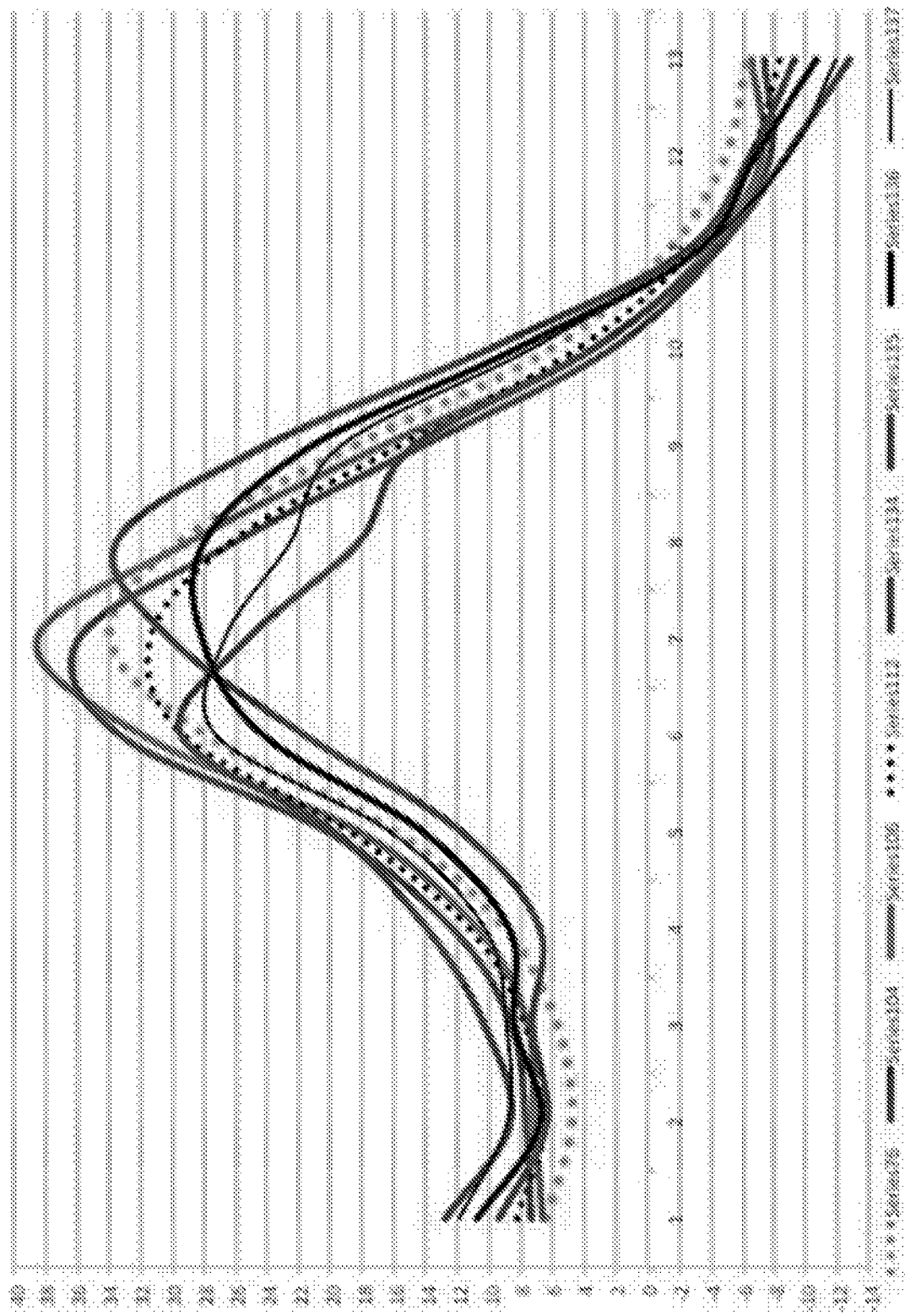
FIG. 13C depicts exemplary force-displacement curves for different dimensional configurations of the LMMC depicted in FIGS. 12 to 13B respectively.

Referring to FIG. 13C there are depicted exemplary force-displacement curves for different dimensional configurations of the LMMC depicted in FIGS. 12, 13A and 13B respectively wherein parameters such as magnetic washer thickness, piston length, non-magnetic washer thickness etc. are varied.

Figure 14:
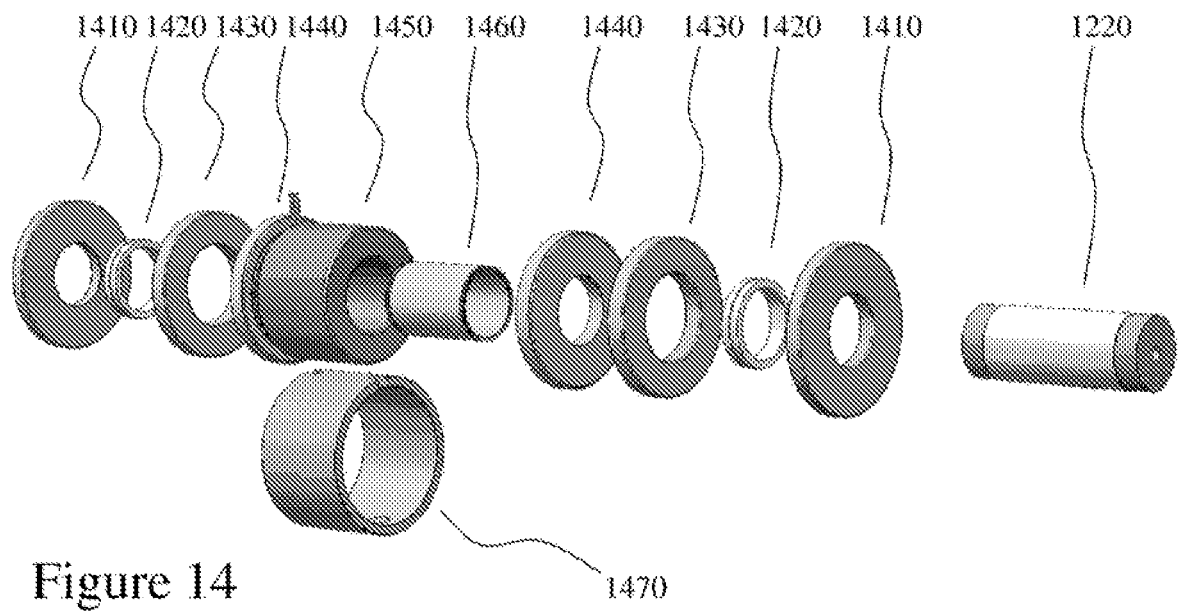
FIGS. 14 and 15 respectively depict an LMMC in whole and cross-sectional perspective exploded forms according to an embodiment of the invention.
Figure 15:
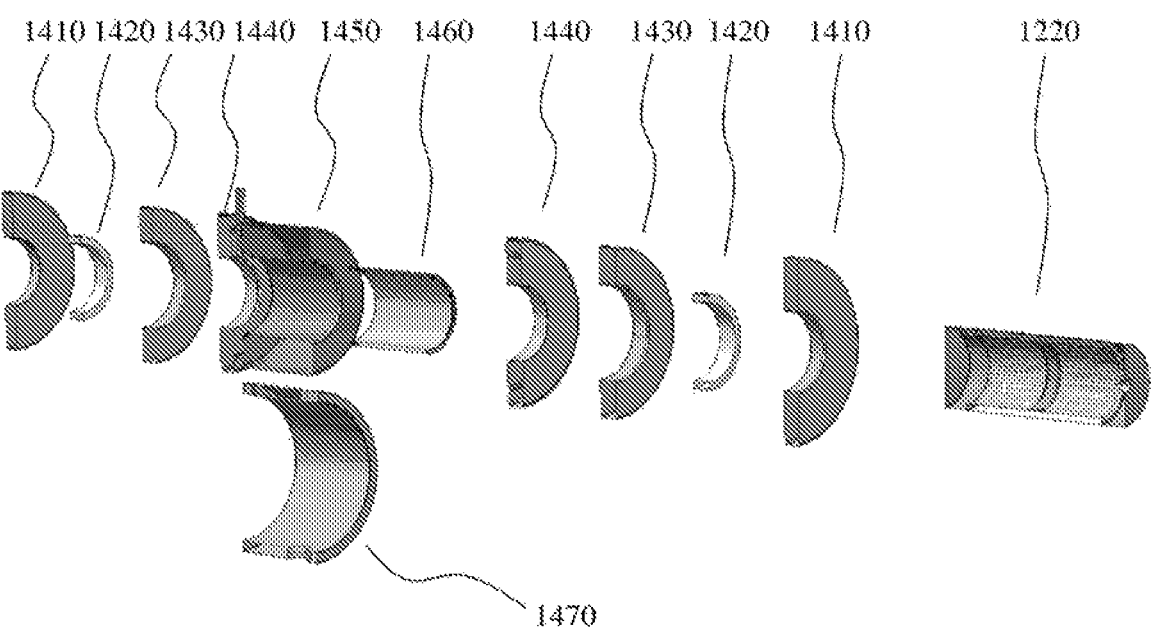

The LMMC 1200 is depicted in whole and cross-sectional perspective exploded forms according to an embodiment of the invention respectively in FIGS. 14 and 15. As depicted the elements of the LMMC are:

Piston 1220;
Outer washers 1410;
Magnet filler ring 1420;
Magnetic washer 1430;
Inner washer 1440;
Coil 1450;
Piston sleeve 1460; and
Coil casing 1470.

Within an embodiment of the invention an assembly jig for assembling an LMMC according to an embodiment of the invention such as LMMC 1200 depicted in FIGS. 12A to 15 respectively may be the same as that depicted in FIGS. 4A and 4B as employed to assemble a LMMC according to an embodiment of the invention. The jig comprises a support rod 410 together with a pair of supports 420 which in conjunction with simple tooling as will become evident in respect of FIGS. 16A to 20B respectively provide for a low complexity assembly process with a small kit of piece-parts which are similarly compatible with high volume manufacturing and low piece-part costs such that an overall LMMC 1200 may be implemented at low cost and with an easily scalable assembly process. The support rod 410 may be dimensioned and toleranced for inner bore of the piston sleeve 1460 so that assembly does not require additional jigging or the design may employ additional jigs such as depicted and described within the embodiment of the invention below in respect of FIGS. 16A to 20 wherein the same inner bore dimension is employed for the outer washer 1410, magnet filler ring 1420 and inner washer 1440 respectively.

Figure 16A:
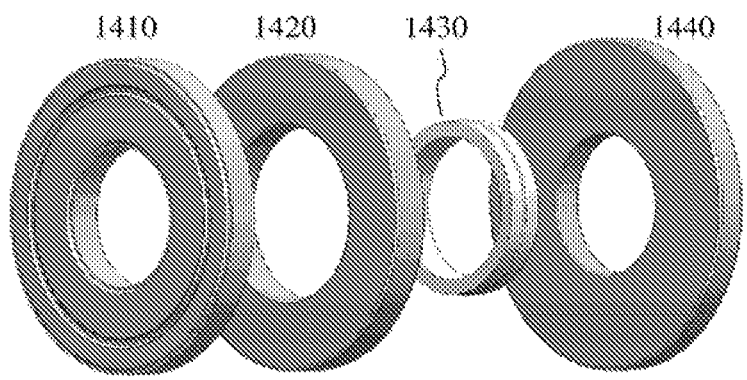
FIGS. 16A to 16C respectively depict a magnet assembly forming part of an LMMC according to an embodiment of the invention together with the magnet assembly upon the assembly jig (without assembly rods for clarity)
Figure 16B:
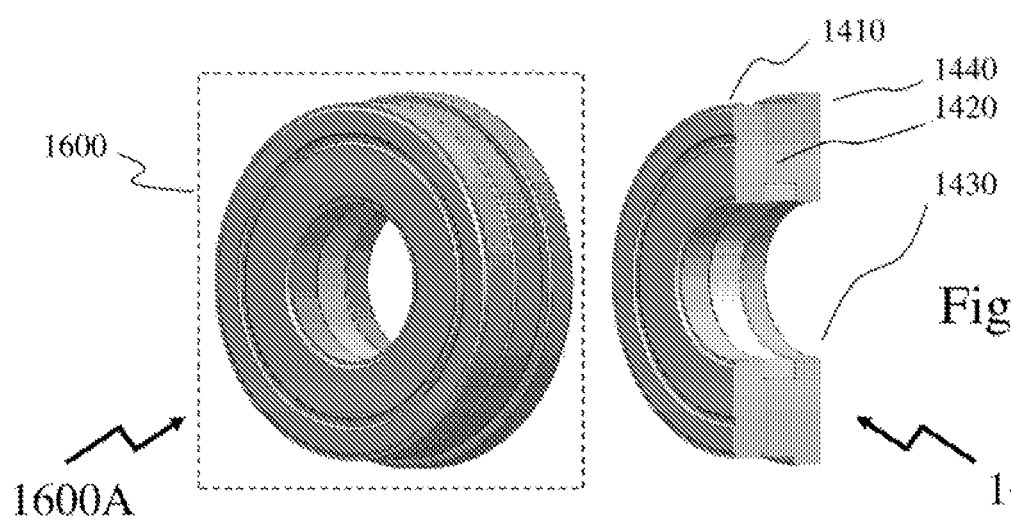
Figure 16C:
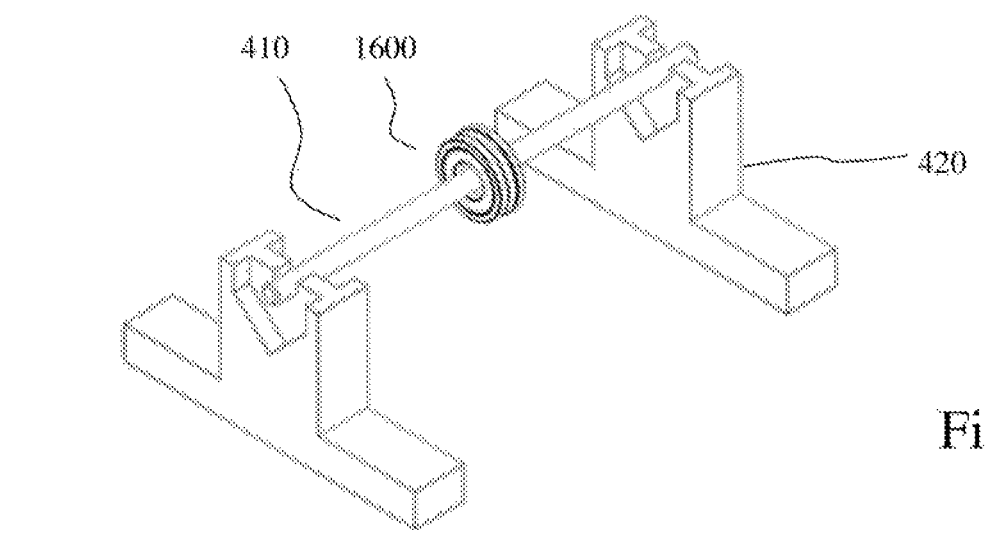
Figure 17A:
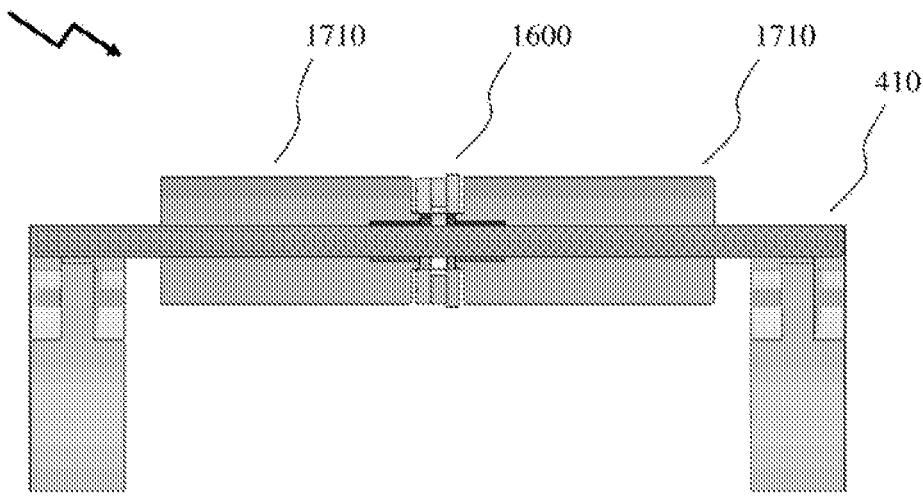
FIGS. 17A and 17B respectively depict a magnet assembly forming part of an LMMC upon the assembly jig according to an embodiment of the invention.
Figure 17B:
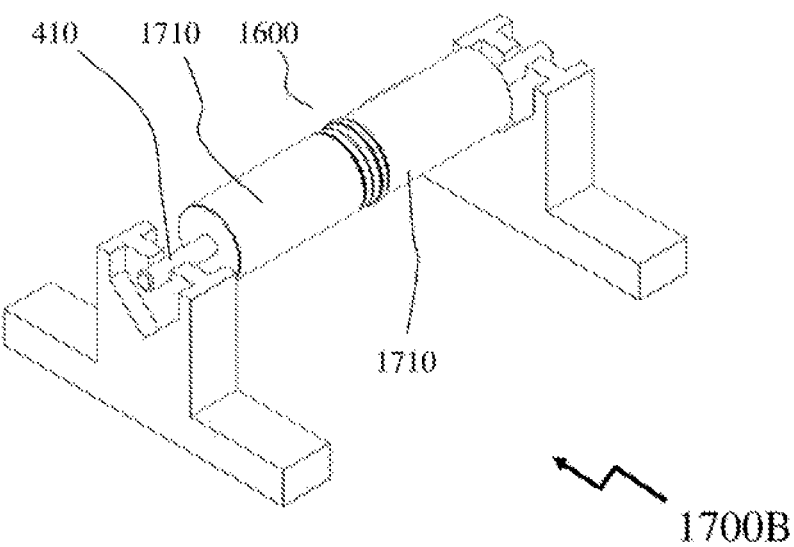

Initially as depicted in FIGS. 16A to 16C magnet assemblies are assembled to form part of the LMMC according to an embodiment of the invention. Referring to FIG. 16A the piece parts of each magnet assembly 1600 depicted in first image 1600A of FIG. 16B are depicted, these being:

Outer washers 1410;
Magnet filler ring 1420;
Magnetic washer 1430; and
Inner washer 1440.

The magnet assembly 1600 is depicted in FIG. 16B with three-dimensional (3D) perspective and 3D cross-sectional perspective views respectively. In FIG. 16C the assembly of the magnet assembly 1600 is depicted which is simply achieved by bringing the four components together upon the support rod 410 such that the spacer ring 1420 is disposed within the magnetic washer 1430 and then the outer washer 1410 and inner washer 1440 are disposed either side of the magnetic washer 1430. Where the support rod 410 is dimensioned and toleranced for the same inner bore dimension as that for the outer washer 1410, spacer ring 1420 and inner washer 1440 respectively then these all self-align upon the support rod 410 directly. Within embodiments of the invention where the inner and outer washers 1440 and 1410 respectively are formed from a ferromagnetic material, e.g. mild steel, steel or iron, then the magnetic assembly 1600 maintains physical cohesion once assembled upon the support rod. Accordingly, this process is repeated twice to generate the pair of magnetic assemblies 1600 for the LMMC according to an embodiment of the invention although care should be taken to ensure the correct magnet orientation of poles within each assembly. Optionally, the inner and outer washers 1440 and 1410 may be formed from a soft magnetic material or exploit a powdered metal embedded within a non-magnetic matrix, e.g. iron particles disposed within a resin which are subsequently aligned and magnetised by application of a large magnetic field.

Optionally, the magnetic washer 1430, inner washer 1440, outer washer 1410 and magnet filler ring 1420 where implemented as being magnetic may be an axial magnetized magnet formed from a powdered magnetic material embedded within one or more other materials which is then magnetized into what the inventor calls an axial magnetized magnet. The one or other materials provide the physical support for the magnetic material, e.g. ferromagnetic iron powder, and its shape etc. Such materials may include resins, thermoplastics, plastics, epoxies, low temperature glasses etc. Within another embodiment of the invention a washer or washer ring may be formed from a laminated structure such that an alternating structure formed from layers of magnetic (or magnetizable) material are laminated with an electrically isolating material allowing Eddy currents within the washer or washer ring to be suppressed. For example, thin magnetic discs may be stacked with thin plastic discs and potted/encapsulated within a casing or glued together/fused together. Optionally, the stacked structure may alternate along the length of the washer or washer ring or it may be layer across the width of the washer or washer ring. If non-uniform washer or washer ring geometries are required then these can be implemented during manufacturing through varying geometry piece-parts or through machining an assembled stack of materials or a combination of both. A powder based magnetic material may be embedded into a layer, followed by a layer without the material, followed by another layer with the magnetic material. The thickness of electrically isolating layers may be less than, equal to, or thicker than the layers with magnetic materials.

FIGS. 16A and 16B respectively depict a magnet assembly 1600 forming part of an LMMC 1200 upon the assembly jig according to an embodiment of the invention wherein the magnet assembly 1600 is formed between a pair of alignment tools 410 as the inner bores of the outer washer 1410, spacer 1420 and inner washer 1440 respectively, whilst the same, are larger than the support rod 410. Accordingly, the alignment tools 410 has a central bore dimensioned to the support rod 410 and at one end a projecting ring such that as the alignment tools are brought together they self-align the inner washer 1440 and outer washer 1410 with respect to one another. In another embodiment of the invention these projecting rings may also align the magnet washer 1430 and spacer 1420 at the same time whilst pushing the pair of alignment tools 410 together brings all elements of the magnet assembly 1600 into mechanical contact.

Figure 18A:
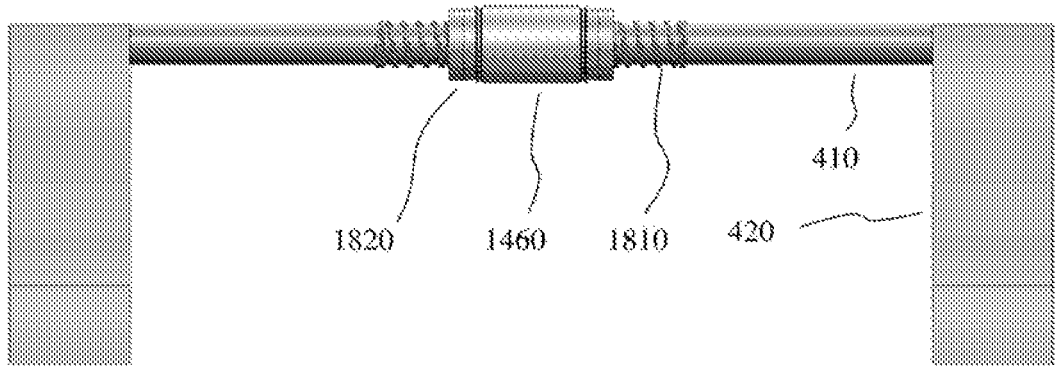
FIGS. 18A to 18C respectively depict an initial step in the assembly of a LMMC according to an embodiment of the invention with spring based centering of an inner sleeve upon an assembly jig.
Figure 18B:
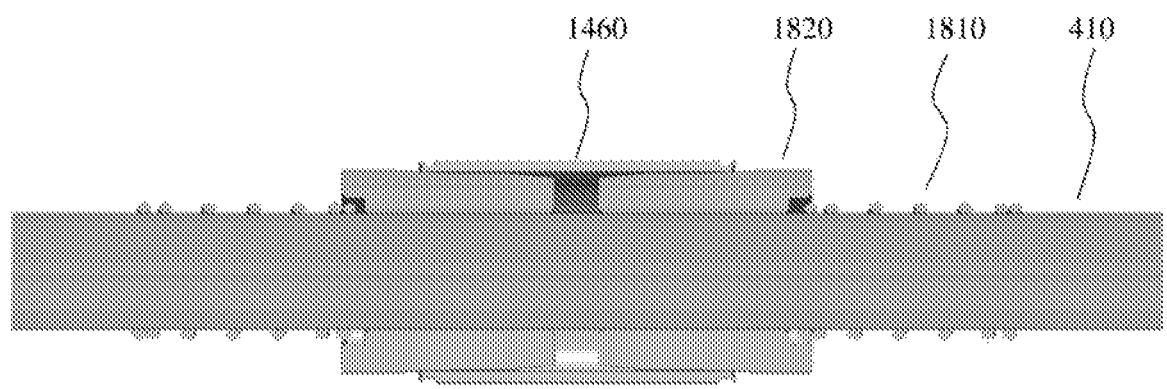
Figure 18C:
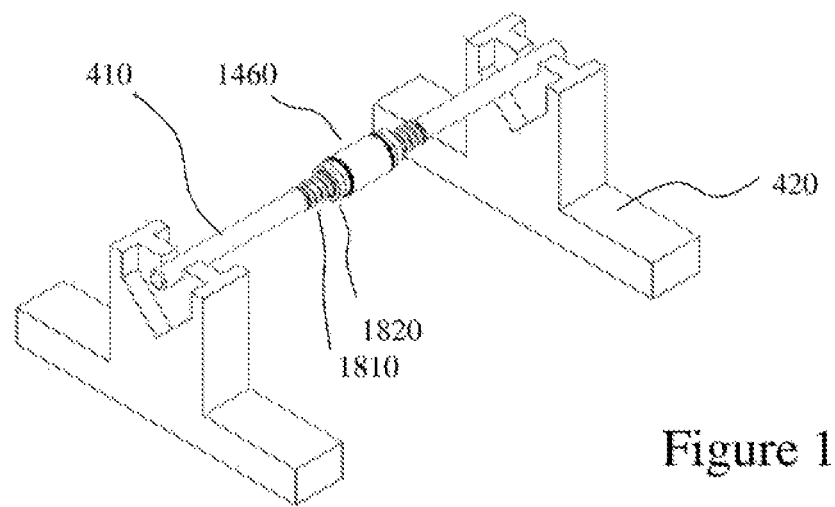

Now referring to FIGS. 18A to 18C respectively these depict a subsequent step in the assembly of a LMMC according to an embodiment of the invention with spring based centering of the piston sleeve 1460 upon the assembly jig. Accordingly, as depicted one each end of the support rod 410 a sleeve support 1820 is initially mounted followed by a spring 1810. The piston sleeve 1460 is slid onto the support rod and engaged with the sleeve supports 1820 and the springs 1810 through pushing the pair of alignment tools (not shown for clarity) in opposite directions with these elements disposed between.

Figure 19A:
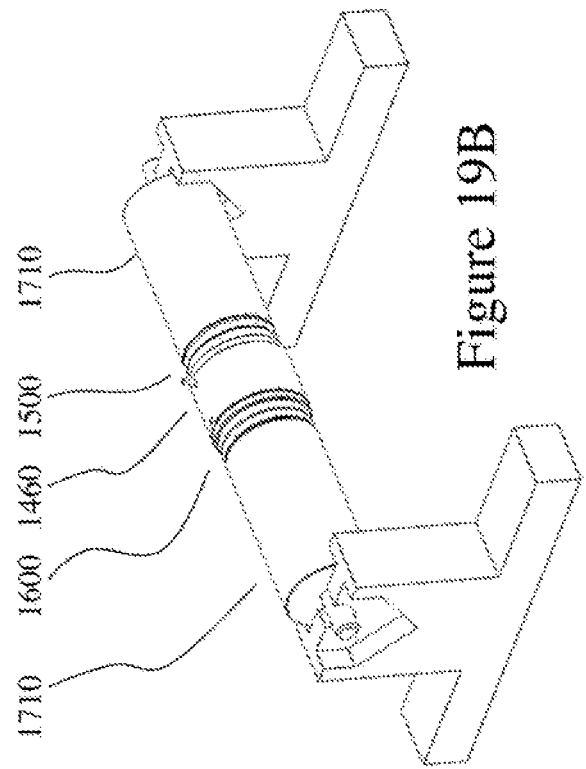
FIGS. 19A to 20B respectively depict subsequent steps in the assembly of a LMMC according to an embodiment of the invention with alignment tooling upon an assembly jig.
Figure 19B:
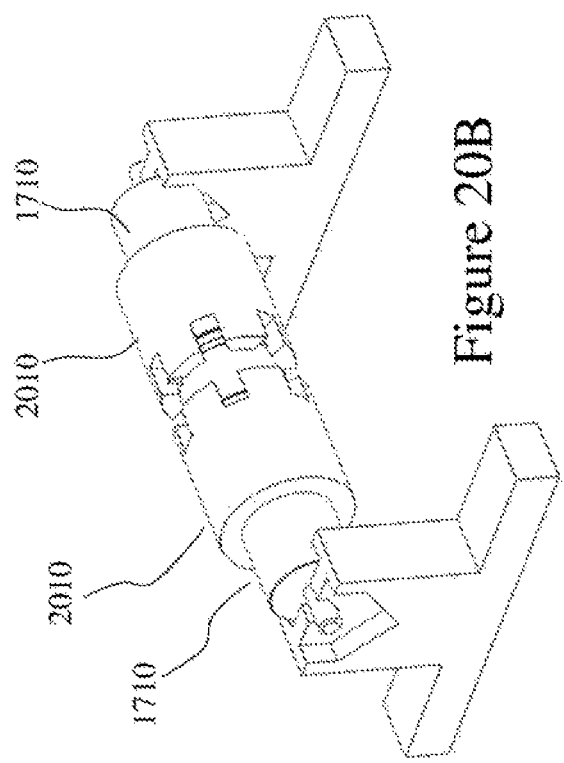
Figure 20A:
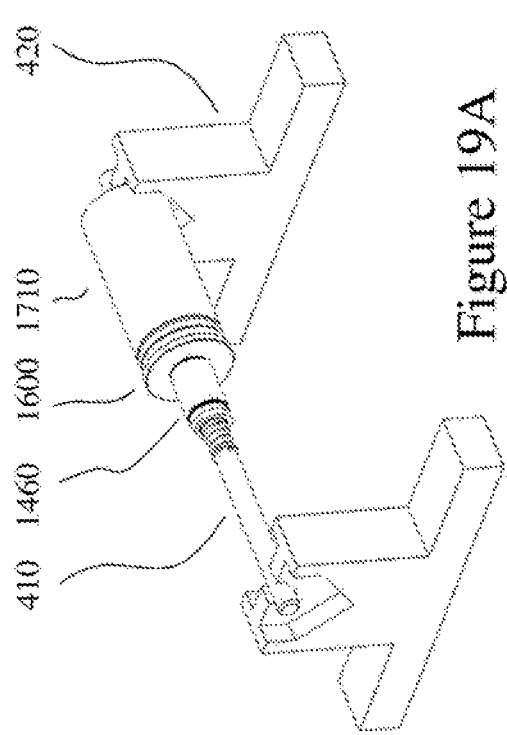
Figure 20B:
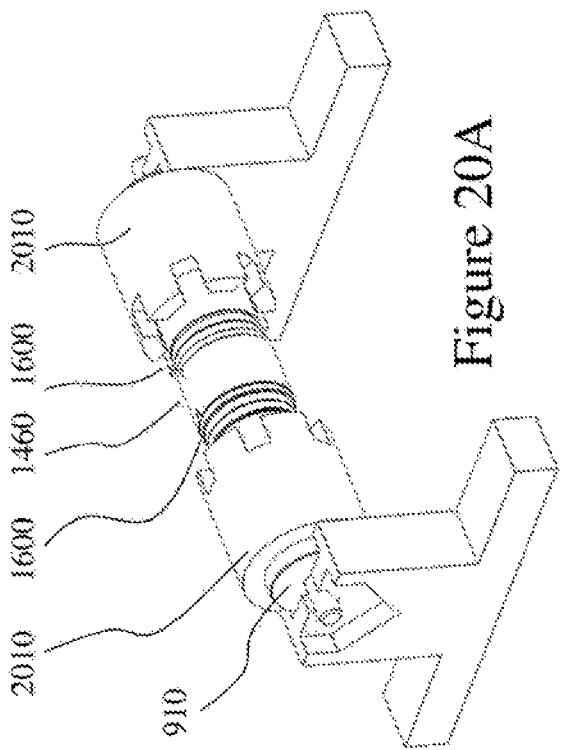

Subsequently as depicted in FIGS. 19A to 20B additional steps in the assembly of the LMMC 1200 according to an embodiment of the invention are implemented using alignment tooling in conjunction with the assembly jig. Considering these steps then these are:

FIG. 19A wherein a first magnet assembly 1600 and alignment tools 1710 are mounted to one end of the support rod 410 with the piston sleeve 1460 previously positioned and aligned as described in respect of FIG. 18C;

FIG. 19B wherein the coil 1450 (not visible) and coil casing 1470 have been assembled over the piston sleeve, the second magnet assembly 1600 positioned and then the other alignment tool 1710 mounted such that the alignment tools push the pair of magnetic assemblies 1600 against the piston sleeve 1460 as well as positioning the coil 1450 (not visible) and coil casing 1470;

FIG. 20A wherein second alignment tools 2010 are assembled over each of the alignment tools 1710; and FIG. 20B wherein the second alignment tools 2010 are closed together over each end of the LMMC 1200 in loose assembled state.

Figure 21A:
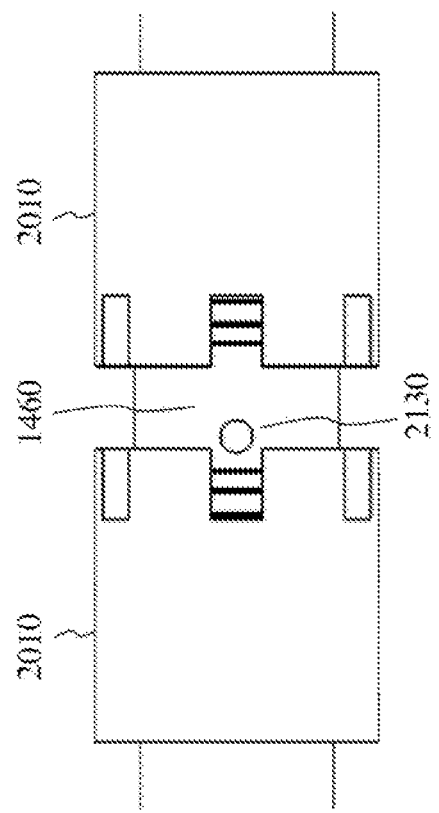
FIGS. 21A and 21B respectively depict an LMMC according to an embodiment of the invention with alignment tooling upon an assembly jig allowing the "potting" of the LMMC.
Figure 21B:
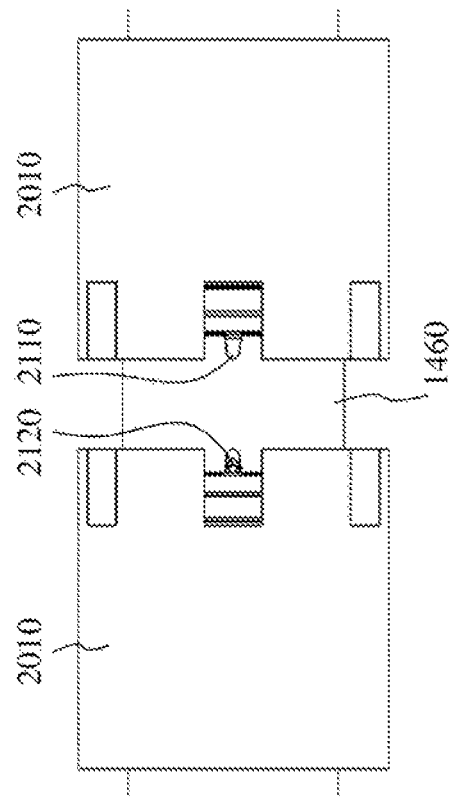

As evident in FIGS. 21A and 21B each second alignment tool 2010 has notches such that the second alignment tools 2010 can be closed with respect to each and allow the electrical leads of the coil to be fed out. As depicted in FIGS. 12 to 20B the LMMC 1200 has both leads exiting one end of the coil and hence LMMC 1200. However, the leads of the coil may be positioned such that they are at either end of the coil and hence LMMC 1200. This is more evident in FIG. 21A which depicts the central portion of a LMMC 1200 according to an embodiment of the invention within the alignment tooling upon an assembly jig. Accordingly, the pair of slots 2110 within the coil casing 1470 are evident with the "slot" of the second alignment tool 2010 as are the leads 2120 of the coil at one end. FIG. 21B depicts a bottom view of the assembly corresponding to the top view depicted in FIG. 21A. Accordingly, the vent hole/fill hole 2130 within the coil casing 1470 is visible.

Once assembled within the tooling as depicted then the coil casing 1470, coil 1450, and piston sleeve 1460 can be potted together and with the pair of magnet assemblies 1600. Alternatively, solder preforms may be employed within the assembly or deposited upon elements in the assembly such that the entire assembly can be heated, the solder reflowed, and the assembly "joined" at that point. Within another embodiment of the invention a pair of external frames may be employed in conjunction with the second alignment tools such that the pair of external frames are aligned and joined to each other, e.g. via snap fixtures, threaded fixturing etc.

Figure 22B:
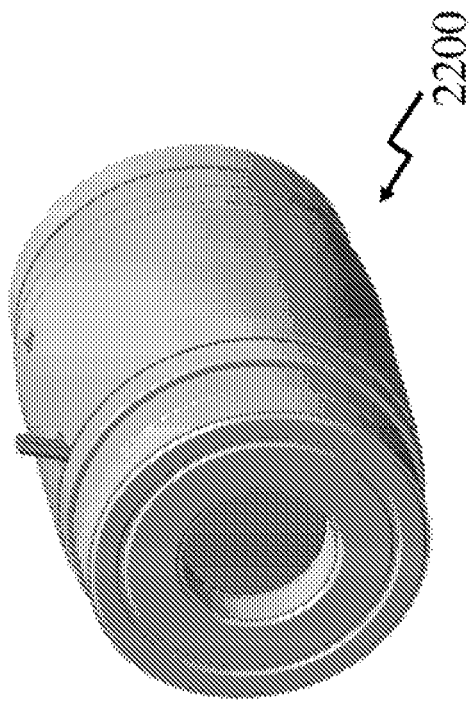
FIGS. 22A and 22B respectively depict insertion of a piston within an LMMC and final assembled LMMC according to an embodiment of the invention.
Figure 22A:
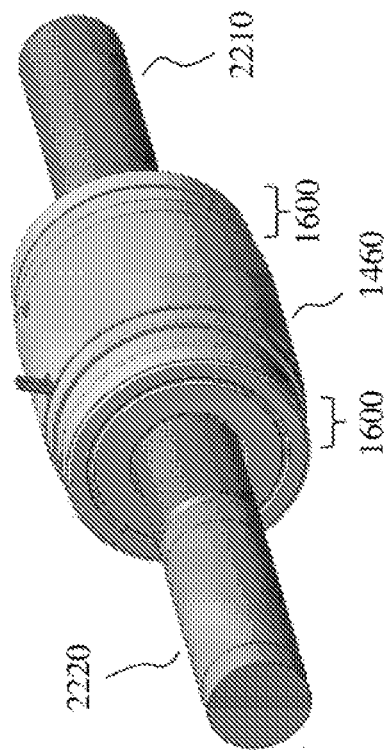
Figure 22C:
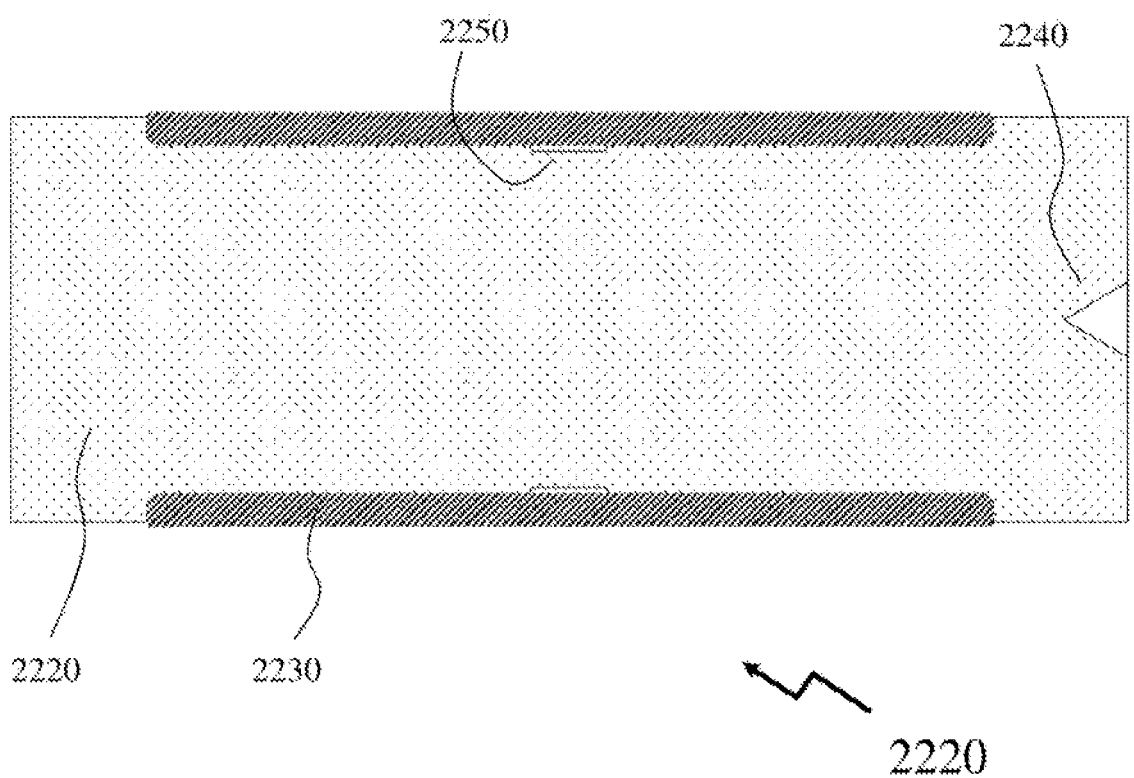
FIG. 22C depicts a cross-section of a piston according to an embodiment

Now referring to FIGS. 22A and 22B respectively there is depicted the insertion of a piston 420 within an LMMC together with a final assembled LMMC 1200 according to an embodiment of the invention. As depicted in FIG. 22A an insertion tool 2210 is initially pushed through the bore of the LMMC and the piston 420 attached magnetically to the insertion tool 2210. The insertion tool 2210 is then withdrawn back through the bore of the LMMC to position the piston with low force as if the piston does not fit pulling the insertion tool 2210 will simply break the magnetic coupling between it and the piston 420. An example of a piston according to an embodiment of the invention is depicted in FIG. 22C comprising a body 2220 formed from a permanent magnetic material which has a low friction sleeve 2230 over a predetermined central symmetrically disposed region of the piston 2220 wherein in forming the piston 2220 an initial groove 2250 is machined into the blank from which the piston 2220 is machined so that the region for the low friction sleeve 2230 is symmetrically disposed on the piston 2220. At one end a dimple 2240 is optionally machined that matches a projection on the insertion tool 2210.

Figure 23A:
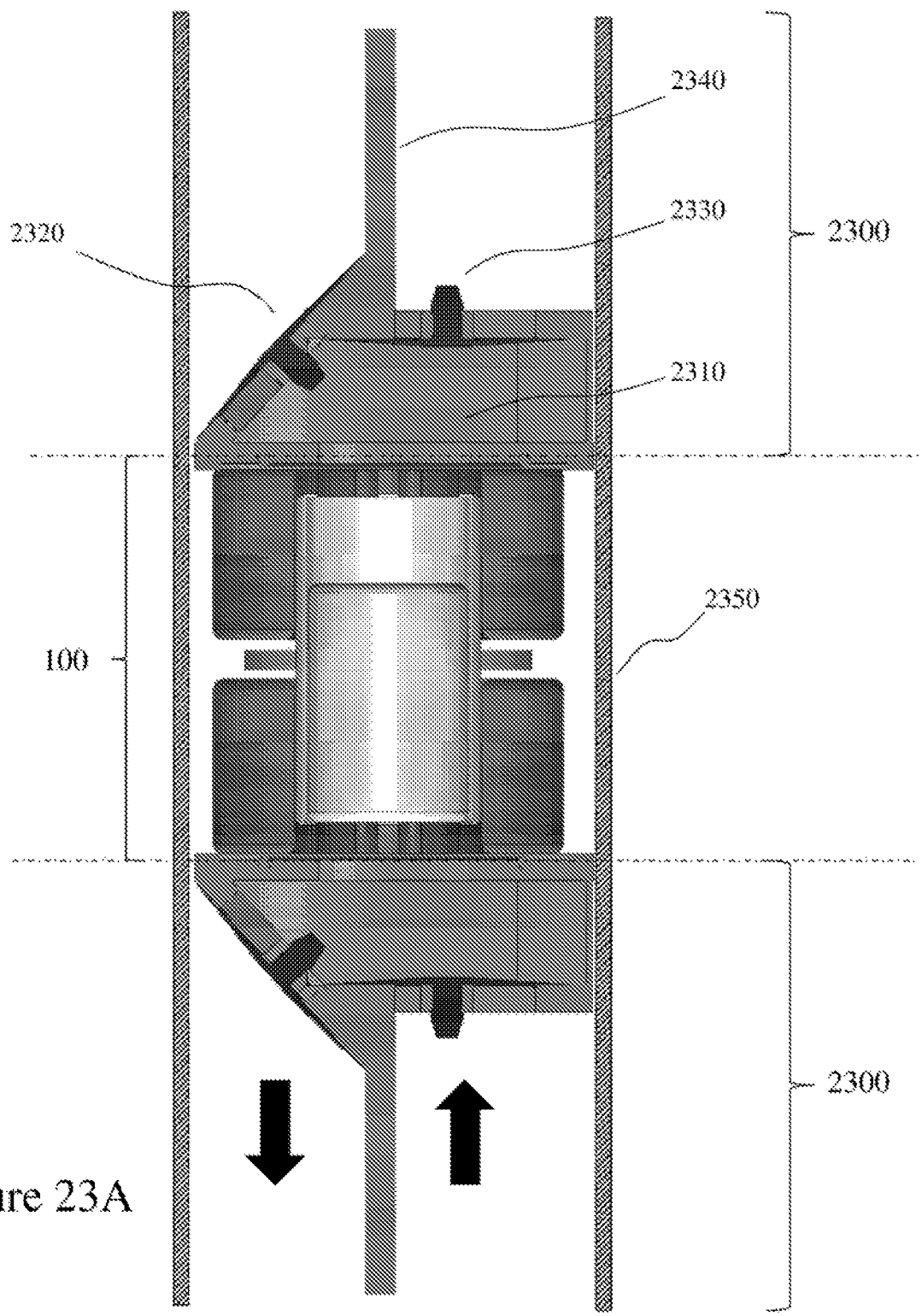
FIGS. 23A and 23B respectively depict a diaphragm based non-return valve (NRV) according to an embodiment of the invention for use within LMMC to provide an electronically controlled pump according to an embodiment of the invention.
Figure 23B:
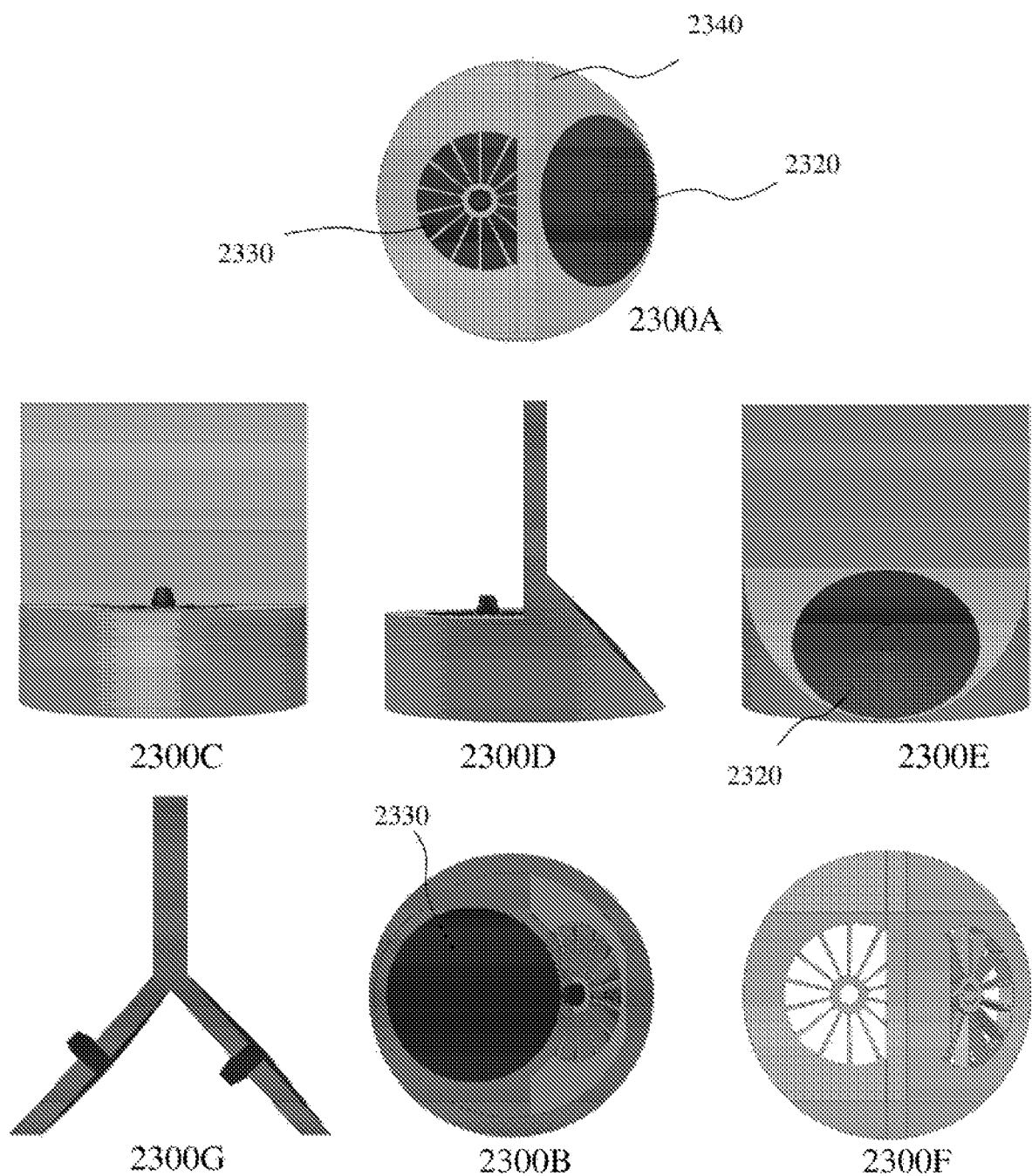

Now referring to FIGS. 23A and 23B respectively there are depicted an ECPUMP and diaphragm based non-return valve (NRV) according to an embodiment of the invention. Within FIG. 23A an ECPUMP is depicted exploiting a LMMC 100 to provide an ECPUMP such as described and depicted supra in respect of FIGS. 1 to 22C wherein an external shell 2350 houses the LMMC 100 and a pair of NRVs 2300. The diaphragm NRV 2300 comprises a body 2340 defining a cavity 410 at one end and a dividing wall externally between inlet and outlet fluidic circuit portions. On the inlet side of the diaphragm NRV 2300 is a first diaphragm 2330 which deflects into the cavity 2310 under fluid pressure and returns elastically under no fluid flow or is pushed against a frame within the body 2340 when the fluid flow is reversed by the LMMC 300. On the outlet side of the diaphragm NRV 2300 is a second diaphragm 2320 which deflects away from the body 2340 when the LMMC 300 pumps to push fluid out of the cavity 2310, returns elastically under no fluid flow or is pulled against a frame within the body 2340 when the LMMC 300 is drawing fluid into the cavity 2310. Accordingly, under cyclic action of the LMMC 300 the LMMC 300 initially draws fluid from the inlet through the first diaphragm 2330 into the cavity 2310 and then pumps the fluid from the cavity 2310 to the outlet through the second diaphragm 2320.

The diaphragm NRV 2300 is depicted in first to fifth views 2300A to 2300E in third angle projection respectively representing a plan elevation, left elevation, front elevation, right elevation and bottom elevation respectively wherein the first and second diaphragms 2320 and 2330 are evident with respect to the body 2340. Body image 2300F in FIG. 23B depicts the body 2340 without the first and second diaphragms 2320 and 2330 allowing the support frames to be clearly seen. Within an alternative embodiment of the invention cross-section 2300G depicts a variant of the diaphragm NRV wherein both diaphragms are "titled" with respect to the axis of the NRV body.

Figure 24:
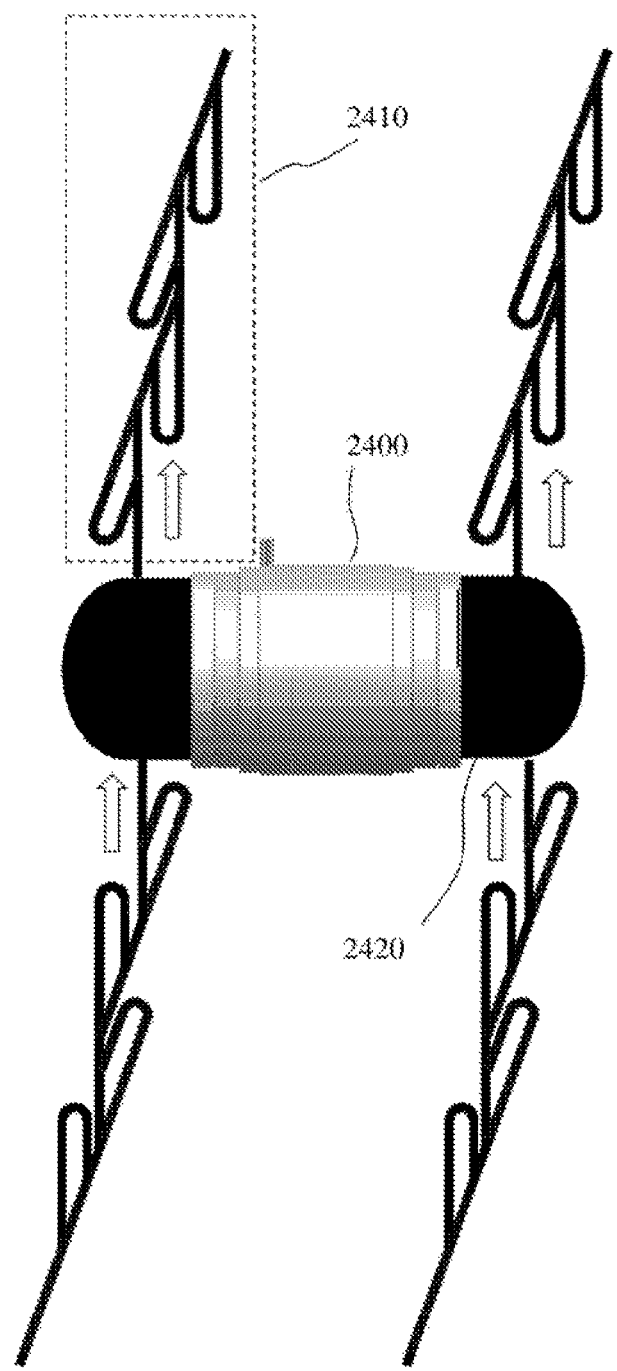
FIG. 24 depicts an electronically controlled pump according to an embodiment of the invention exploiting a LMMC according to an embodiment of the invention in conjunction with Tesla non-return valves according to an embodiment of the invention.

Fluidic Systems with Non-Mechanical Non-Return Valves and Resonators:

Accordingly, with respect to FIGS. 1 to 23B and the descriptions supra two "valve" designs, the LMMC and FFV, have been described for providing on/off (open/closed) fluidic flow within a fluidic circuit together with forming the basis of fluidic switching circuits. Now referring to FIG. 24 there is depicted an ECPUMP exploiting a LMMC according to an embodiment of the invention in conjunction with Tesla non-return valves according to an embodiment of the invention. Accordingly, as depicted a LMMC 2400 such as that depicted supra provides an ECPUMP in conjunction with two end-fittings 2420 and four Non-Return Valves (NRVs) 2410. Each NRV 2410 exploits a design methodology established by Nikola Tesla, see for example U.S. Pat. No. 1,329,559, wherein the flow in one direction (not coupling fluid into the loops) exhibits low resistance but the reverse direction couples to the loops and hence the flow reverses again providing high resistance. Accordingly, on each end of the LMMC 2400 there are disposed one NRV 2410 with low resistance into the end-fitting from the external fluidic circuit and one NRV 2410 with low resistance into the fluidic circuit from the end-fitting such that the LMMC 24200 can withdraw fluid from the fluidic circuit and pump into the fluidic circuit on each full piston cycle at either end. It would be evident that other non-return valves (also known as check valves) may be employed without departing from the scope of the invention including diaphragm based NRVs, swing or tilting disk NRVs, lift check valves, in-line check valves, etc.

Figure 25:
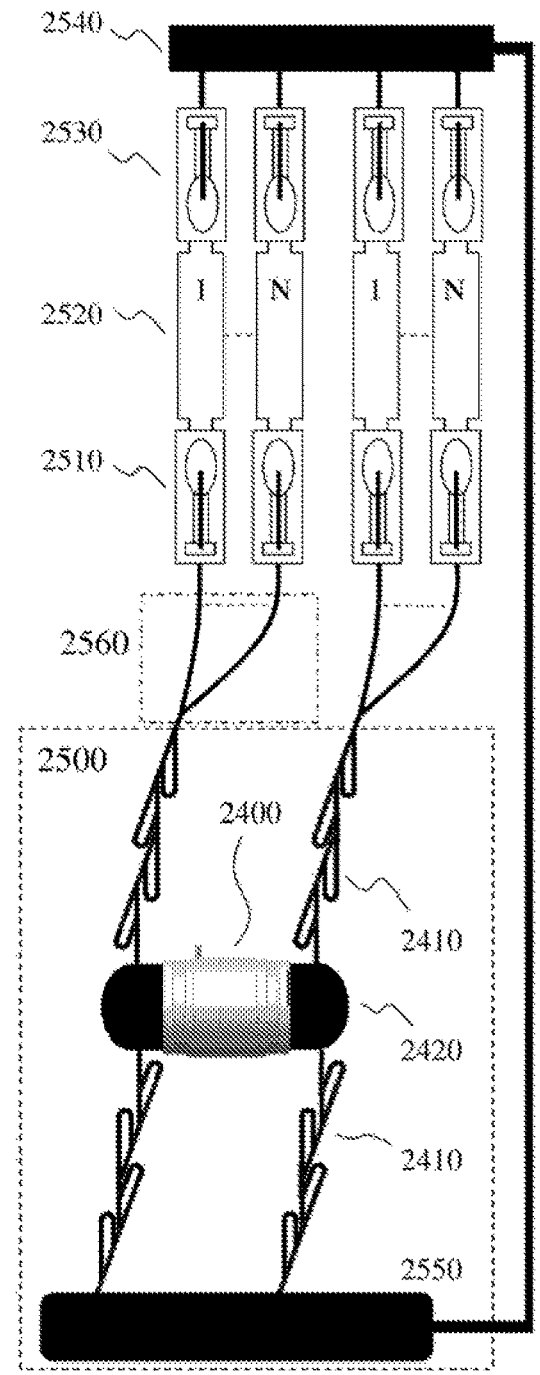
FIG. 25 depicts a fluidic circuit according to an embodiment of the invention exploiting FFV arrays with their actuator elements in conjunction with an electronically controlled pump according to an embodiment of the invention exploiting a LMMC with Tesla non-return valves according to an embodiment of the invention.

Now referring to FIG. 25 there is depicted a fluidic circuit according to an embodiment of the invention exploiting FFV arrays with their actuator elements in conjunction with an ECPUMP 2500 exploiting a LMMC 2400 with NRVs 2410. As depicted the NRVs 2410 from which the LMMC 2400 draws fluid are connected to a reservoir 2550 whilst the NRVs 2410 into which the LMMC 2400 pumps are coupled to a passive splitter network 2560 feeding N parallel paths each comprising an input FFV 2510, an actuator 2520, and an outlet FFV 2530. The outlet FFVs 2530 couple to a combiner 2540 (e.g. secondary reservoir) which is coupled back to the reservoir 2550 thereby completing the fluidic circuit. Accordingly, an actuator 2520 may be enabled from its corresponding input FFV 2510 such that it expands, twists, extends, etc. according to the design of the actuator 2520 and subsequently "emptied." Optionally the passive splitter network 2560 may be replaced by a fluidic switching circuit such as a 1×N switch either providing coupling of the output NRV 2410 to a single actuator 2520 or through use of quad-state 1×2 switches coupling to M outputs of the 1×N switch, where 1≤M≤N.

Figure 26:
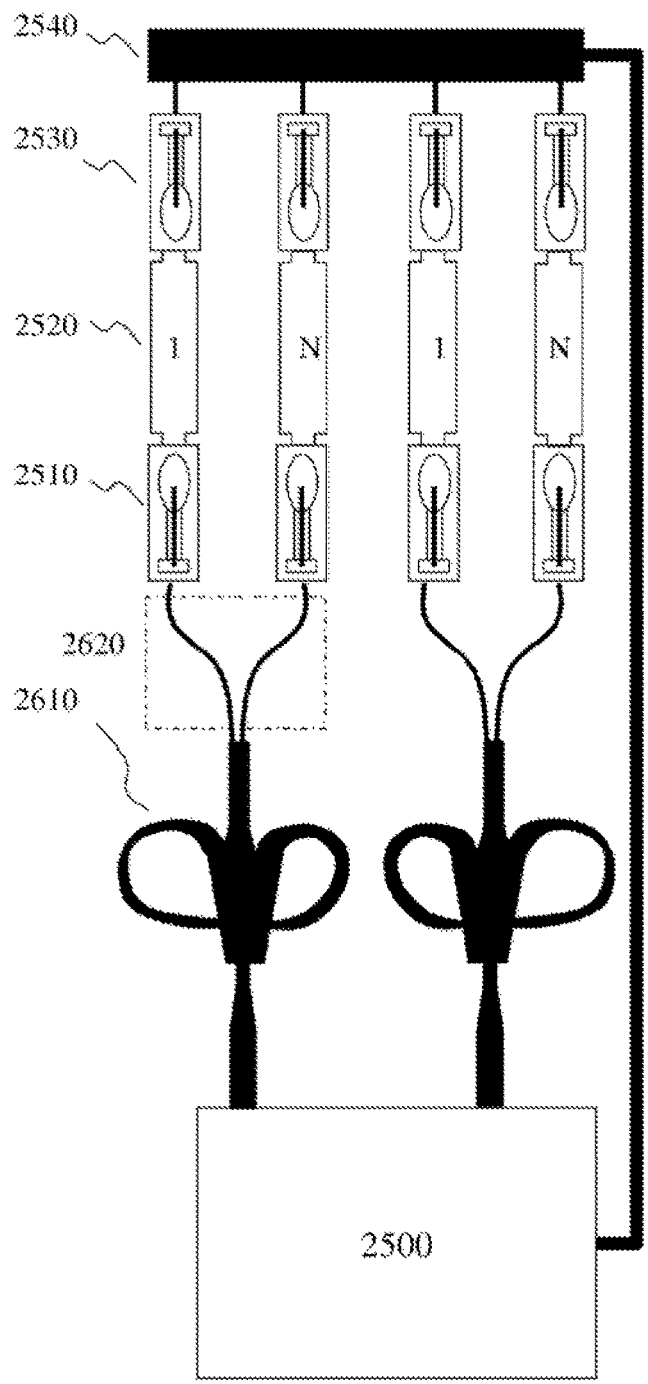
FIG. 26 depicts a fluidic circuit according to an embodiment of the invention exploiting FFV arrays with their actuator elements in conjunction with an electronically controlled pump according to an embodiment of the invention exploiting a LMMC and Tesla valves coupled to fluidic resonators.

Referring to FIG. 26 there is depicted a fluidic circuit according to an embodiment of the invention exploiting FFV arrays with their actuator elements in conjunction with an ECPUMP exploiting a LMMC and Tesla valves coupled to fluidic resonators. Accordingly, a fluidic engine 2500 comprising LMMC 2400, reservoir 2550, end-fittings 2420, and NRVs 2410 as depicted in FIG. 25 is coupled to a pair of fluidic resonators 2610 before being coupled to the arrays of inlet FFVs 2510, actuators 2520, outlet FFVs 2530 and combiner 2540. Each output NRV within the fluidic engine 2500 is coupled to a fluidic resonator 2610 and therein via a distribution network 2620 feeding N parallel paths each comprising an input FFV 2510, an actuator 2520, and an outlet FFV 2530. The distribution network 2620 may be a passive splitter, an active switch, or a combination thereof. Optionally, only one fluidic resonator 2610 is provided to generate vibratory stimulation within the product or device exploiting the depicted fluidic circuit whilst the other output from the fluidic engine 2500 drives an array of actuators controlling dimensional and/or geometrical and/or functional aspects of the product or device.

Optionally, the pair of fluidic resonators 2610 may be designed to provide outputs at frequencies $f_1$ and $f_2$ and these are combined prior to or at the actuators 2520 such that the actuators "vibrate" at $f_1-f_2$, i.e. at 1 Hz or 2 Hz based upon fluidic oscillators operating at frequencies typically 10 Hz≤ ($f_1$; $f_2$)≤200 Hz.

Figure 27:
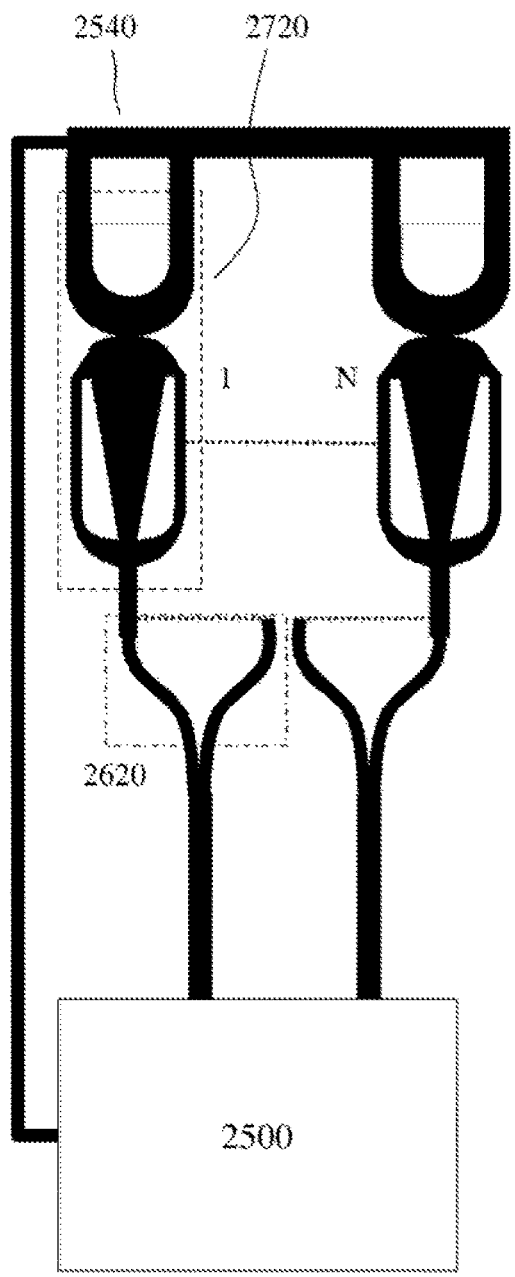
FIG. 27 depicts a fluidic circuit according to an embodiment of the invention an electronically controlled pump according to an embodiment of the invention exploiting a LMMC and Tesla valves coupled to fluidic resonators to provide a low complexity fluidic vibration function.

Now referring to FIG. 27 there is depicted an alternate configuration for a fluidic circuit forming part of a product or device according to an embodiment of the invention employing a fluidic engine 2500 wherein dual outputs are each coupled to a distribution network 2620 feeding N parallel paths wherein each of the N parallel paths is a fluidic oscillator 2720 such that vibration is generated at each actuator site. It would be evident that the distribution network 2620 may be a passive splitter with programmable valves, a 1×N switch, or a 1×⟨1≤M≤N⟩ employing quad-state 1×2 switches.

The evolution of the oscillation within each fluidic oscillator 2720 is essentially an evolving flow from one side to another which through the Coanda effect then flows along the flat or convex surface thereby generating essentially two discrete oscillating flows that are out of phase with respect to each other. This aspect is leveraged within the Product-Device 2800 depicted schematically in FIG. 28 according to an embodiment of the invention which exploits a pair of fluidic oscillators 2720 coupled between a fluidic engine 2500 and arrays of fluidic actuators. As depicted the Product-Device 2800 comprises a first section 2850 coupled to a second section 2860. Within first section 2850 the fluidic engine 2500 is coupled to fluidic control circuit 1620 which drives the LMMC within the fluidic engine 2500 and receives electrical power from the battery 2810. The Product-Device control circuit 2820 is also connected to the FFVs within the first and second actuator arrays 2830 allowing control of the input and output FFVs to each fluidic actuator. The outputs from the output NRVs within the fluidic engine 2500 are coupled to the pair of fluidic oscillators 2720 which each generate a pair of oscillatory outputs out of phase from each other within each pair. Each output from each fluidic oscillator 2720 being coupled to M fluidic actuator circuits such that each of the first and second actuator arrays 2830 comprises N=2×M actuators and the Product-Device supports R=2×N=4×M actuators. Accordingly, for M=4, R=16 and M=6, R=24 etc. It would be evident that passive fluidic splitters may be designed for unequal ratios other than L:R=0.5:0.5 such as L:R=0.66: 0.33 and L:R=0.75:0.25 for example.

Figure 28:
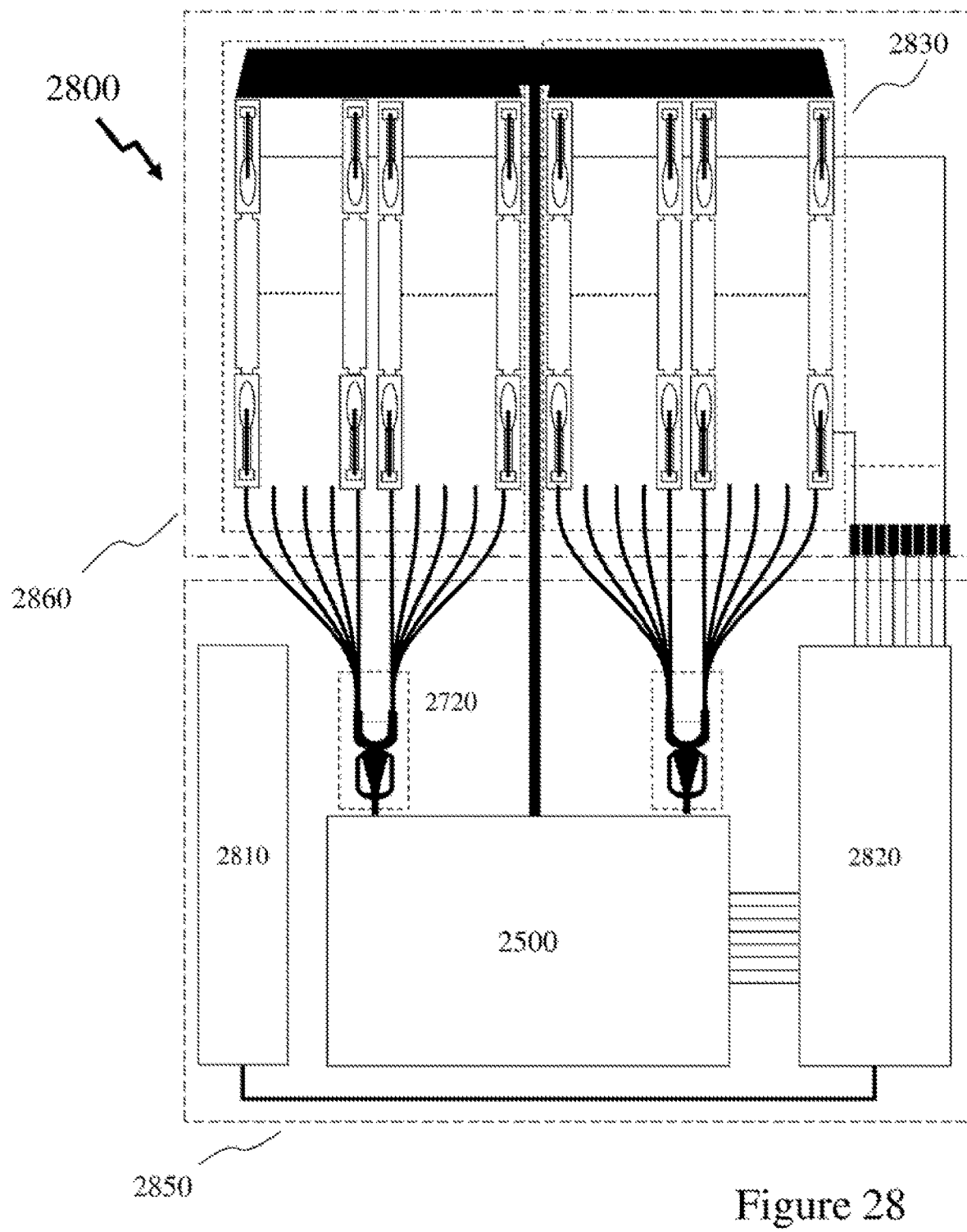
FIG. 28 depicts schematically a device exploiting a fluidic circuit according to an embodiment of the invention exploiting an electronically controlled pump according to an embodiment of the invention with LMMC and Tesla valve elements coupled to fluidic resonators and arrays of FFVs with their actuator elements.
Figure 29:
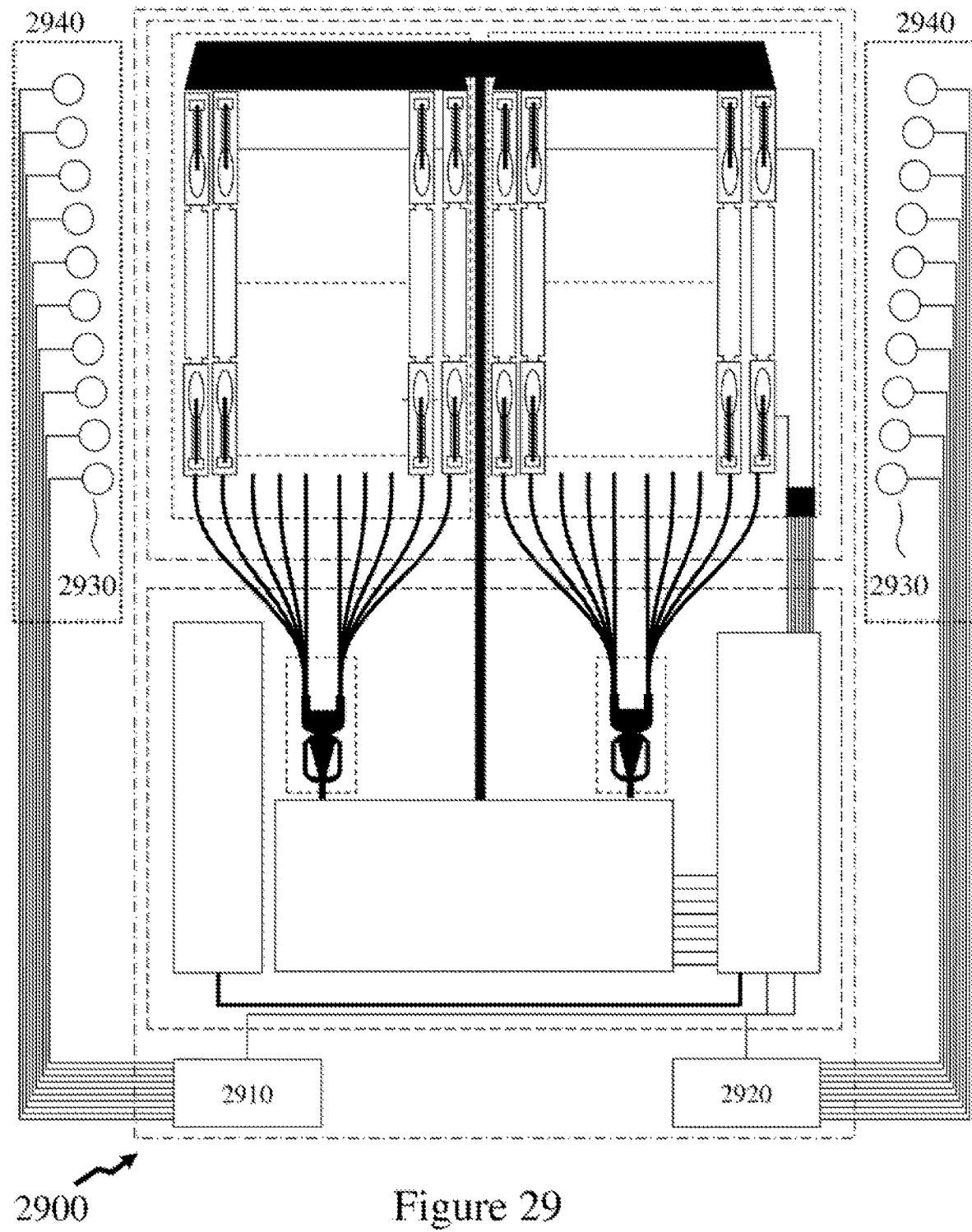
FIG. 29 depicts schematically a device exploiting a fluidic circuit according to an embodiment of the invention exploiting an electronically controlled pump according to an embodiment of the invention with LMMC and Tesla valve elements coupled to fluidic resonators and arrays of FFVs with their actuator elements in conjunction with arrays of electrostimulation elements.

Now referring to FIG. 29 there is depicted a Product-Device 2900 according to an embodiment of the invention exploiting essentially a variant of the Product-Device 2800 in FIG. 28 with respect to its underlying fluidic circuit construction and functionality. However, Product-Device 2900 exploits in addition to the fluidic circuits first and second arrays 2940 of electrostimulation elements 2930 which are coupled via first and second electrostimulation controllers 2910 and 2920 respectively to the Product-Device control circuit 1620. Within an embodiment of the invention an electrostimulation element 2930 may be co-located with the fluidic actuators whilst within another embodiment of the invention they may be associated with different aspects/locations of the Product-Device 2900.

Exemplary Deployment Scenarios:

A variety of consumer devices as well as toys, professional devices, tools, medical devices, etc. may exploit one or more Products-Devices exploiting one or more fluidic circuits each with one or more fluidic actuators, LMMCs, FFVs, etc. For example, a Product-Device may be employed within each of the soles of a pair of footwear wherein the fluidic circuits and actuators stimulate reflexology points specifically or generally massage the soles of the user's feet. For example, these fluidic actuators may locally expand or raise an element such that the user experiences increased pressure at these locations where the expansion or raising/lowering are in response to the inflation/deflation of one or more fluidic actuators. Rather than reflexology pressure points the actuators positions may be determined based upon other criteria such as acupuncture points, muscle locations, etc.

In this deployment scenario the fluidic circuit, fluidic actuators, interconnecting fluidic couplings etc. may be molded into the sole of the footwear or assembled within a mechanical frame of the sole and then potted. The fluidic circuit coupling elements together may be discrete tubing or within other embodiments it may formed as a molded piece-part from silicone, for example. Optionally, in some embodiments of the invention the LMMC may be replaced by a pressure activated pump so that ambulatory motion of the user drives the fluidic circuit although programmability may be still under electronic control. However, a purely passive circuit with pressure driven flow through NRVs to an array of predetermined actuators may also be envisaged.

Alternatively, rather than a pair of shoes embodiments of the invention may be employed within a pair of gloves where the fluidic circuits and actuators stimulate reflexology points specifically or generally massage the palms and fingers of the user's hands. The gloves may, optionally, include a separate control and battery pack although it would be evident that dependent upon the design requirements of the fluidic circuit and the gloves that the control and battery pack may be disposed across the back of the user's hands via thin flexible circuits and low-profile battery element(s). A separate control and battery pack could include the LMMC based ECPUMP which is coupled to a series of fluidic channels that are themselves coupled to the fluidic actuators within the gloves which may, for example, locally raise expand or raise an element such that the user experiences increased pressure at these locations in response to the inflation/deflation of the fluidic actuator(s). As with the footwear the actuators may be disposed at common reflexology points although in other embodiments of the invention they may be positioned at acupuncture points, muscle locations, etc.

Amongst other products, devices etc. that may exploit embodiments of the invention comprising a fluidic circuit with fluidic actuators, LMMCs, FFVs, etc. may include, but not be limited to:

Outdoor clothing such as boots and shoes for example;
Non-invasive medical devices such as neck brace, ankle brace and wrist brace for example;
Consumer devices such as steering wheel and keyboard wrist support for example;
Sports equipment such as head gear for example;
Personal care equipment such as massager pad for example;
Clothing such as socks, gloves and leggings for example;
Underwear such as brassiere and underpants for example;
Sports clothing such as sports socks and undershirt for example;
Thermal clothing such as heated padded sleeve for example; and
Support clothing such as wrist-forearm sleeve for example.

Figure 30:
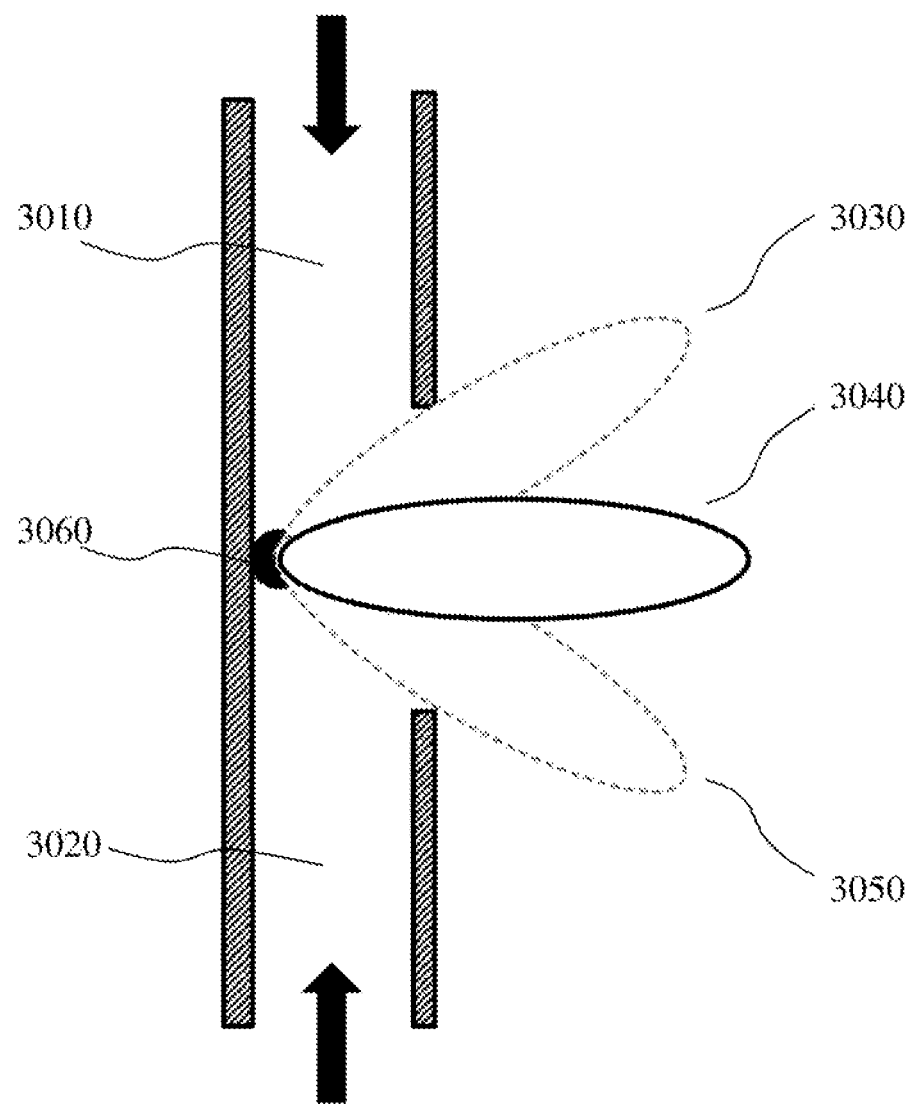
FIG. 30 depicts a "flapper" valve exploiting the Coanda effect according to an embodiment of the invention.

Passive Valves:

Referring to FIG. 30 there is depicts a "flapper" valve exploiting the Coanda effect according to an embodiment of the invention. As depicted first and second fluidic channels 3010 and 3020 impinge upon a flapper 2240 mounted via a hinge 3060. Accordingly, through the Coanda effect air flow over the outer surface from the first channel 3010 will pull the flapper 3040 into first position 3030 closing the opening over the first channel 3010. This thereby reducing the fluid flow such that now the dominant fluid flow is from second channel 3020 and the flapper will now be driven into second position 3050 closing the opening over the second channel 3020. This now reduces the fluid flow such that now the dominant fluid flow is from first channel 3010 and the cycle continues.

Pump Variants and Experimental Results:

As depicted in FIG. 12 and FIGS. 13 to 16B electronically controlled pumps exploiting linear magnetic actuation according to an embodiment of the invention exploit magnet assemblies 1600 at either end of the piston sleeve 1460. Each magnet assembly 1600 comprising an outer washer 1410, a magnet filler ring 1420, a magnetic washer 1430, and an inner washer 1440. The inventor has established that by varying the thickness of the inner washer 1440 and outer washer 1410 that the performance of the pump can be adjusted and with more significant effect than the permanent magnet strength. Referring to FIG. 30 there are depicted first and second graphs 3100A and 3100B respectively which depict the powered and unpowered theoretical force curves for two motors, Motor A and Motor B respectively throughout the domain of the piston stroke (x-axis) with 0" representing the dead centre position of the piston.

As the thickness of the inner washer 1440/outer washer 1410 increases, the force on the right hand side of the curve increases while the left hand side experiences a decrease in force. Conversely, as the thickness of the inner washer 1440/outer washer 1410 decreases, the force on the left hand side of the curve increases while the right hand side experiences a decrease in force. Transformations to the force curves resulting from changes in the inner washer 1440 are not as impactful as those of the outer washer 1410. Experimental observations indicate that a magnet assembly 1600 configuration that produces a force curve with a peak in the middle of the stroke are more robust than right or left leaning force curves. It would also be evident that the configuration of the magnet assembly 1600 and their resulting force curves may be application dependent and that particular configurations may be more appropriate to specific applications than other configurations.

Figure 31:
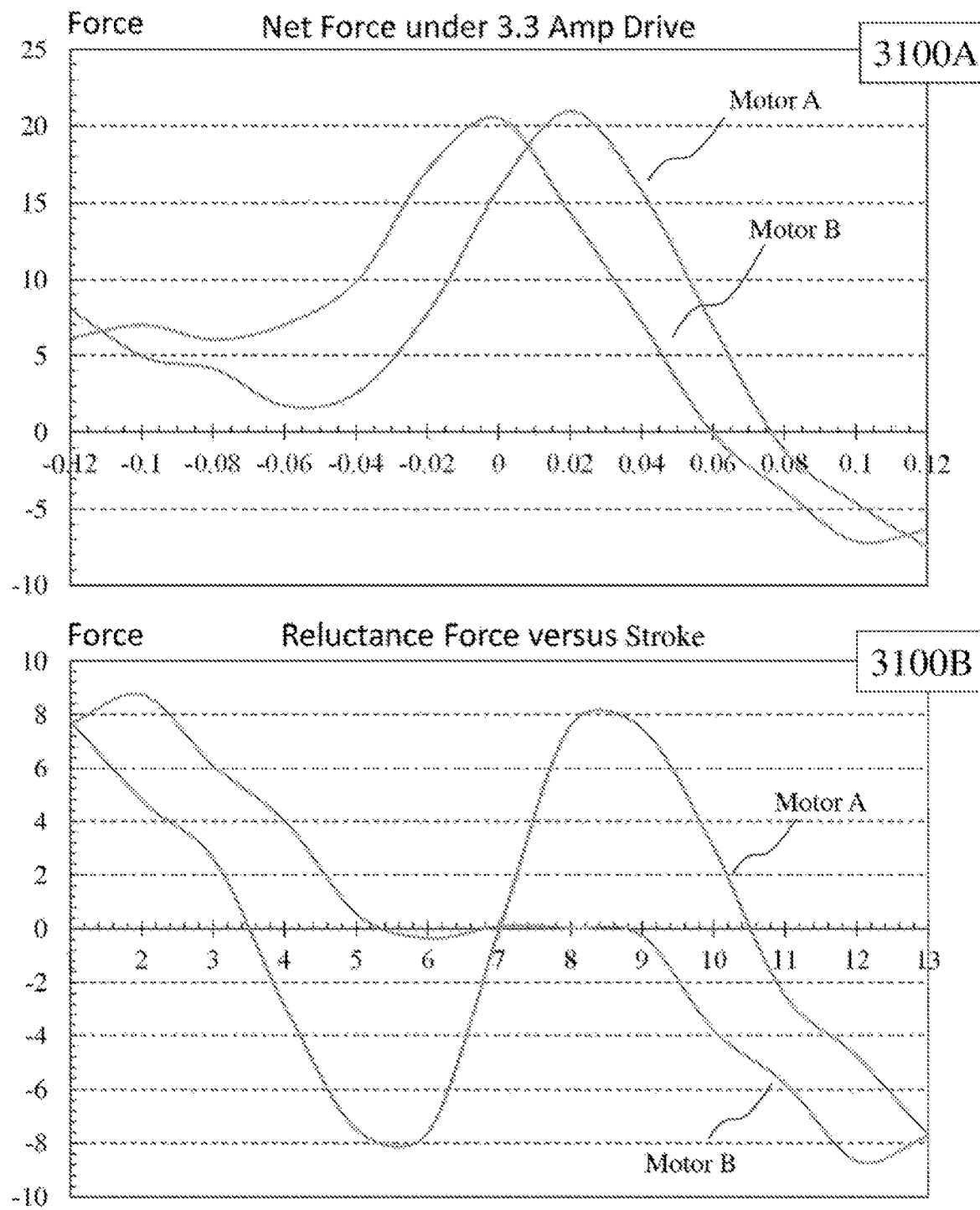
FIG. 31 depicts net force and reluctance force curves for two different motors fabricated according to embodiments of the invention.

By changing the configuration of the inner washer 1440/outer washer 1410 thickness and not solely focusing on optimizing efficiency, that the pump can be adapted for a specific application. For example, consider a situation where it is necessary to generate a consistent flowrate between 3.0-3.5 L/minute versus a design producing 1.5-2.0 L/minute flowrates. If we consider maintaining the drive frequency then it would be necessary to increase the stroke length of the pump in order to achieve this flowrate. This would require a washer configuration that produces high reluctance forces at the ends of the stroke, an example of this can be seen in the reluctance curve for Motor A in FIG. 31. At the tail ends of the stroke, the reluctance force works to "return" the piston back towards the coil, completing the stroke. In the centre of the stroke the reluctance temporarily opposes the piston's motion, requiring more coil power to overcome, sacrificing efficiency for an increase in flowrate. Conversely, if we consider an application in which a low/moderate flowrate is required, then a reluctance curve similar to that of Motor B may be more appropriate. In this instance the pump could be run with a smaller stroke since the return (reluctance) force is higher closer to the middle of the stroke which also allows for smoother, quieter operation. It is also evident from the reluctance curve to see that there is very little force acting on the piston in the middle portion of the stroke, leading to it requiring less power to drive the piston, thereby providing an increase in efficiency. Motor A achieves an efficiency of approximately 22% and pumps at 2 L/minute whilst Motor B achieves an efficient of approximately 35% and pumps at approximately 1.4 L/minute.

Figure 32:
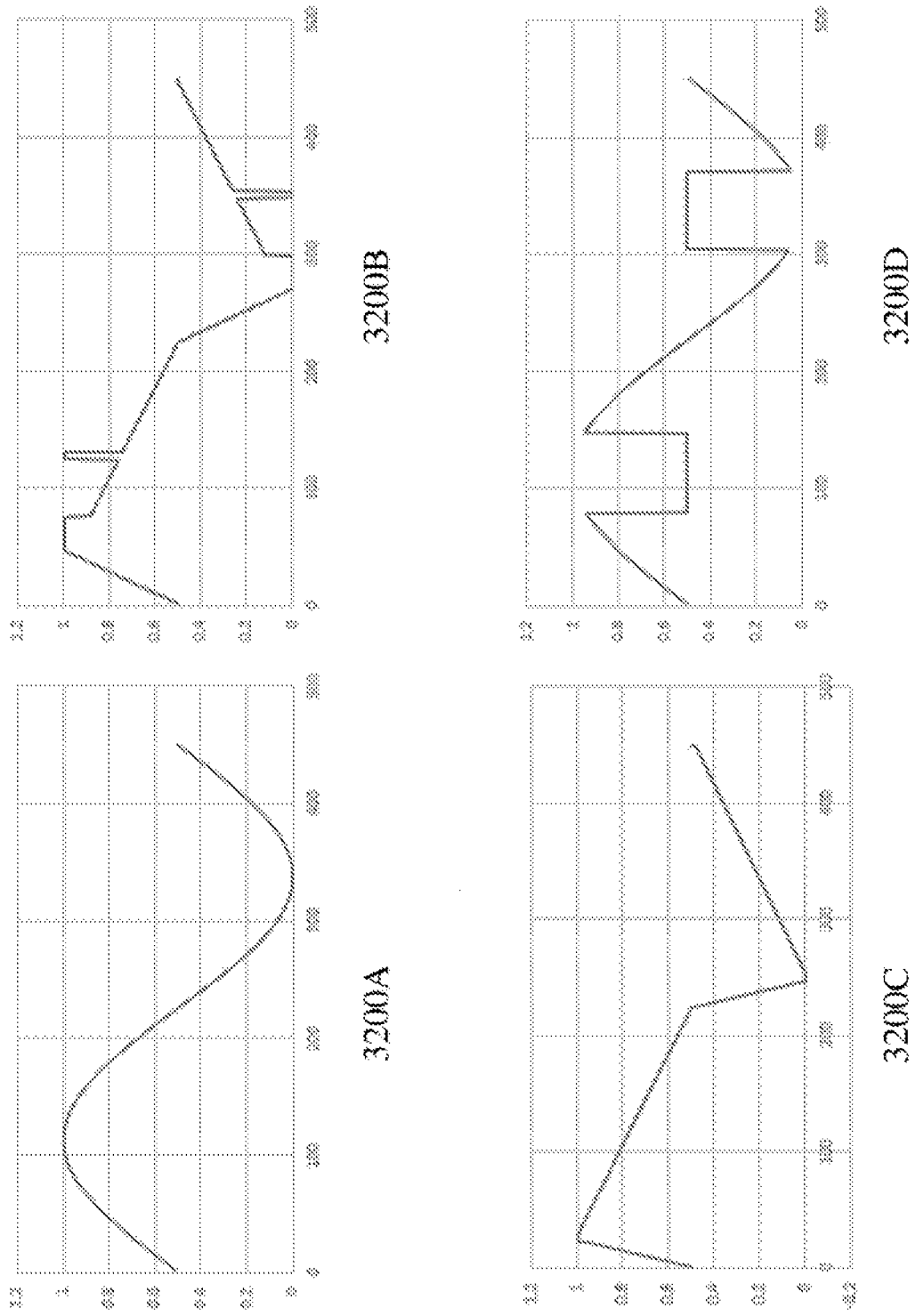
FIG. 32 depicts pulse width modulation signals for driving electronically controlled pumps according to an embodiment of the invention.

It would also be evident that the linear magnetic oscillating pump is driven by an oscillating drive signal. Within embodiments of the invention this may be a pulse width modulated (PWM) drive signal wherein first graph 3200A in FIG. 32 depicts the "default" waveform which is sinusoidal. However, as evident from the reluctance and net force curves in FIG. 31 for different pump designs this leads to some wasted power as power is applied that results in no mechanical work. However, in other designs such as personal consumer devices aspects such as overall noise of the product may be a significant parameter for high customer reviews and market acceptance. Such considerations may therefore lead to exploiting PWM drive signals such as those depicted in second to fourth graphs 3200B to 3200D in FIG. 32 which resulted in "smoother" quieter pump operation albeit with reduced fluidic flow. Accordingly, the PWM drive signal may be optimized in respect of the target application and/or Product-Device exploiting the electronically controllable linear magnetic pumps according to embodiments of the invention.

Variants and Options:

Within the embodiments of the invention described supra and depicted in FIGS. 1 through 31 a piston moving within a piston sleeve is depicted as forming the fluid moving element of the pumps or fluid blocking element within the valves. As depicted in these Figures the piston sleeve is circularly symmetric with respect to the piston. However, as evident within the discussions with the preceding applications from the inventor; namely WO/2014/047717 entitled "Methods and Devices for Fluidic Driven Adult Devices"; WO/2014/047718 entitled "Fluidic Methods and Devices"; and WO/2015/135,070 entitled "Methods and Devices to Hydraulic Consumer Devices" a range of design approaches to providing low friction and/or circularly symmetric piston—piston sleeve operation were presented.

Figure 33A:
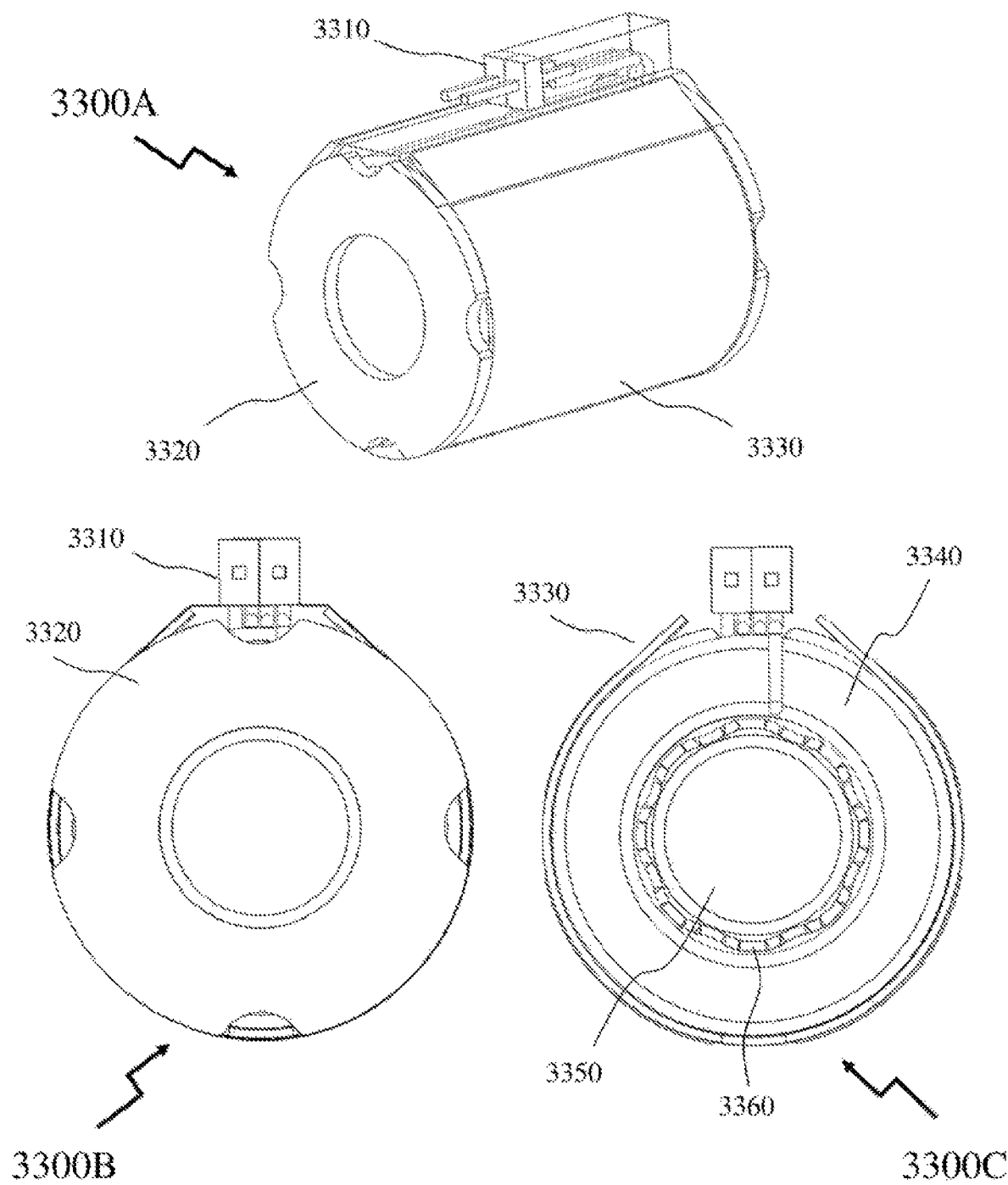
FIGS. 33A and 33B depict a LMMC variant according to an embodiment of the invention with a "corrugated" piston sleeve.
Figure 33B:
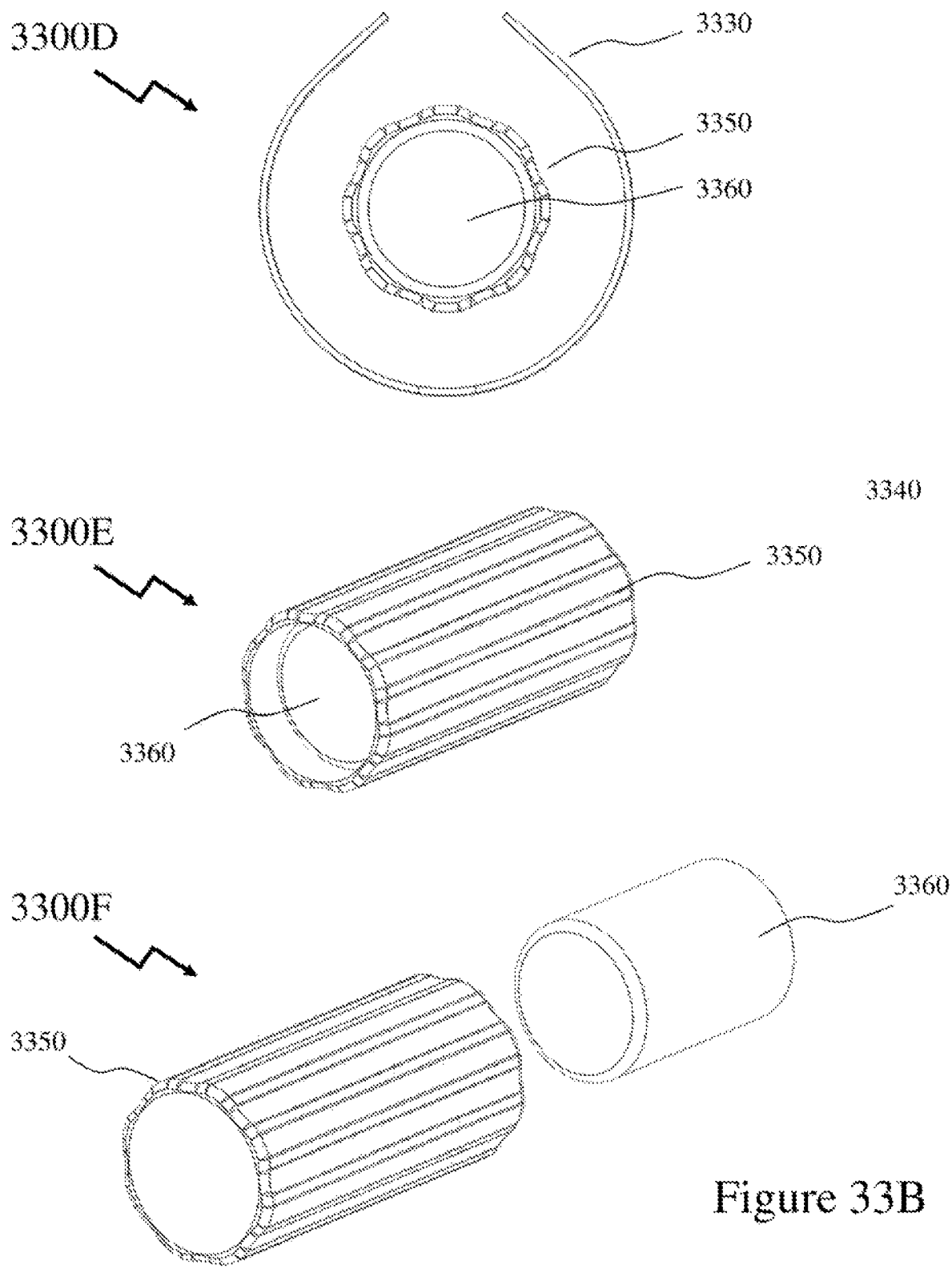

Referring to FIGS. 33A and 33B there are depicted first to sixth images 3300A to 3300F respectively in respect of a linear magnetic moveable core (LMMC) for pumps and/or valves according to an embodiment of the invention. Referring to first image 3300A and second image 3300B in FIG. 33A the LMMC is depicted as assembled in perspective and end elevation views with electrical connector 3310 (which connects to a pair of actuation coils), outer washer 3320, and magnetic shield 3330. The magnetic shield 3330 reduces electromagnetic coupling from adjacent and/or nearby LMMCs or other electromagnetic elements as well as magnetic elements to the LMMC. Now referring to third image 3300C the LMMC is depicted in end elevation view with the outer washer 3320 removed showing the magnetic shield 3300 together with the actuation coil 3340, the corrugated piston sleeve 3350 and piston 3360.

Fourth image 3300D the LMMC is now depicted again in end elevation view with the actuation coils removed together with the outer washer at the other end of the LMMC so that the magnetic shield 3330 remains together with the corrugated piston sleeve 3350 and piston 3360. Fifth and sixth images 3300E and 3300F depict the corrugated piston sleeve 3350 and piston 3360 assembled and exploded perspective views. Accordingly, within the LMMC the piston 3360 is centrally disposed with small gaps from the inner minimal diameter corrugated portions whilst the increased radius of the remainder of the corrugated piston sleeve 3350 reduces the extent of any contact between the corrugated piston sleeve 3350 and piston 3360.

Within the embodiments of the invention described and depicted in respect of FIGS. 3A through 33 the LMMCs a non-magnetic washer is disposed between the outer magnetic washer and the end of the piston sleeve. In some embodiments of the invention this washer is within the inner bore of one of the coils, the configuration depicted supra, whereas in other embodiments this washer may be in contact with the outer face of the coil or not in contact with the coil at all but engaged upon a casing of the LMMC or potted body of the LMMC. In these embodiments the washer may exploit a seal such as an O-ring or deformable soft metal ring to provide a barrier to egress of the fluid. Optionally, this washer may be a soft magnetic material rather than a hard magnetic material employed to form the outer magnetic washer. Accordingly, this washer may be in some embodiments of the invention mild steel or steel rather than iron. Alternatively, other magnetic materials may be employed such as soft magnetic material or exploit a powdered metal embedded within a non-magnetic matrix, e.g. iron particles disposed within a resin which are subsequently aligned and magnetised by application of a large magnetic field.

Whilst the descriptions in respect of embodiments of the invention have been primarily with the LMMC configured in a first position with the piston at one end or a second position with the piston at the other end they may be operated in other configurations such as in the middle, so that both valves are open and coupling equally or the driver may provide alternate drive configurations so that the valves are open in pulsed mode 50% of the time, one open 75% and other 25%, one open X % and other open (100−X) % or that they execute pulsed sequences etc. These pulsed sequences may be rapid in time compared to the time constant of the actuator to reach a desired steady state pressure may be less than the maximum achieved from the valve being open constantly.

Within the embodiments of the invention described and depicted in respect of FIGS. 3A through 22 the LMMCs the piston has been described as being circular, but it would be evident that the cross-section may be square, rectangular, half-round etc. provided the piston and the bore within the piston sleeve can be manufactured at the right tolerances with acceptable materials and cost. Within an embodiment of the invention using a half-round piston a pair of these may be disposed within a common coil configuration such that multiple valves are driven together. Optionally, non-wound coil designs may allow multiple valve coils to be implemented within a common housing so that multiple individually controllable valves may be housed together.

Within embodiments of the invention as described in respect of FIGS. 12 to 17 a single ECPUMP is depicted and described as being coupled to multiple actuators. However, it would be evident that embodiments of the invention may exploit multiple ECPUMPs coupled to multiple arrays of fluidic actuators or that in some embodiments of the invention a plurality of ECPUMPs may be employed, each only coupled to one or a limited number of actuators. Within many Products-Devices these ECPUMPs may be moderately dimensioned whilst in others they may be small. Accordingly, in a limit each actuator is coupled to a single ECPUMP so that no fluidic splitter is required and at least inlet valves may be removed as activating an actuator is by driving its associated ECPUMP. Optionally, multiple ECPUMPs may be combined prior to be coupled to one or more actuators such that the ECPUMPs are operating within an efficient regime and adding fluid pressure is achieved by enabling another ECPUMP within the array of ECPUMPs. The same may be considered with LMMCs as well as FFVs where the dimensions of the LMMC and/or Product-Device support such deployed fluidic circuits.

Within the embodiments of the invention described and depicted in respect of FIGS. 9A to 22 respectively the shape memory alloy (SMA) can be long to achieve the desired movement length but as the SMA will remain flexible in thin-film and/or wire formats then the SMAs may be disposed within flexible Products-Devices such as shoe soles, clothing, etc.

Within embodiments of the invention Product-Device deployed fluidic circuits may exploit pressure on the ECPUMP control. Accordingly, the reservoir pressure may be monitored and employed to modify, for example, the AC amplitude of the drive waveform so that the pump stroke is regulated to maintain the desired pressure. In some configurations a user may establish the ECPUMP drive frequency is either maintained constant or is varied as per desired program or pattern or driven by music base beat etc. As the ECPUMPs are positive displacement then in order to avoid stopping them then the fluidic system requires on average a net flow. The reservoir may expand to some degree to accommodate fluctuations in flow and the piston stroke (AC amplitude) may be varied quickly to respond to changing hydraulic loads.

Within embodiments of the invention, for example, then a Product-Device such as a ski boot then a user may establish a bias pressure such that the ski boot is pressurized for fit and then can be modulated to provide massage. Product-Device, through multiple actuators the bias pressure for different portions/regions of the Product-Device.

Within embodiments of the invention described supra in respect of FIGS. 3A to 22 the fluidic circuit(s) may be considered as implying only the use of closed systems. However, embodiments of the invention may be used within fluidic circuits that are not closed per se but are drawing upon a refillable reservoir (e.g. a reservoir on a water pistol) or "open" reservoir (e.g. the air around the Product-Device). Accordingly, within the later a LMMC according to embodiments of the invention may form the basis of an ECPUMP and/or access check valve whilst FFVs according to embodiments of the invention may control flow of the air within the Product-Device. For example, the embodiment of the invention may inflate or evacuate multiple air chambers, e.g. within pockets of insulation, so that, for example, the fluidic system inflates or deflates the insulation thickness within a jacket, pants, long coat etc., for example, either due to weather or another factor such as sitting/standing. Accordingly, the system can provide a jacket, for example, that allows for collapsed air pockets and hence the insulation is thin so that a jacket is light and thin, e.g. for wearing indoors or mild weather, which can be partially inflated for outdoors or cooler weather, and then fully inflated for even colder outdoor weather. Optionally, the portions of the jacket are variable discretely such that an intermediate setting with thin sleeves and thicker body represents a transition between fully thin and full partial inflation. Such configurability may also be provided within other Products-Devices such as yoga mats, sleeping bags, mattresses, etc.

Optionally, an item of clothing may have air flow openings within the material so that one part of the clothing may move relative to another, each with holes within it, by a sliding track to maintain proximity of one to the other so that as the material is expanded other pockets within the material fill with fluid (e.g. air). Accordingly, an expandable sleeve or collar may be provided that expands to grip the user's wrist or neck limiting ingress of cold air for example. Alternatively, shape memory alloys, fluidics and/or valves may be employed to achieve opening/closing of fluid pathways within the material by aligning/mis-aligning openings within the material between sections. By supporting movement of the material in a single direction the alignment/shuttering of the holes any be implemented at low cost exploiting molded plastics, material/plastic combinations, plasticized and/or overmolded material so the plastics are integral to the material in only required sections. Similarly, molded guides may be easily formed on each sheet of material which are then aligned and joined prior to cutting/sealing/stitching into the required item of clothing or equipment. It would be evident that reversing allows for the establishment of "vacuum" within the chambers collapsing them.

For example, an item of bedding such as a blanket may have multiple chambers to provide variable levels of insulation for left-right/top-bottom/top-middle-bottom etc. to support the needs so the user or users. Optionally, heating can be integrated though electrical heating or circulating heated fluid whilst cooling can also be performed through fluid flow and extraction of heat from the fluid prior to recirculating. Optionally, designs may be implemented specifically, for example, for babies or menopausal women with localized pressure—cooling or pressure—heating etc. With the use of air as the fluid the bedding may couple to a separate unit providing the pump as well as heating/cooling so that there are no electrical elements within the bedding itself and the separate unit may plug directly into the electrical mains rather than being powered by a battery. Optionally, temperature monitoring may be provided within the blanket for control and decision making.

Within another embodiment of the invention a closed fluidic system may be used to inflate an actuator which itself increases the pressure within a second reservoir with a second fluid. For example, the actuator may inflate increasing pressure within a water reservoir wherein subsequent opening of a valve on the water reservoir results in release of water, e.g. within a toy water gun. Optionally, the reservoir may be refilled and the process repeated with the actuator deflated or the actuator inflates further again once the valve has been reclosed to provide a subsequent "shot." With the actuator repeatedly inflated/deflated a small actuator can provide repeated pressurization of a fluid reservoir. Whilst this may be employed within items such as water guns it may also be employed to provide, for example:

a spurting action within a sex toy to simulate male orgasm in a female sex toy;
pumping "lubricant" within a sex toy to simulate female arousal/orgasm in a male sex toy;
pump a moisturizer or other cosmetic product in controlled manner without requiring that the pump be compatible with the cosmetic product;
pump a fluid containing particles, e.g. a cosmetic scrub with abrasive particles or a polishing compound, without the pump having to directly pump the particulate containing fluid damaging the pump or leading to wear on the pump.

Accordingly, LMMCs, C:LC-FFVs, ECPUMPs and fluidic circuits according to embodiments of the invention may be configured and exploited within a wide range of applications including, but not limited to, those described supra and below:

water bottles and back packs for skiers, joggers etc.;
narcotic, hallucinogenic, and pharmaceutical equipment; pumps;
portable water and/or fluid dispensers;
water showers;
water pumping and filtration for camping, third world applications etc. by pressurized fluid flow through filters such as ceramic filters for example;
constrictor for medical and/or physical activities, e.g. tourniquet;
portable blood pressure measurement equipment;
condiment dispensers;
air pumps for sports equipment, vehicles, bicycles etc.;
portable drinks machines such as coffee and/or tea;
pumps for various devices such as blow up mattress, tents, water toys, blow-up chairs;
adjustable pressure pads;
fluid dispensing with music synchronization, e.g. water spouts and/or jets can be timed to music whilst an optical strobe may provide visual effects such as making drops appear to be weightless, hovering, or moving gently suspended etc.;
scuba diving pressure system to keep scuba diver at neutral buoyancy as they go deeper and the wet suite bubbles are reduced in size a pump could compensate to maintain neutral buoyancy;
hydraulic pumps on plane, rockets etc. where weight is a concern
massage bicycle seat;
beds, wheel chairs etc. designed to distribute patient's weight to prevent bed sores and/or provide variable massage;
variable "lift" within clothing such as variable "push-up" bra; and
automatic drink shot dispenser for use in high volume bars to dispense a drink shot quickly and accurately including self-serve systems.

Optionally, shape memory alloys (SMAs) may be employed in conjunction with Products-Devices according to embodiments of the invention wherein these may be employed to provide electrically controllable collapsing of spring loaded chambers or releasing a latch etc. For example, a heated brace may expand in use and then when cool collapse to a small footprint. As SMA Can also use SMA's in material to collapse spring loaded chambers or to release a latch that allows the spring to release. As the SMA elements may be thin and flexible the Product-Device may be rolled in "stored" format for eased storage, sales channel distribution etc. For example, a massage mat may be sold in unexpanded form and when powered first time expands (returns) to deployed state and maintains this subsequently wherein the fluidic circuit provides massage functionality. Depending upon the hysteresis of the SMA and the transitions returning the Product-Device to collapsed state prior to applying a restraining latch, elastic tie, tie, etc. may be close to freezing allowing placement in a refrigerator or freezer to be sufficient to allow transitioning to the collapsed state.

Within embodiments of the invention the fluidic systems with their ECPUMPs, FFVs, LMMCs etc. have been associated with Products-Devices such as footwear. Within fluidic systems the weight of the system increases with massage stroke amplitude and speed as well as projected run time and battery size. Accordingly, large fast movements require increased volume/weight/power whereas smaller gentler movements can be done with little power and volume. Accordingly, fluidic embedded footwear suit applications with small or modest amplitude and speed which is common to most massage systems. all the hydraulic components can get surprisingly small. In order for a foot deployed device to exert pressure on the skin, the device must also push from the other side of the foot in an equal force and opposite direction. Hence, such systems will typically be deployed either in scenarios wherein the user is applying weight onto the device onto a floor surface, for example, or when resting with feet up where the device includes a strap or straps or other retention means that holds the device against the sole and transfers the applied pressure to the top of the user's foot. A bias pressure in the sole can easily be controlled dynamically to accommodate supporting the weight of a human or not whilst the fluidic system then provides, for example, migrating local pressurized areas.

Within embodiments of the invention, e.g. footwear, where weight can be placed in order to apply pressure to the fluidic circuit then the fluid may be pushed by the user's weight to pressurize a reservoir wherein NRVs maintain the pressure until the fluidic circuit releases the fluid and drives the circuit with directly or in conjunction with a combination of actuator(s), valve(s) and/or ECPUMP(s). Accordingly, the user can pressurize the Product-Device fluidic circuit either in use or prior to use and the stored fluidic energy (volume*pressure) used subsequently and saves the pump expending this initial energy. In some Products-Devices the user may repeatedly pressurize the fluidic circuit whilst in others an initial charging is via the user and subsequently the ECPUMP takes over to maintain operation.

Within the embodiments of the invention described and depicted in respect of FIGS. 9A to 22 respectively have been primarily described with respect to Products-Devices for human users it would be evident that embodiments of the invention may also be employed for products intended for non-human users such as dogs, cats, horses, livestock etc. Further, the embodiments of the invention may be employed directly as part of or as additional products/add-ons etc. for android systems, mechanical systems, robotic systems etc.

Within embodiments of the invention described supra in respect of valves, switches, etc. exploiting fluidics it has been noted that amongst the parameters to be varied and/or optimized are the magnet to washer stand-off distance and maintaining the 180 degree "U-turn" or "turn around" distance for the fluid path, and that this is all varied to optimize the location of each end of the magnet with respect to the middle of each coil when in the latched position, since the closer both ends of the magnets are to the middle of each coil within the designs exploiting dual coils or the middle of the coil with single coil, the better magnetic advantage and the lower the power to actuate. Further, as noted the shape of the electric current drive wave to energize the coil(s) can be modified from a standard wave to a complex symmetrical or non-symmetrical shape to optimize the behavior of the piston, its energy consumption, instantaneous linear forces on the piston and therefore acceleration and pressure of the fluid column connected to the piston either with or without a fluidic capacitor or resonator in place across or in series with the valve or pump system and any associated pressure reservoir either one at positive pressure or negative pressure. Such design variations and optimisations may further exploit and leverage the concepts within the inventors other fluidic devices and systems such as depicted within WO/2014/047717 entitled "Methods and Devices for Fluidic Driven Adult Devices"; WO/2014/047718 entitled "Fluidic Methods and Devices" and WO/2015/135,070 entitled "Methods and Devices to Hydraulic Consumer Devices", which are incorporated herein by reference.

When considering users of the prior art devices described above these present several limitations and drawbacks in terms of providing enhanced functionality, dynamic device adaptability during use, and user specific configuration for example. For example, it would be desirable for a single device to support variations in size during use both in length and radial diameter to even with the device held static by the user as well as adapting to the user of the device or the individual playing with a toy. It would be further beneficial for devices to vary in form, i.e. shape, during use in manners not present within the prior art and yet it would be yet further desirable for these variations to be integral and/or additional to the traditional operation of the device in many instances. It would be yet further desirable to provide variable sized and shaped features in an asymmetric fashion on the device so that the device provides a further level of sensation control. Such variable sized and shaped features, such as bumps, undulations, knobs, and ridges, may beneficially appear and disappear during use discretely or in conjunction with one or more other motions. In some instances, it may be desirable to provide a radial/length increases along selected portions of the device to accommodate specific physical aspects of human physiology or user preferences.

In some device embodiments it would be desirable for the outer surface or "skin" of the device to move within the plane of the skin so that one or more areas of the skin relative to the majority of the outer skin of the device to provide a capability of friction to the user. Optionally, these regions may also move perpendicular to the plane of the skin surface at the same time. In addition to these various effects it would also be beneficial to separately vary characteristics such as frequency and amplitude over wide ranges as well as being able to control the pulse shape for variable acceleration of initial contact and subsequent physical action as well as being able to simulate/provide more natural physical sensations. For example, a predefined "impact" motion at low frequency may be modified for vibration at the end of the cycle.

It would be desirable for these dynamic variations to be controllable simultaneously and interchangeably while being transparent to the normal use of the device, including the ability to insert, withdraw, rotate, and actuate the variable features either with one hand, without readjusting or re-orienting the hand, with two hands, or hands free. In some embodiments of the device it would be desirable to provide two, perhaps more, independently controllable ranges of shape changes within the same device, so that in one configuration a first range of overall shapes, vibrations, undulations, motions etc. is available and a second range is available in a second configuration. These configurations may be provided sequentially or in different sessions. Within another embodiment of the invention these configurations may be stored remotely and recalled either by an individual to an existing device, a new device, or another device as part of an encounter with another individual who possesses another device. Optionally, such profile storage and transfer may also provide for a remote user to control a device of an individual. Optionally, within other embodiments of the invention the overall pressure of the fluidic system may be constant, or it may be varied. Within embodiments of the invention it may be desirable to provide two, perhaps more, independently controllable ranges of shape changes within the same device, so that in one configuration a first range of overall shapes, vibrations, undulations, motions etc. are provided and within a second configuration a second range of overall shapes, vibrations, undulations, motions etc. are provided.

Accordingly, the desirable multiple ranges of motion of the device both in terms of overall configuration and dimensions as well as localized variations and movement may be implemented using fluidics wherein a fluid is employed such that controlling the pressure of the fluid results in the movement of an element within the device or the expansion/contraction of an element within the device. Embodiments of the invention allow for large amplitude variations of the device as well as providing operation over ranges of frequencies from near-DC to frequencies of hundreds of Hertz. Further embodiments of the invention provide for efficient continuous flow/pressure as well as more power hungry pulsed actuations.

It would be evident to one skilled in the art that the depictions of ECPUMPs and LMMCs in respect to embodiments of the invention within the descriptions and drawings have not shown or described the construction or interior configuration of the excitation coil or annular coil. The design and winding of such coils is known within the art and their omission has been for clarity of depiction of the remaining elements of the ECPUMPs and/or LMMCs. For example, in FIG. 3A the coil may be wound or formed upon a bobbin core and housed within bobbin case which includes an opening(s) for feeding the electrical wires in/out for connection to the external electrical drive and control circuit. Such coils may be wrapped and/or potted to encapsulate them. Examples of such coils include, for example, 170/22, 209/23, 216/24, 320/24, 352/24, 192/28 (e.g. 8 layers of 24 turns per layer), 234/28, 468/32, and 574/33. Each pair of numbers representing the number of windings and American wire gauge (AWG) of the wire employed. It would be evident that other designs may be employed without departing from the scope of the invention.

It would be evident to one skilled in the art that other structures comprising elastic elements, resilient members, and fluidic actuators can be implemented wherein one or more aspects of the motion, dimensions, etc. of elements of the device and the device itself change according to the sequence of actuation of the same subset of fluidic actuators within the element of the device and/or device itself. Further, it would be evident that one or more active elements such as the fluidic pump(s) and fluidic valve(s) can be designed as a single module rather than multiple modules.

It would be evident to one skilled in the art that by suitable design of the LMMCs that in addition to providing valves and switches such LMMCs may also form the core of ECPUMPs depicted supra which in addition to providing pump action, and acting as primary pumps such as described in respect of FIGS. 1A and 1B that these can also act as second pumps as depicted in these Figures as well as providing vibrator type functionality. Further, within the embodiments of the invention described supra in respect of electronically controlled pumps it would evident to one skilled in the art that whilst these have been described with the provisioning of fluidic capacitors these can be omitted according to the design of the overall device in terms of aspects including, but not limited to, the tubing employed to connect the various elements of the fluidic system together or those portions of the fluidic system proximate the fluidic pump(s). In some instances, the fluidic capacitor removal can result in a cyclic/periodic pressure profile being applied to the overall profile established by the electronic controller wherein the cyclic/periodic pressure profile provides additional stimulation to the user of the device. It would be evident that in other embodiments of the invention a fluidic capacitor can act as a high pass filter dampening low frequency pressure variations but passing higher frequency pressure variations. In other embodiments of the invention an ECPUMP can form the basis of a compact RAM/Hammer pump.

Within embodiments of the invention the actuators may be formed from a material that has limited or no stretch in one direction relative to its surface but may have significant stretch in another direction. Such a material can be employed to create, through manufacturing techniques such as vacuum pre-forming, thermal forming, stamping, molding, etc. are applied to the sheets to shape them, actuators from thin film weldable fabrics allowing a wide variety of shapes to be formed and pressurised. Optionally, the actuator may be formed from a material without any elasticity at its fullest extent such that withdrawal of the fluid collapses the actuator but filling and expanding the actuator is achieved without significant effort being expended in stretching an elastic material.

Optionally, a moisture barrier material or materials such as polypropylene, ethylene vinyl acetates such as linear polyethylene thermoplastic or polyurethane, and a natural rubber may be employed in order to reduce the moisture penetration rate of the actuators. According to the design goal of the product then in some embodiments of the invention the product is sealed at the factory and designed to operate for a target lifetime, e.g. 2 years, 5 years or 10 years, before the fluid loss becomes sufficient to impact performance and/or operation of the device. Alternatively, the product may have a fill or re-fill cap for the consumer to fill/refill the device. Optionally, the device may include an injection port that seals when a re-fill needle is withdrawn from its septum. Within embodiments of the invention fluid leakage from the actuators is drawn back to the reservoir. Optionally, a moisture "giving" element may be employed within the product packaging and/or storage case. This moisture "giving" element may be initially wetted by the manufacturer and then periodically re-wetted by the consumer on occasion to provide a "moist" environment such that the leakage of fluid is reduced or prevented.

Within other embodiments of the invention a fluidic actuator can act as a fluidic capacitor and can in some instances be disposed such that any other fluidic actuators are coupled from this fluidic actuator rather than directly from the pump or from the pump via a valve. Within other embodiments of the invention a fluidic capacitor can be provided on one side of the pump such as for example, the inlet. Optionally, a fluidic system may employ one or more fluidic capacitors that can be switchably taken in and out of the system dynamically through the use of switches/valves.

Optionally, the inlet fluidic capacitor can be designed to provide minimal impact to the device movement or designed to impact the device movement, such as for example by not adjusting dimensions in response to pump action. In this instance the when the pump piston seeks to draw fluid and one or more fluidic actuators have their control valves open such that there is an active fluidic connection between the pump and fluidic actuator(s) then fluid will be drawn from the fluidic actuator(s) towards the piston. However, if one or more valves is not open or the fluidic actuators are all collapsed, then the "vacuum" at the pump piston inlet would increase and accordingly a pressure relief valve can allow fluid to flow from a high-pressure inlet fluidic capacitor or directly from the valve and allow the fluid to circulate when the fluidic actuators are not changing in volume. In this manner the pump can continue to run, such as for example providing, a vibration, even when the device is in a state that there is no adjustment in the volume of the fluidic actuators.

Within devices according to embodiments of the invention the fluid within the device can be heated or cooled to provide additional sensations to the user during their use of the device. Optionally, by varying the thermal conductivity of the body of the device in different regions and/or by varying the thickness of the external device skin etc. between the fluid and user's skin the degree of hot or cold applied to the user's skin can be varied across the surface of the device. In other embodiments dual fluidic circuits can provide hot and cold within the same device. Whilst heating the fluid is relatively straight-forward cooling, such as for example through the use of a thermoelectric cooler to cool a metallic element against or around which the fluid flows, requires that heat be extracted from the fluid. In some embodiments of the invention this can through use of a heatsink and/or forced air cooling or through the skin/exterior of the device. In another embodiment the thermoelectric cooler on one side cools a first fluidic loop's fluid whilst on the other side it heats a second fluidic loop's fluid.

In some embodiments of the invention the fluidic capacitor function can be removed such that the fluidic system directs all pressure possible, i.e., all that the pump piston can exert, through rigid pipes and control valves to the fluidic actuator such that the motion of the pump piston, is translated into fluid movement into/out of the fluidic actuator. This can be employed where the distance between fluidic actuator and pump is relatively short and the volume/weight of fluid being driven by the pump piston is not too large. Accordingly, depending upon the fluidic circuit design if more than one valve is open the fluid flow would be shared, and if no valves were open or valves were open but the fluidic actuator cannot expand or contract more, through some pressure/vacuum limits controlled through design of the fluidic actuator and surrounding materials, then the back pressure/vacuum on the pump piston would go up/down until the pressure relief valve opens and allows the fluid to recirculate from the pump outlet to the pump inlet. Accordingly, the pump piston can keep running without the device undergoing any movement. It would be evident that in such embodiments of the invention that the fluidic system with capacitors can contain only a small reservoir or no reservoir.

Fluidic systems such as described above in respect of embodiments of the invention with reservoirs and/or fluidic capacitors can still employ a pressure relieve valve or optionally have the pressure monitored to shut the pump down under circumstances such as being stalled against closed valves or fluidic actuators that will not move for example or where the pressure exceeds a predetermined threshold. For example, squeezing the device hard can prevent it from expanding when desired thereby leading to stalling the pump but the pressure monitoring can shut the pump down already. Optionally a thermal cut-off can be also employed within the overall control circuit. Optionally, the pump frequency might be adjusted, or valves triggered to put the ECPUMP into a closed loop isolated from the actuators for either a predetermined period of time or until pressure has reduced to an acceptable level. It would be evident that more complex decisions could be made such as assessing whether the pressure is periodic/aperiodic and indicative of an intense vaginal orgasm for example rather than an individual squeezing the device. It would be evident that with ECPUMPS we can vary the pump frequency, pump stroke length, pump pulse profile, etc. to vary effective pressure, flow rate, and pulse frequencies of fluid motion within the device and accordingly actions from the fluidic actuators to which these fluidic motions are coupled by valves, switches, splitters, etc. In other embodiments of the invention the ECPUMP can be allowed to stall and through appropriate design not overheat.

Where a pressure sensor is embedded then this can itself establish the desired pressure that the user wishes to experience and then determine the pump drive signals required to achieve this desired result under variations of other pump parameters such as if the user adjusts the frequency at which operating in the user configuration stage the pressure profile is maintained. It would be evident that ECPUMP performance can be monitored. For example, the back electromagnetic field (EMF) generated can be measured to determine the position of the piston within the ECPUMP and compared relative to expected position as well as deriving position-time profile to establish whether adjustments are required to the control signals to achieve the desired device and/or ECPUMP performance. Alternatively, capacitive or other sensors can derive piston position, acceleration etc. as well as fluidic flow and pressure at the ECPUMP head could also be monitored to verify performance.

Alternatively, the fluidic system can be designed such that the pump always runs and is varied in revolutions per minute (RPM) according to some desired pattern including the stimulation vibration pattern and the valves are opening and closing so that the device is always moving in one aspect or another and therefore the pump would not need to be shut off in the design scenarios wherein there was no fluidic capacitor or an inadequate fluidic capacitor, reservoir or pressure relief bypass valve.

Products exploiting embodiments of the invention may be designed to operate open loop or closed loop because of the programmability of microprocessors and alternatively the low cost of pressure and accelerometer sensors may be used to detect a seized or stuck piston because if the pump is seized, it will not vibrate, but power is applied. Similarly, a pressure sensor can detect no increase in pressure while the pump is powered and seized.

Within other embodiments of the invention the fluidic systems/devices may exploit pressure relief valves allowing the fluidic pump to overproduce under certain circumstances and not overfill a pressure reservoir. This fluidic shunt/bypass can be electrically controlled with a switch or shape memory alloy (SMA) valve etc., or be a non-controlled feature that opens from overpressure with valve design, magnets can be incorporated to improve the latching nature and improved hysteresis of standard pressure relief valves.

Systems exploiting closed loop may be controlled to achieve a variable set point in respect of flow or pressure through adjustments to control parameters such as pump frequency, stroke length, stroke force etc.

Materials:

Within the fluidic assemblies, actuators, devices, fluidic valves and fluidic pumps described above in respect of FIGS. 1 through 21, the fluid can be a gas or liquid. Such fluids can be non-toxic to the user in the event of physical failure of the device releasing the fluid as well as being non-corrosive to the materials employed within the device for the different elements in contact with the fluid. Within other embodiments of the invention the fluid can be adjusted in temperature, such as heated for example. For example, the fluid can be a simple salt water (saline) solution or a 50% propylene glycol and 50% water mixture although other ratios can be employed according to the desired viscosity of the liquid. A range of other materials can be employed based upon desired properties of the fluid, which can include, but are not limited to, it being anti-fungal, a lubricant, a lubricant additive, anti-freeze over storage and/or operating range, anti-bacterial, anti-foaming, inhibiting corrosion, non-toxic, and long lifetime within sealed fluidic systems. Examples of such fluids can include, but are not limited to, vegetable oils, mineral oils, silicones, water, and synthetic oils.

In terms of materials for the fabrication of the device a variety of materials can be employed in conjunction with the fluidic actuators including for example closed-cell foam, open-celled foam, polystyrene, expanded polystyrene, extruded polystyrene foam, polyurethane foam, phenolic foams, rubber, latex, jelly-rubber, silicone rubber, elastomers, stainless steel, aluminum, Cyberskin, fabrics, real fur, artificial fur, and plastics. The fluidic actuator in many embodiments of the invention is designed to expand under an increase in pressure (or injection of fluid) and collapse under a decrease in pressure (or extraction of fluid). Accordingly, the fluidic actuator will typically be formed from an elastic material examples of which include rubber, latex, silicone rubber and an elastomer. In some embodiments of the invention the fluidic connections between the fluidic actuator(s) and the fluidic pump and/or valve can be formed from the same material as the fluidic actuator rather than another material. In such instances the fluidic actuator can be formed by reducing the wall thickness of the material. Examples of manufacturing processes include, but are not limited to, dip-coating, blow molding, vacuum molding, thermoforming and injection molding. It would also be evident that multiple actuators can be formed simultaneously within a single process step as a single piece-part. Alternatively, multiple discrete actuators can be coupled together directly or via intermediate tubing through processes such as thermal bonding, ultrasonic bonding, mechanical features, adhesives, etc. Similar processes can then be applied to attach the fluidic actuators to the NRVs, LMMCs, valves, switches, ECPUMPs etc.

Within embodiments of the invention may exploit a variety of fluids. Embodiments of the invention may exploit a different viscosity fluid within one design to another in order to adjust the Reynolds number of the fluid thereby allowing laminar flow through "tight" or "narrow" regions of the fluidic circuit as well as other design regions such as the 180 degree "U-turns" within the switches/valves. In other embodiments of the invention adjusting the fluid viscosity allows the fluidic system efficiency to be increased.

Whilst emphasis has been made to self-contained discrete devices it would be evident that according to other embodiments of the invention that the device can be separated into multiple units, such as for example a pump assembly with device coupled to the pump assembly via a flexible tube which can be tens of centimeters, a meter or a few meters long. In other embodiments a very short tube can be employed to isolate the pump assembly from the remainder of the device or as part of a flexible portion of the body allowing user adjustment such as arc of their knee, elbow, calf, etc. It would also be evident that devices according to embodiments of the invention can be configured to be held during use; fitted to a harness; fitted via an attachment to a part of the user's body or another user's body, e.g., hand, thigh, or foot; or fitted via a suction cup or another mounting means to a physical object such as a wall, floor, or table.

Within embodiments of the invention with respect to devices and the electronic control the descriptions supra in respect of the Figures have described electrical power as being derived from batteries, either standard replaceable (consumable) designs such as alkaline, zinc-carbon, and lithium iron sulphide ($LiFeS_2$) types, or rechargeable designs such as nickel cadmium (NiCd or Nicad), nickel zinc, and nickel-metal hydride (NiMH). Typically, such batteries are AAA or AA although other battery formats including, but not limited to, C, D, and PP3. Accordingly, such devices would be self-contained with electrical power source, controller, pump(s), valve(s) and actuator(s) all formed within the same body. It would be evident that fluidic pumps, electronic controller, and fluidic valves are preferably low power, high efficiency designs when considering battery driven operation although electrical main connections can ease such design limits. For example, considering a device where the operating pressure for fluidic actuators is approximately 2-6 psi with flow rates of approximately for typical geometries and efficiencies then power consumption is approximately 3 W. Considering one 3.7V Li-ion rechargeable battery with 1 Amp-hour capacity then this offers approximately 3.7 W power provisioning. Other devices may include multiple batteries including those according to standards such as A, AA, AAA, C, and D for example. Additionally, different batteries may be combined with different pumps or these can be combined can be implemented within the device. Other devices may include those exploiting solar charging for example.

However, alternate embodiments of devices can be configured to include a power cord and be powered directly from the electrical mains via a transformer. Optionally, a device can be configured with battery and electrical mains connections via a small electrical connector with a cord to a remote transformer and therein a power plug. However, it would also be evident that other embodiments of the invention can be configured to house a predetermined portion of the pump(s), valve(s), power supply, and control electronics within a separate module to that containing the fluidic actuators.

Embodiments of the invention may further be design to provide designs that may be pre-warmed while electrically plugged in and charging in order to not deplete the battery for warming purposes. Optionally, the product may roll-up/fold-up etc. in order to conserve heat or it may come in and exploit an insulated case that is plugged in. Charging of the product may exploit inductive charging, magnetic resonance charging, direct electrical contact charging, magnetic coupling, plug charging, etc. Some embodiments of the invention may exploit a solar charging surface on the device to charge it.

With the embodiments of the invention described supra in respect of FIGS. 1 through 33 pressures of operation etc. have been discussed in respect of balloons, pumps, etc. A figure of 7 PSI is employed in some of these descriptions. It would be evident to one skilled in the art that pressures higher and lower than these may be employed by the appropriate design of the elements within the fluidic system. In some instances, pressures may be significantly higher, e.g. 20 PSI, for devices such as deep tissue massagers for example. However, such changes are typically easy to implement for the ECPUMP due to through reduction/enlargement in the diameter of the piston for example.

Within embodiments of the invention to devices and the electronic control the descriptions supra in respect of the Figures the electrical control has been described as being within the device. However, optionally the controller can be remote to the device either connected via an electrical cable or communicating via an indirect means such as wireless communications for example. Additionally, the electronic controller has been primarily described as providing control signals to the fluidic pumps and valves, as well as other active elements, of the device. However, in some embodiments of the invention the electronic controller can receive inputs from sensors embedded within the device or external to the device. For example, a sensor can provide an output in dependence upon pressure applied to that portion of the device the user, for example from vaginal contractions, wherein the controller can adjust one or more aspects of the device actions in terms of maximum pressure, speed, slew rate, and extension for example. Optionally, other sensors can be internally deployed within the device to monitor the performance of the device, including for example, linear transducers to monitor length extension, pressure sensors to monitor fluid pressure at predetermined points within the device.

Within the descriptions presented supra in respect of FIGS. 1 through 22 that reference has been made to specific embodiments of fluidic actuators, NRVs, LMMCs, valves, switches, ECPUMPs etc. Whilst these embodiments represent solutions providing compact low power devices with a range of motions and/or actions according to the particular combinations of fluidic actuators, NRVs, LMMCs, valves, switches, ECPUMPs etc. it would be evident that one or more of these elements including, but not limited to, the fluidic actuators, NRVs, LMMCs, valves, switches, ECPUMPs etc. may also be implemented with alternative technologies and component, sub-assembly and assembly designs without departing from the scope of the invention as described and depicted in respect of FIGS. 1 to 22 respectively.

Within embodiments of the invention the movement/vibration of different or same actuator(s) move relative to frequency of music that follows the base track or notch filter, or left or right channels, or movie coordination or virtual reality, or movement of a partner directly or through another device that detects the partner's device movements relative to their body or absolute movement not relative to anything else, or pick up pressure exerted by or upon the individual's device or their partner's device.

It would be evident from the descriptions supra in respect of embodiments of the invention in FIGS. 1 to 22 that fluidic actuators in combination with fluidic pumps such as ECPUMPs and valves/switches based upon LMMCs and FFVs can provide movement within small spaces, can provide increased functionality with reduced complexity, and can be scaled from small compact assemblies within children's toys for example through to fluid systems for an adult's limbs. These compact assemblies can be deployed within spaces that are too small for conventional prior art motors with gears, levers, etc. Further a single power plant, e.g. fluidic pump, can power multiple separate elements within the devices that are only connected by one or more flexible hoses that may be small diameter or sized appropriate to the function and feature variation being induced through the fluidic actuator. In this manner devices such as toys may be formed with motive features within structures that are themselves flexible or are connected to the remainder of the toy via flexible members. Similarly, in larger devices these can be manipulated to fit a user or rolled, flattened, etc. without damaging the "power chain" as the flexible hoses move with the skin and/or body of the device.

Additionally, fluidic systems provide additional advantages including, but not limited to:
- moving component is soft and flexible unlike mechanical systems;
- high pressures/tensions etc. together with large forces can be developed through hydraulic principles exploiting leverage;
- very thin aspect ratios are possible that are not possible with many mechanical systems;
- motive action can be simply provided in a distributed manner without complex linkages in mechanical assemblies;
- liquid based fluidic systems are generally better than gas based fluidic systems as no heat developed from compression of gas, enhanced positive displacement with liquids, and higher energy transmission is possible with equivalent volume; and
- liquid based fluidic pumping and balloon actuation is quiet compared to air pumps and air lines, balloons.

It would also be evident that the hydraulic actuators including, but not limited to, those providing torque, linear dimension adjustment, diameter expansion, increased surface area, leverage, twist, rotate, curve, bending etc. may be combined with mechanical systems including, but not limited to, mechanical levers, actuators, push/pull rods, gears, pivots, hinges, wedges, etc.

Within embodiments of the invention the fluidic actuators may cause a localized surface profile variation wherein the surface of the device within which the fluidic actuators and fluidic system are implemented may move away from a local region of a user's body whilst being in contact elsewhere around the localized region of the device such that the effect is a suction or suction-like effect being applied to the user's body in this local region. Such suction or suction-like effects may provide for direct physical stimulation or alternatively may simulate a biological effect or physiological effect such as mimicking the action of lips for simulating kissing or sucking with the mouth for example.

Within other embodiments of the invention the fluidic actuator is not present per se but the volume reduction within a reservoir or fluidic capacitor forming part of the fluidic system is employed to create the local surface variation and the desired suction or suction-like effects. Within other embodiments of the invention the fluidic actuators and fluidic system of valves, pumps, switches, balloons etc. may be employing a first fluid whilst other portions of the device are implemented using a second fluid and different fluidic system.

Additional benefit is derived from the fact that fluidic motion can be designed to produce faster or slower motion than a similarly sized and costed mechanical system. Further, fluidic actuators can be designed to be less expensive in mass production than mechanical system equivalents as the balloons, tubes, etc. can be directly formed within the body of a device during its manufacture as well as exploiting lower cost manufacturing techniques. Additionally, fluidic systems offer increased reliability as the number of moving parts is typically only one moving part in a fluidic pump and a single moving part in the actuator control valve.

Within massage device applications these devices can deigned for specific applications for all body parts, for example, neck, shoulders, upper and fore arm, thigh and calf, etc. or due to the flexible nature of the overall device be more general where a device may be applied to multiple body parts. Additionally, the fluid may be directly heated, cooled, or refrigerated prior to distribution rather than requiring multiple distributed heaters, coolers, etc. Such devices may be battery and/or mains powered. Within toys type applications for children or pets then elements of the toy can vary, e.g. swelling of a super hero's muscles etc., or balloon filling can cause movement for toy motion purposes, or a balloon swelling can be used just for visual or tactile purpose such that the toy could change shape by displacing fluid from one location to another or from an internal storage element such that eye balls swell, eye brows change, lips pucker, and ears wiggle for example. Further based upon the actuators implemented and the presence/absence of friction elements etc. can result in motions such as crawling, swimming, jumping, "inch worming", snaking, rolling, running, walking, as well as arm waving, throwing, facial expressions, body posture or pose changes, dancing, imitation of any action of an animal or human, etc. In addition to vibration and pressure massager actions can include rippling, kneading, progressive squeezing, stroking, and other massage motions.

Beneficially massager based devices could provide the same pressure, speed, and motions as a human massage specialist but does not tire, weaken, loose interest, booking, etc. and has reducing cost of ownership with time versus an increasing cost overall due to cost $/hour service provision. Beneficially, such fluidic based massagers are portable and can be used in a wide variety of locations at any time and any place plus can apply hot and/or cold cycles or other features like vibration etc. while massaging so that overall long and complex routines can be specifically designed to work specific muscles beyond human capability of control, repetition rate, consistency, complexity. Within medical environments and/or elderly care environments these also allow the benefits of massage therapy to be provided to all rather than a select few. Massage devices can also be provided that cover more surface area simultaneously than can be kneaded by a pair of hands or provide pressure points equivalent to dozens of fingers or provide manipulations that physically cannot be provided by a human.

Within other devices, e.g. a ball containing multiple balloons located inside the ball close to its surface with the pump being central, for example, then the ball could be made to roll and change directions, back up, start/stop with this all being apparently achieved "All by Its Self" based upon controlling the distribution of the fluid within the balloons within ball." Accordingly, fluidics can be used as a portable mass, the location of which can be changed and controlled in order to affect a change of a toys balance point, its centre of gravity etc. A toy could stand there and then fall over "All by Its Self" in response to a user action, a sound, a command from another toy or game, etc. or alternatively the toy can be made to wobble or not when it rolls, curve like lawn bowling curve ball effect. Equally variations of the centre of gravity can be used, for example, for manipulating a board game central figure, in games of chance, in games of reflexes or coordination, and skill games. Whilst pet toys would generally require a puncture proof flexible sheath over the surface of the device or specifically the fluidic elements in order to prevent tooth punctures they can exploit many of the same effects and actions as well as combining them with sensor feedbacks such as does the pet move, make a noise, or does it react to a visible signal, e.g. a laser pointer spot.

For toy devices exploiting embodiments of the invention then these may, when impacted, held, squeezed, restrained, in the dark or light, hot or cold, shaken, still, tilted, pulled, pushed, quiet, loud, or another measurable condition, generate specific responses based upon the programming of the controller. Similarly, a controller may trigger specific timed programs in response to triggers or control inputs. For massage devices, these could, for example, be a timed program of many selectable, user adjustable, and/or sensor based feedbacks to effect control of massage.

For massaging devices, the fluidic actuators and fluidic systems can be combined with other output devices, heaters, coolers, audio, mechanical vibrators, electro-stimulators for transcutaneous electrical nerve stimulation (TENS), lights, ultrasonic vibrations, or other muscle healing or deep tissue, or skin level treatments, e.g. ultraviolet, infrared, etc., including compression, vacuum, tension, friction. According, massage devices according to embodiments of the invention can be employed to provider Swedish massage therapy, aromatherapy massage with integral oil dispensers in addition to the other fluidic systems, hot stone massage by providing localized heat, deep tissue massage, Shiatsu, Thai, reflexology. Beneficially, such massages can be now provided wherever the user is and in fact whilst they are undertaking other activities such as working, walking, sitting at home, sleeping etc.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments can be described as a process, which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The foregoing disclosure of the embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A fluidic switch comprising:
   a piston formed at least partially from a first magnetic material;
   a piston sleeve formed from a non-magnetic material having an inner bore within which the piston is movable;
   a first electrical coil surrounding at least a portion of the piston sleeve;
   a first non-magnetic washer arranged at a first end of the piston sleeve and comprising a first pair of open-ended fluid passages with first ends projecting towards the piston sleeve and second ends projecting away from the piston sleeve, the first pair of open-ended fluid passages for fluidically coupling with a first pair of fluidic channels;
   a first magnetic washer arranged at the first end of the piston sleeve at a side of the first non-magnetic washer opposite the piston sleeve and comprising at least one first central opening through which the second ends of the first non-magnetic washer can be fluidically coupled to the first pair of fluidic channels;
   in a first configuration, the piston is retained against the first ends of the first pair of open-ended fluid passages of the first non-magnetic washer at the first end of the piston sleeve by magnetic attraction to the first magnetic washer thereby blocking fluid flow through the first pair of open-ended fluid passages;

in a second configuration, the piston is retained away from the first ends of the first pair of open-ended fluid passages by a retention force between the piston and the first magnetic washer, thereby allowing fluid flow between one of the first pair of open-ended fluid passages to the other one of the first pair of open-ended fluid passages; and the piston is moved to establish either of the first configuration and the second configuration by selective electrical excitation of the first electrical coil.

2. The fluidic switch of claim 1, wherein the retention force is determined in dependence upon a thickness of the first non-magnetic washer.

3. The fluidic switch of claim 1, further comprising a non-magnetic plate closing off a second end of the piston sleeve.

4. The fluidic switch of claim 3, further comprising a magnetic plate disposed adjacent the non-magnetic plate to retain the piston within the second configuration absent continued excitation of the first electrical coil.

5. The fluidic switch of claim 1, further comprising:
a second non-magnetic washer arranged at a second end of the piston sleeve opposite the first end and comprising a second pair of open-ended fluid passages with first ends projecting towards the piston sleeve and second ends projecting away from the piston sleeve, the second pair of open-ended fluid passages of the second non-magnetic washer for fluidically coupling with a second pair of fluidic channels; and
a second magnetic washer arranged at the second end of the piston sleeve at a side of the second non-magnetic washer opposite the piston sleeve and comprising at least one second central opening through which the second ends of the second non-magnetic washer can be fluidically coupled to the second pair of fluidic channels,
wherein in the second configuration the piston is retained against the first ends of the second pair of open-ended fluid passages of the second non-magnetic washer at the second end of the piston sleeve by magnetic attraction to the second magnetic washer thereby blocking fluid flow through the second pair of open-ended fluid passages of the second non-magnetic washer.

6. The fluidic switch of claim 5, further comprising a central magnetic washer surrounding the inner bore.

7. The fluidic switch of claim 1, further comprising a second electrical coil surrounding at least a second portion of the piston sleeve.

8. The fluidic switch of claim 7, wherein the piston comprises:
a central magnetic portion;
a pair of end caps arranged at opposite ends of the central magnetic portion; and
a sleeve formed from a material with low coefficient of friction disposed over the central magnetic portion and retained in position by the pair of end caps.

* * * * *